United States Patent
Volin

(10) Patent No.: US 10,314,286 B2
(45) Date of Patent: Jun. 11, 2019

(54) SHAPE-SHIFTING SELF-DRAINING INDOOR-OUTDOOR EXERCISE PET TREE, HAVING ROTATABLE SLANTING LOGS, ROTATABLE SLANTING STEPS, ROTATABLE SLANTING BRANCHES, ROTATABLE SLANTING HOUSES, ROTATABLE SLANTING ACCESSORIES, AND ROTATABLE SLANTING WHEELS

(71) Applicant: Dee Volin, Fairview, OR (US)

(72) Inventor: Dee Volin, Fairview, OR (US)

( * ) Notice: Subject to any disclaimer, the term of this patent is extended or adjusted under 35 U.S.C. 154(b) by 394 days.

(21) Appl. No.: 15/350,743

(22) Filed: Nov. 14, 2016

(65) Prior Publication Data

US 2017/0135312 A1  May 18, 2017

Related U.S. Application Data

(60) Provisional application No. 62/255,522, filed on Nov. 15, 2015.

(51) Int. Cl.
*A01K 1/03* (2006.01)
*A01K 15/02* (2006.01)
*A01K 1/035* (2006.01)
*A01K 5/01* (2006.01)
*A01K 7/02* (2006.01)

(52) U.S. Cl.
CPC ............ *A01K 1/033* (2013.01); *A01K 1/0353* (2013.01); *A01K 5/01* (2013.01); *A01K 7/02* (2013.01); *A01K 15/024* (2013.01); *A01K 15/027* (2013.01)

(58) Field of Classification Search
CPC ........ A01K 1/033; A01K 1/034; A01K 1/035; A01K 1/0353; A01K 5/01; A01K 7/02; A01K 15/024; A01K 15/027
See application file for complete search history.

(56) References Cited

U.S. PATENT DOCUMENTS

| | | | |
|---|---|---|---|
| 2,821,165 A * | 1/1958 | Wright .................. | A01K 1/033 119/482 |
| 2,894,487 A | 7/1959 | Goldson | |
| 3,585,968 A * | 6/1971 | Stone, Jr. .............. | A01K 1/031 119/458 |

(Continued)

*Primary Examiner* — Kathleen I Alker

(57) ABSTRACT

A shape-shifting self-draining water-repelling hygienic indoor-outdoor slanting pet tree system comprises: adjustable legs, a rotatable pedestal, at least one shape-shifting rotatable log, at least one shape-shifting rotatable step, at least one shape-shifting rotatable branch, at least one shape-shifting rotatable hygienic platform, at least one shape-shifting rotatable condo, at least one shape-shifting rotatable hygienic cap, at least one shape-shifting rotatable connector for rotatably connecting all the components of the pet tree together, multiple rotatable wheels to allow the pet tree to be wheeled anywhere, and at least one removable water-repelling cover to cover the components of the pet tree. All the components of the pet tree can rotate 360 degrees (by water, wind, pet, and human forces applied on the inside and outside of the pet tree) to allow users to customize the tree shapes, have internal doors to allow pets to move around from one component to another inside the tree, are made of water-repelling material, and have water-draining holes to allow the tree to be hosed down and able to be used indoor and outdoor.

20 Claims, 70 Drawing Sheets

(56) References Cited

U.S. PATENT DOCUMENTS

| | | | | |
|---|---|---|---|---|
| 3,595,209 | A | 7/1971 | Parker | |
| 4,177,763 | A | 12/1979 | Cook | |
| 4,766,848 | A * | 8/1988 | Rocco | A01K 1/04 119/701 |
| 4,803,952 | A | 2/1989 | Houser | |
| 5,275,128 | A | 1/1994 | Barnes | |
| 5,713,306 | A | 2/1998 | Johnson | |
| 5,791,293 | A | 8/1998 | Northrop | |
| 5,884,586 | A * | 3/1999 | Carbonelli | A01K 1/033 119/485 |
| 5,964,190 | A * | 10/1999 | Willinger | F24F 7/007 119/482 |
| D422,754 | S | 4/2000 | Kolozsvari | |
| 6,152,553 | A | 11/2000 | Wunderlich | |
| 6,431,119 | B1 | 8/2002 | Beymer | |
| 6,886,495 | B1 | 5/2005 | Madden | |
| 6,892,675 | B1 | 5/2005 | Comerford | |
| 7,037,170 | B2 | 5/2006 | Pacella | |
| 7,040,053 | B1 | 5/2006 | Beesley | |
| 7,040,585 | B2 | 5/2006 | Cheng | |
| 7,376,993 | B2 | 5/2008 | Myers | |
| 7,578,264 | B2 * | 8/2009 | Guard | A01K 1/033 119/482 |
| 7,770,540 | B2 | 8/2010 | Halpern | |
| 7,832,361 | B2 | 11/2010 | Stevens | |
| 8,020,518 | B1 | 9/2011 | Reinke | |
| 8,505,239 | B2 | 8/2013 | Tompkins, IV | |
| 8,695,533 | B1 | 4/2014 | Mulligan | |
| 8,776,727 | B1 | 7/2014 | Nelligan | |
| 8,910,593 | B2 * | 12/2014 | Kell | A01K 1/0236 119/400 |
| 9,282,723 | B2 | 3/2016 | Haaf | |
| 2003/0221628 | A1 | 12/2003 | Leon | |
| 2005/0284407 | A1 | 12/2005 | DeRaspe-Bolles | |
| 2010/0192870 | A1 * | 8/2010 | Wood | A01K 1/0245 119/496 |
| 2011/0247567 | A1 * | 10/2011 | Chan | A01K 1/033 119/416 |
| 2011/0259278 | A1 * | 10/2011 | Collingham | A01K 1/034 119/496 |
| 2012/0318206 | A1 * | 12/2012 | van Leeuwen | A01K 1/035 119/416 |

\* cited by examiner

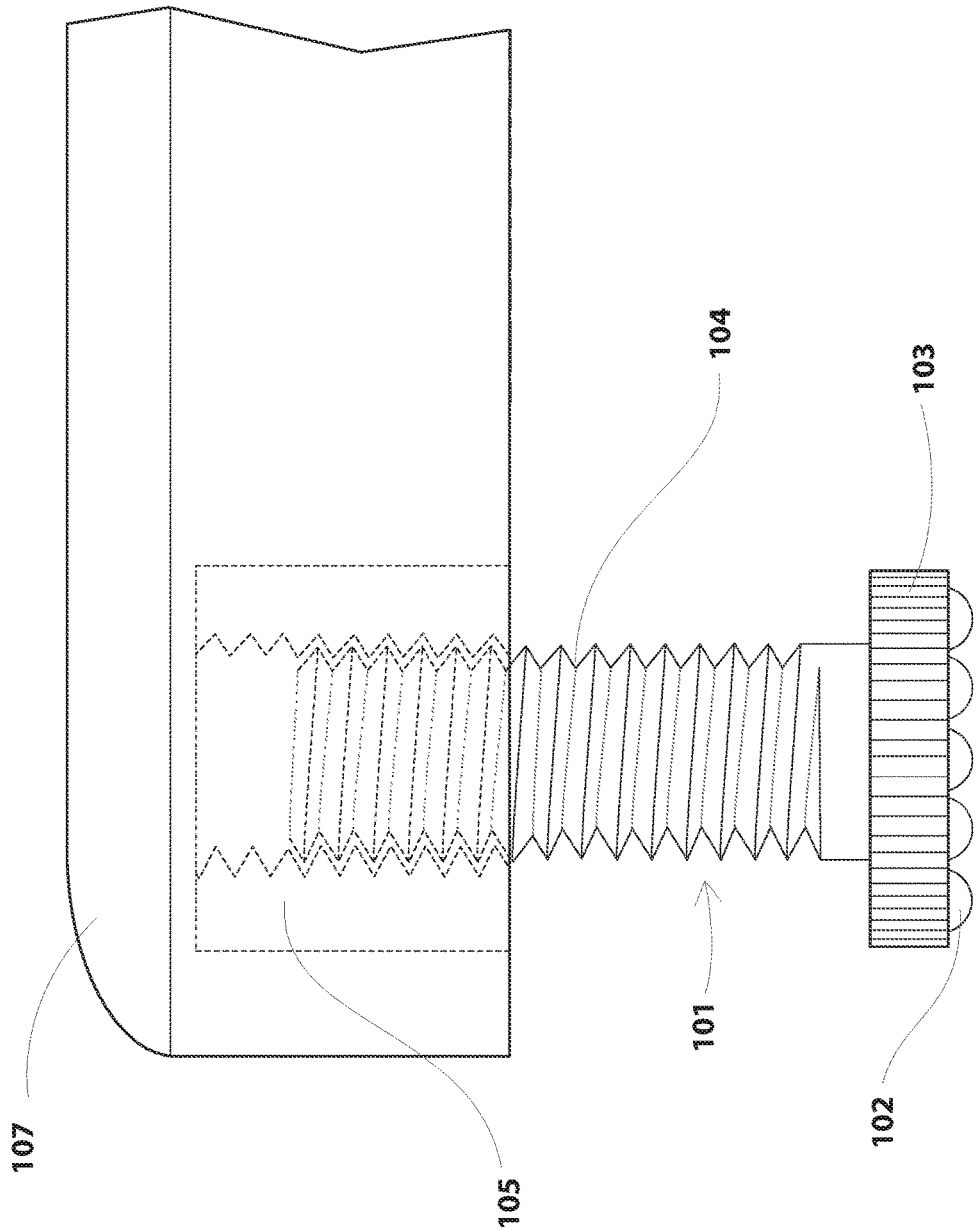

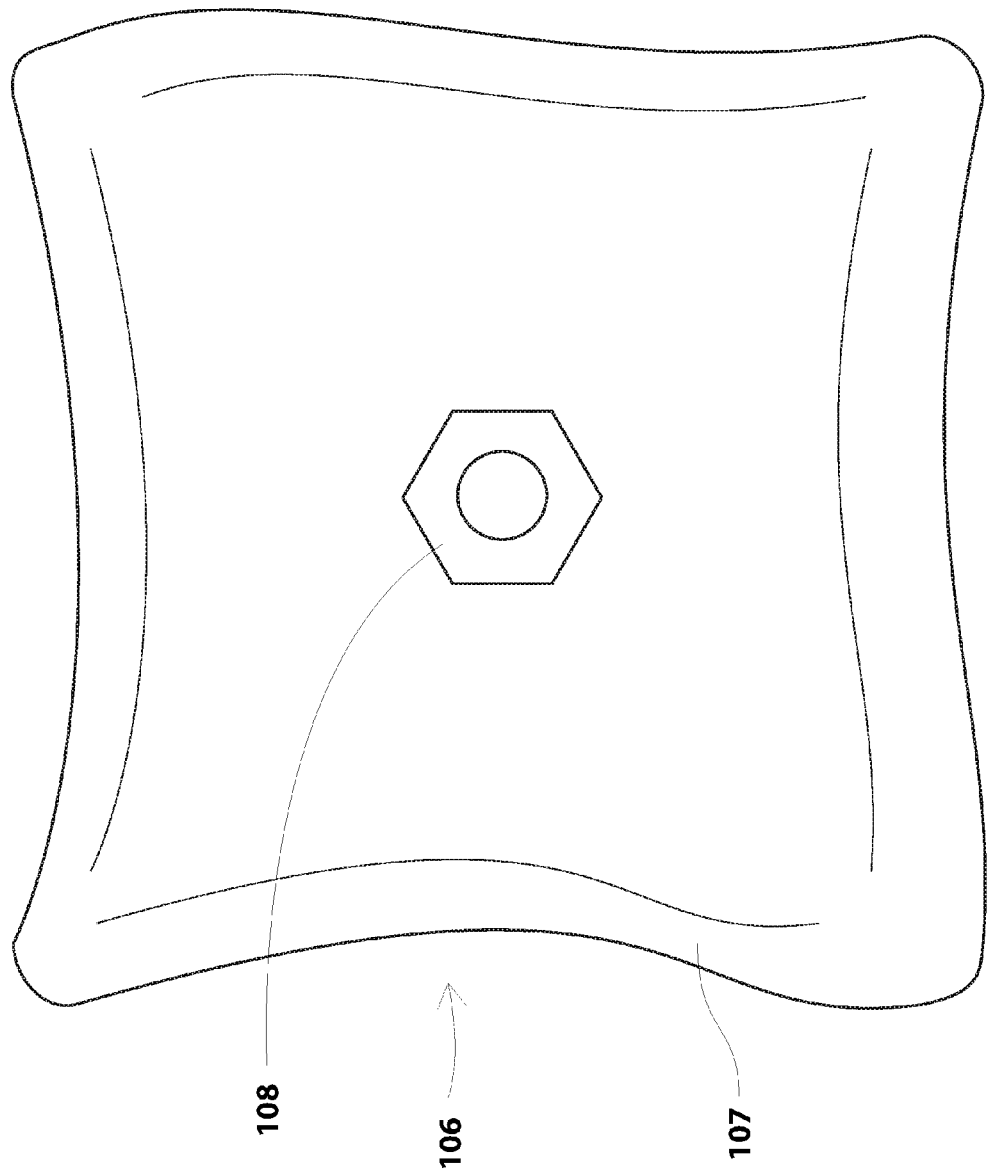

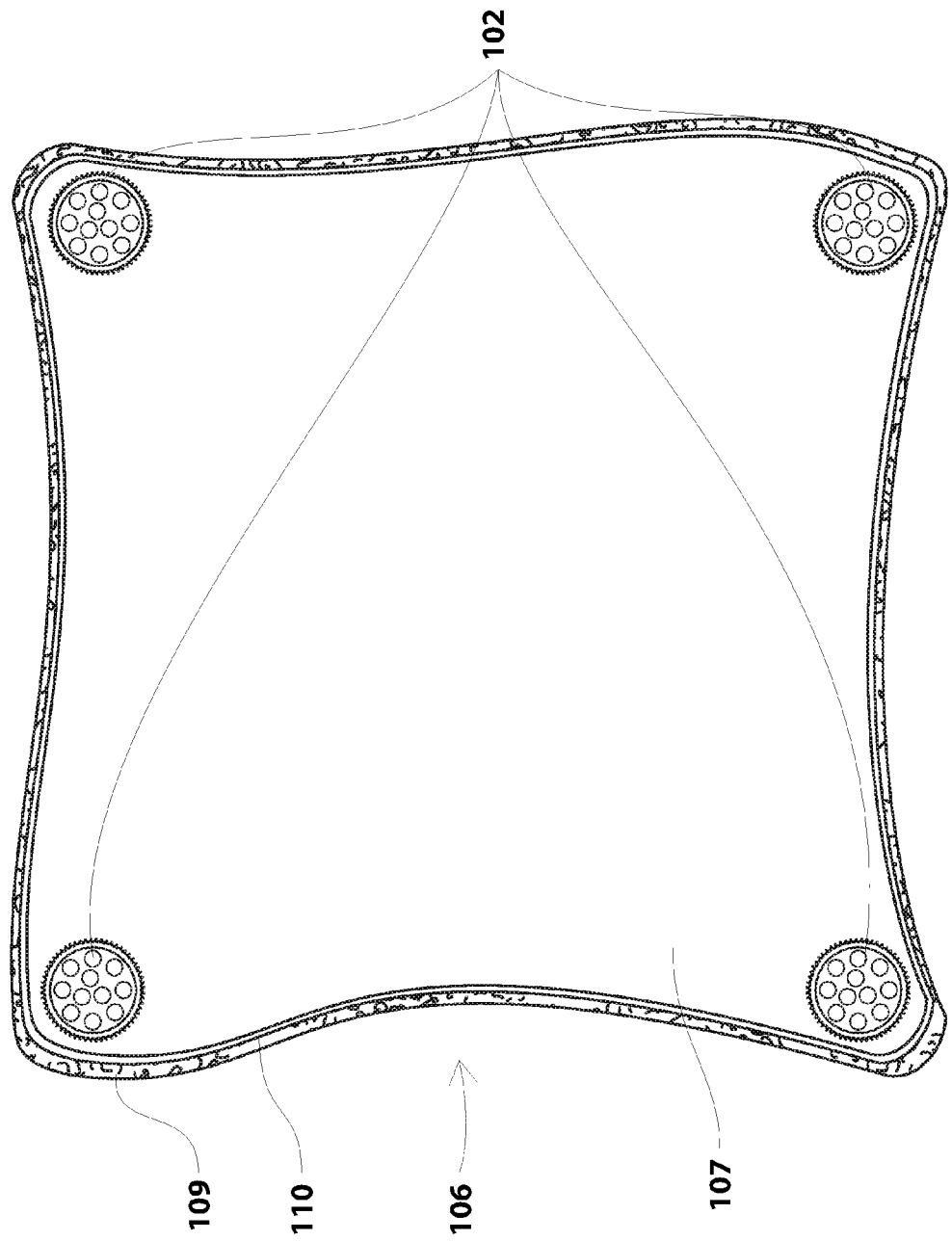

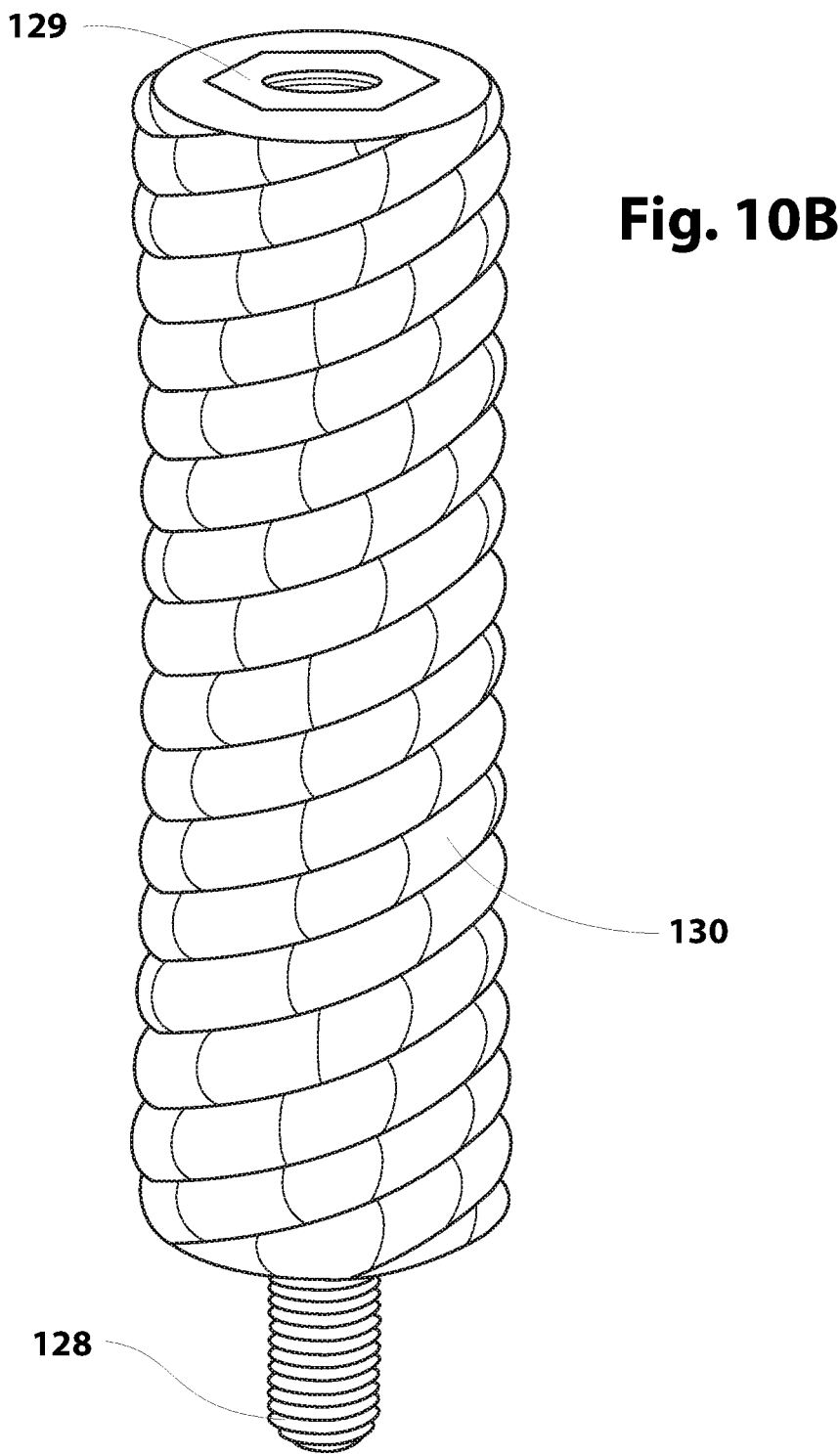

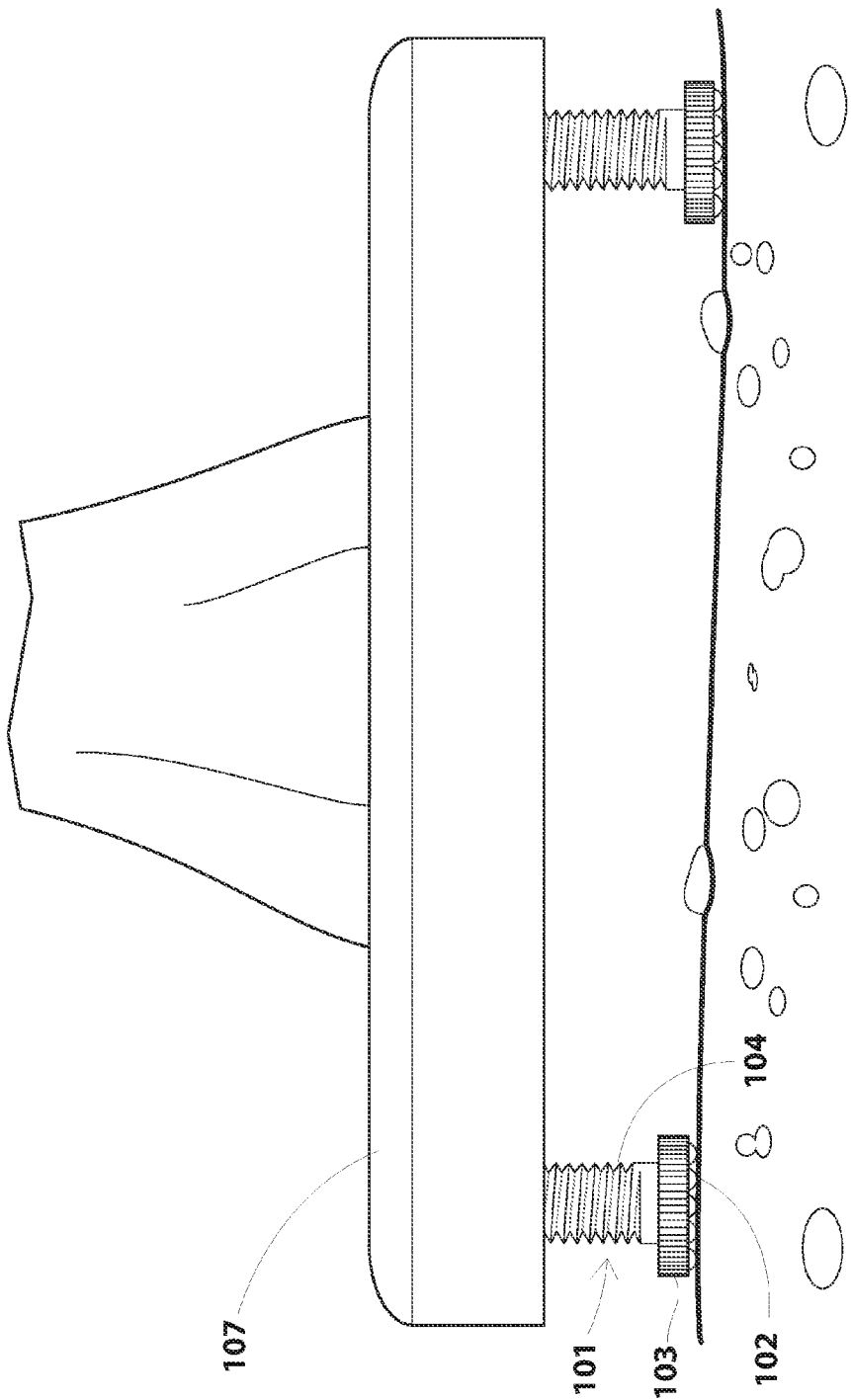

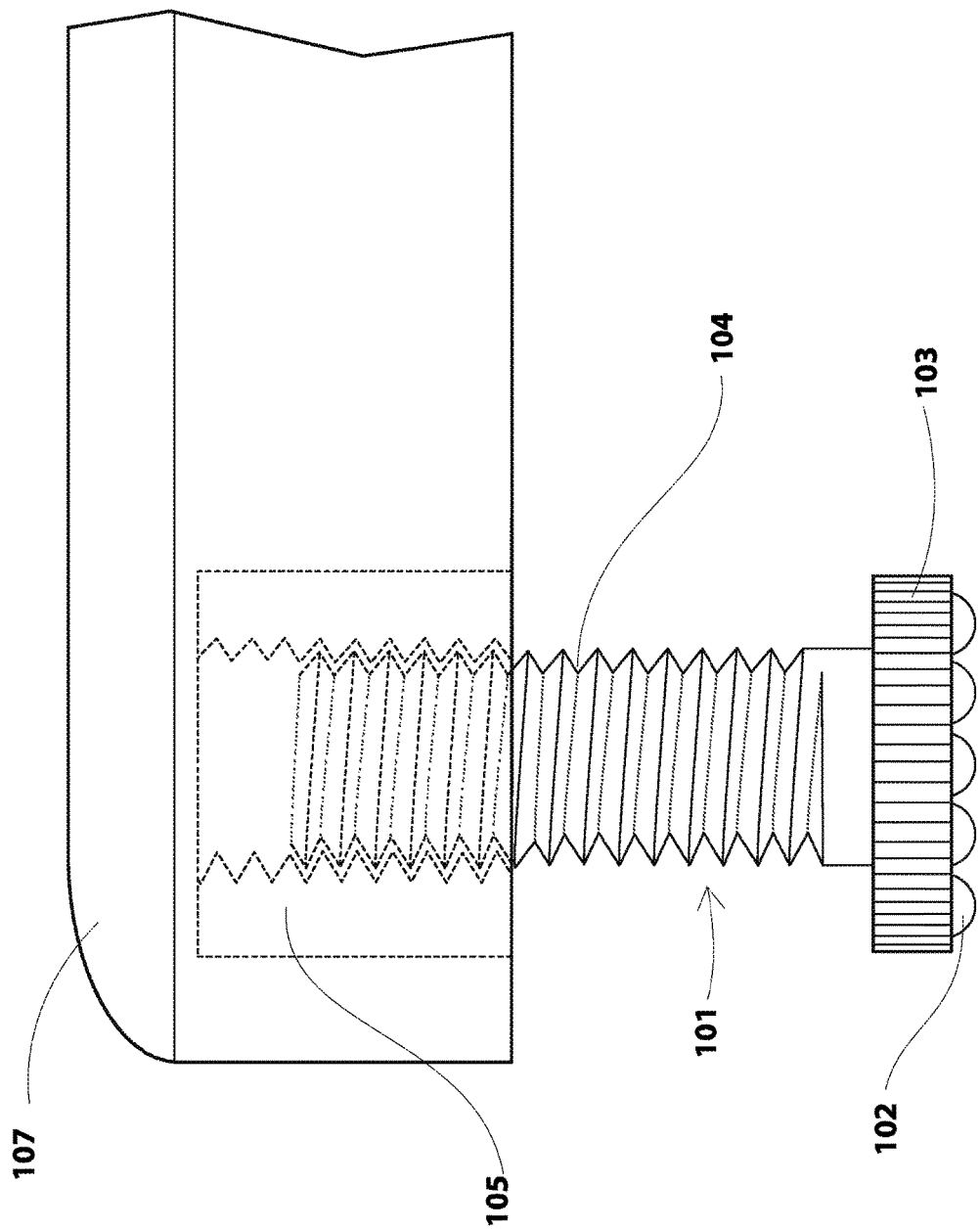

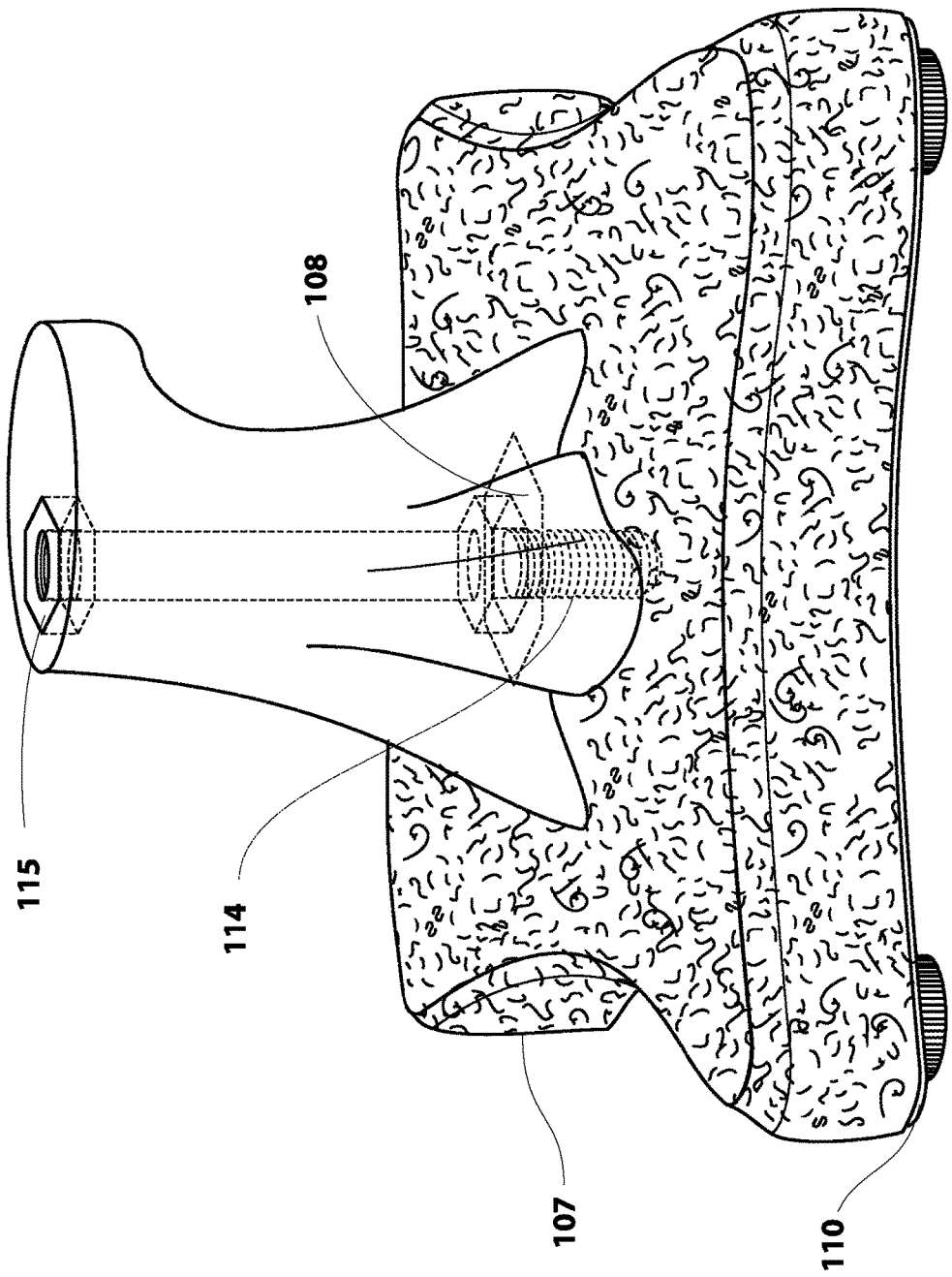

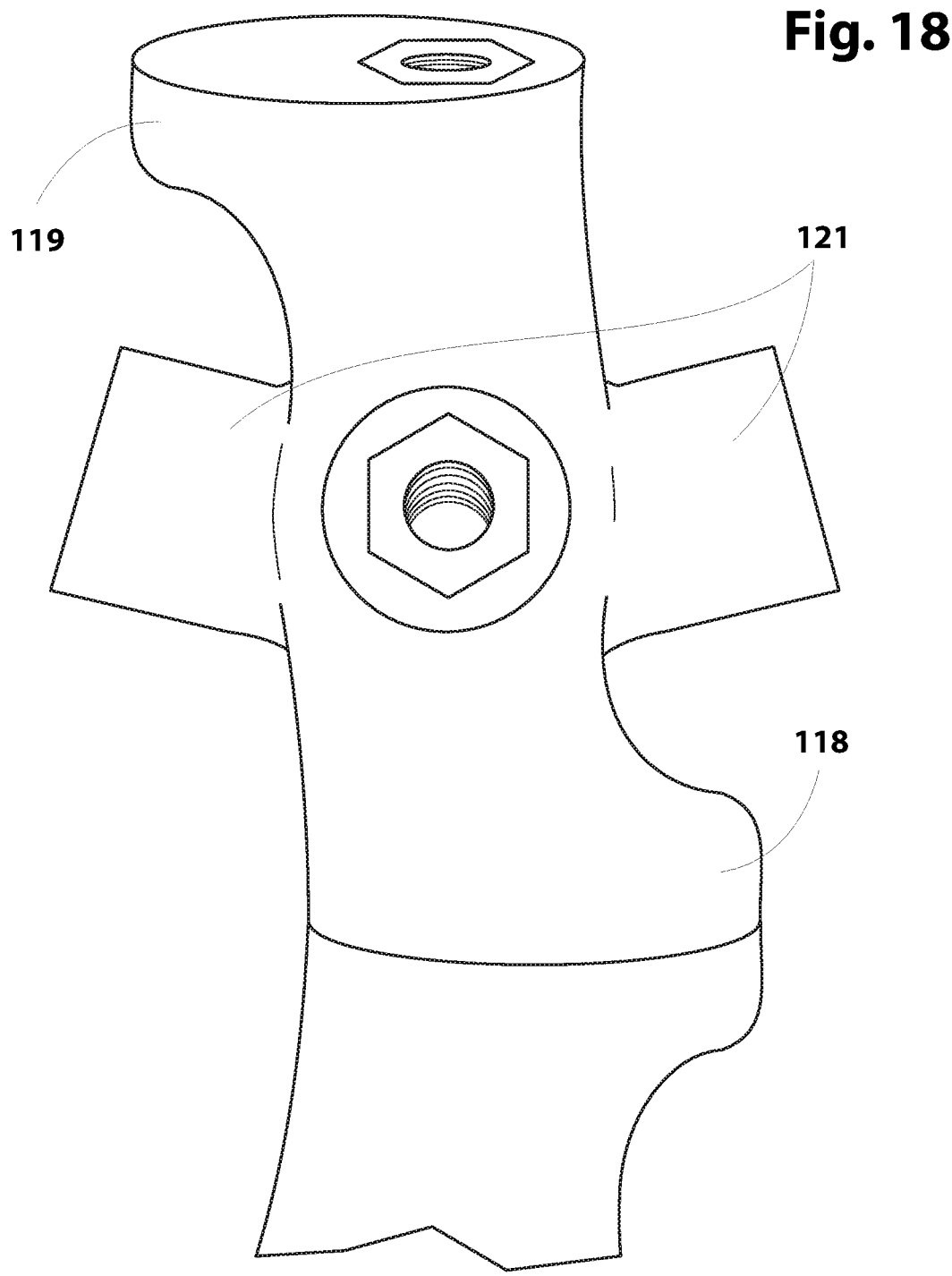

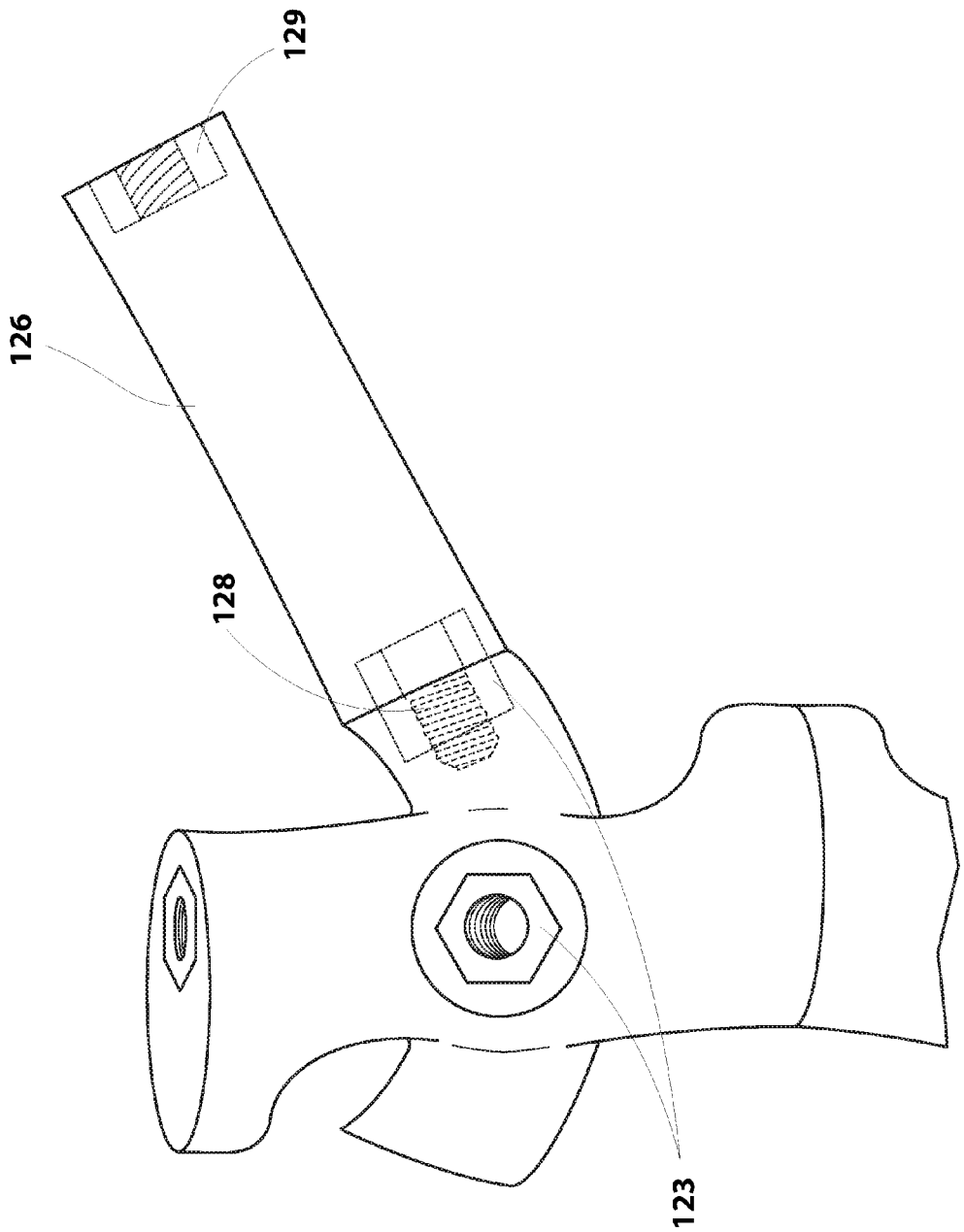

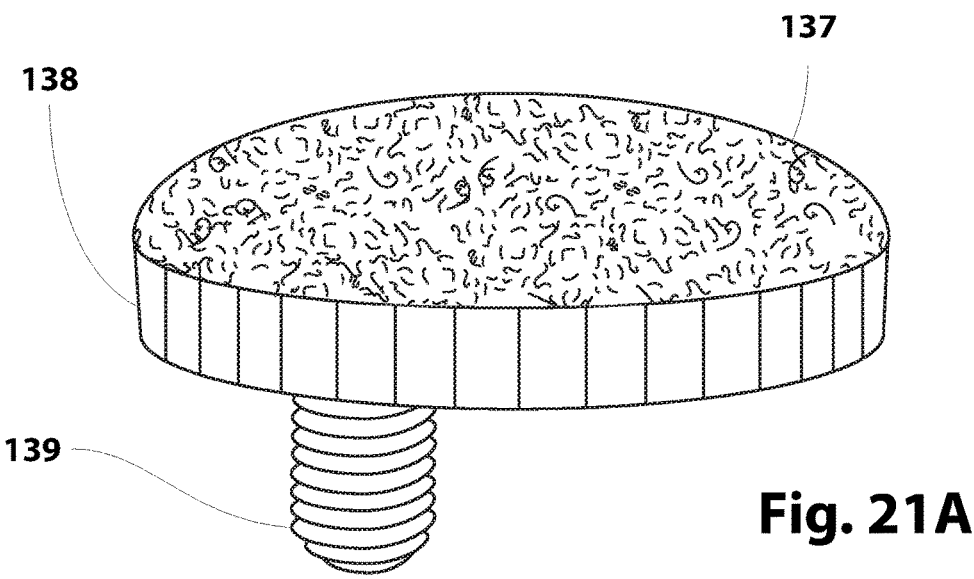
Fig. 21A
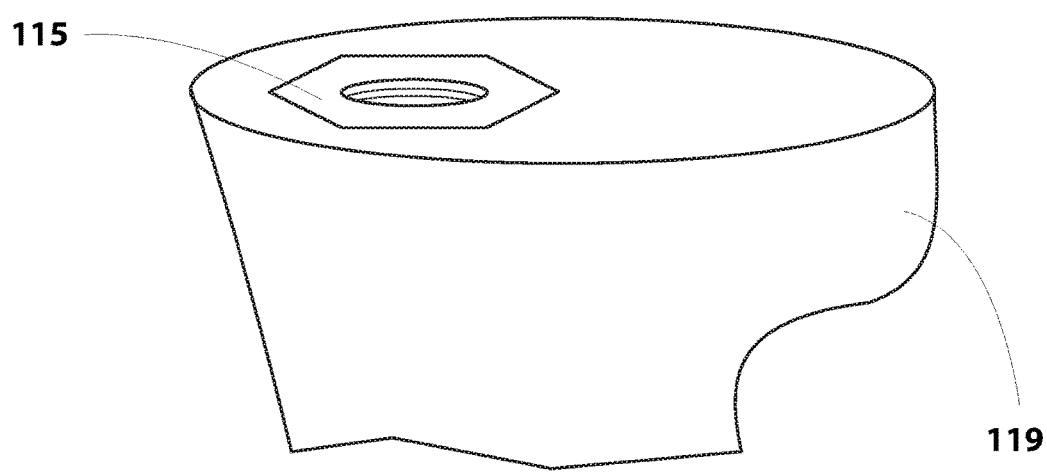

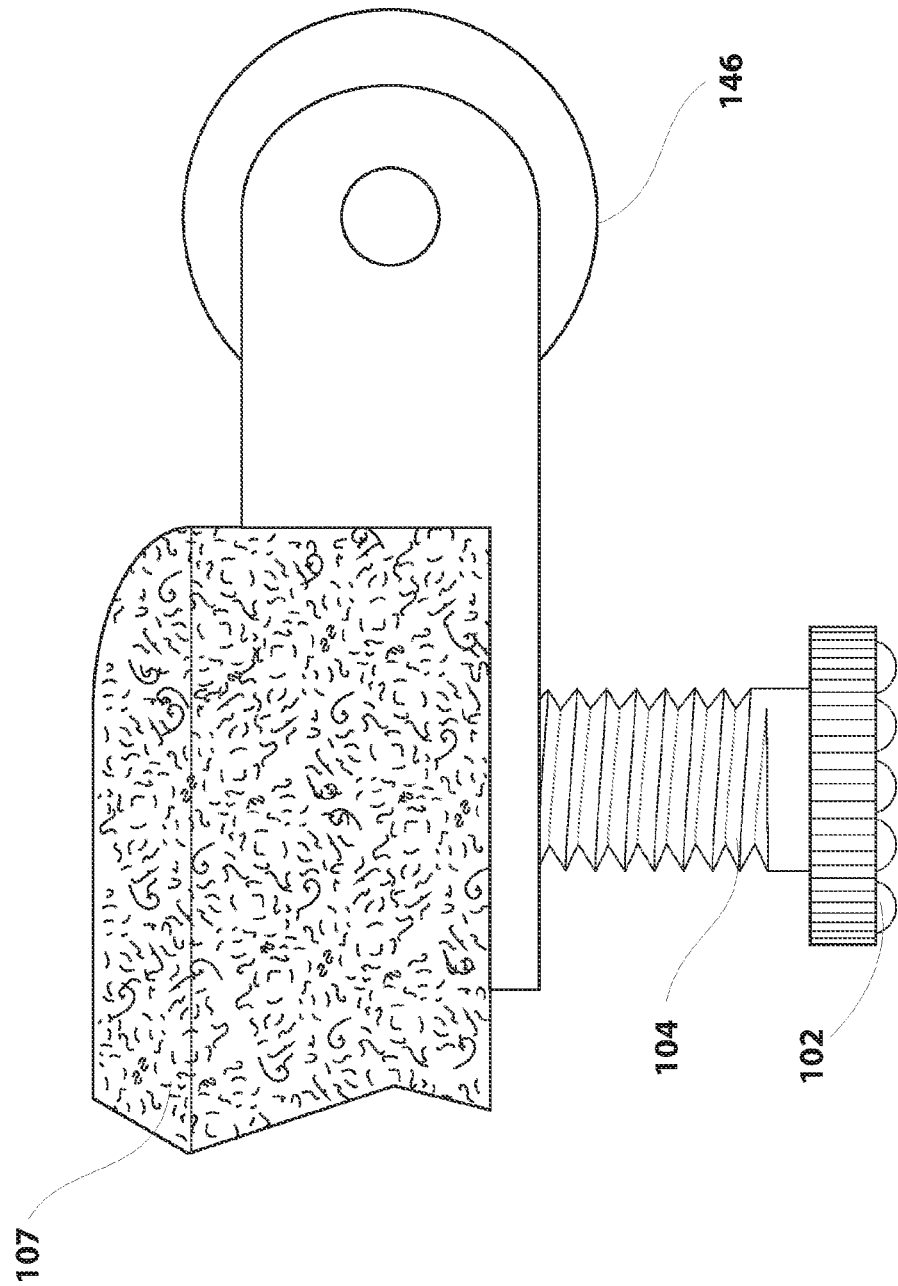

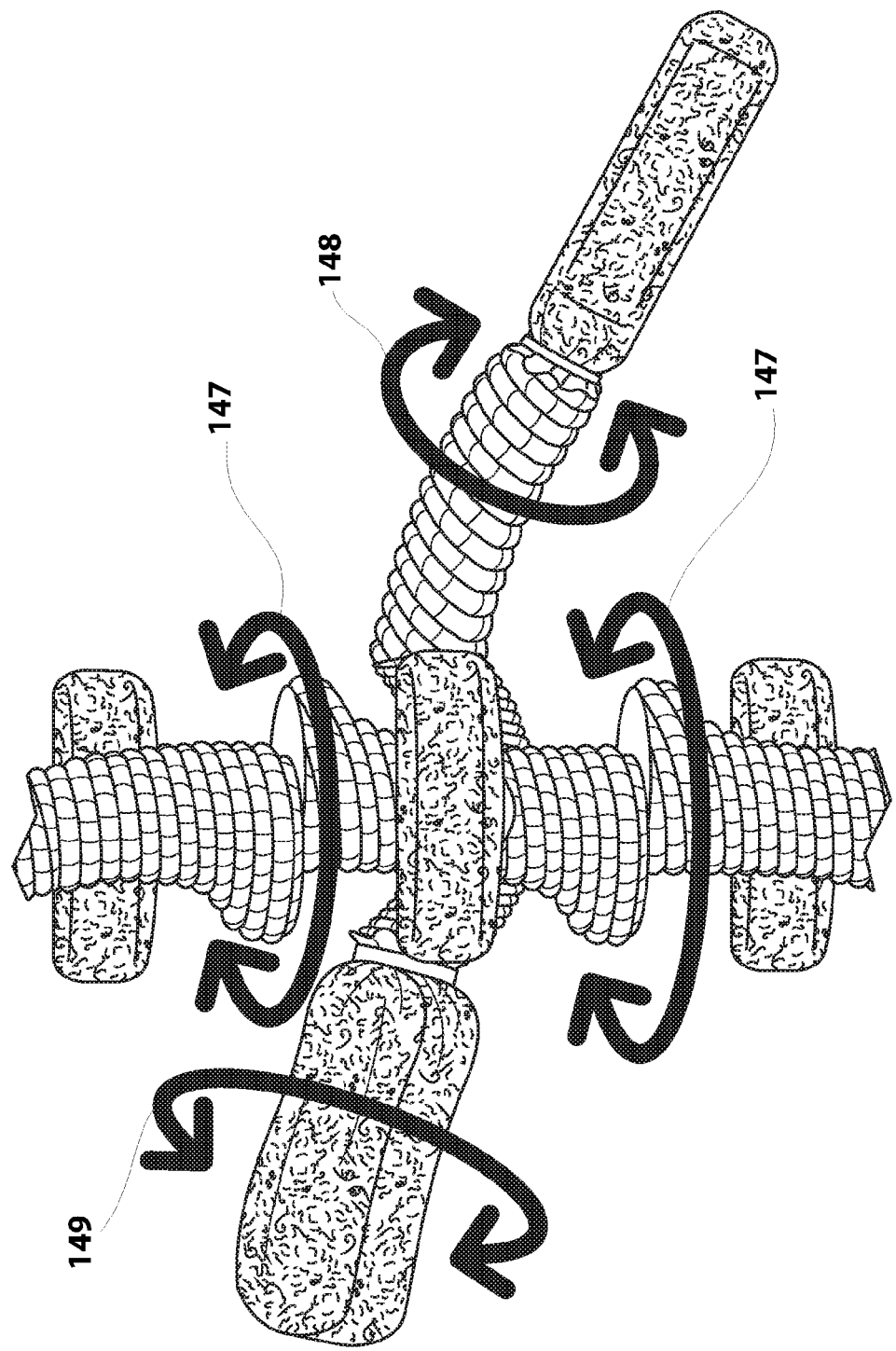

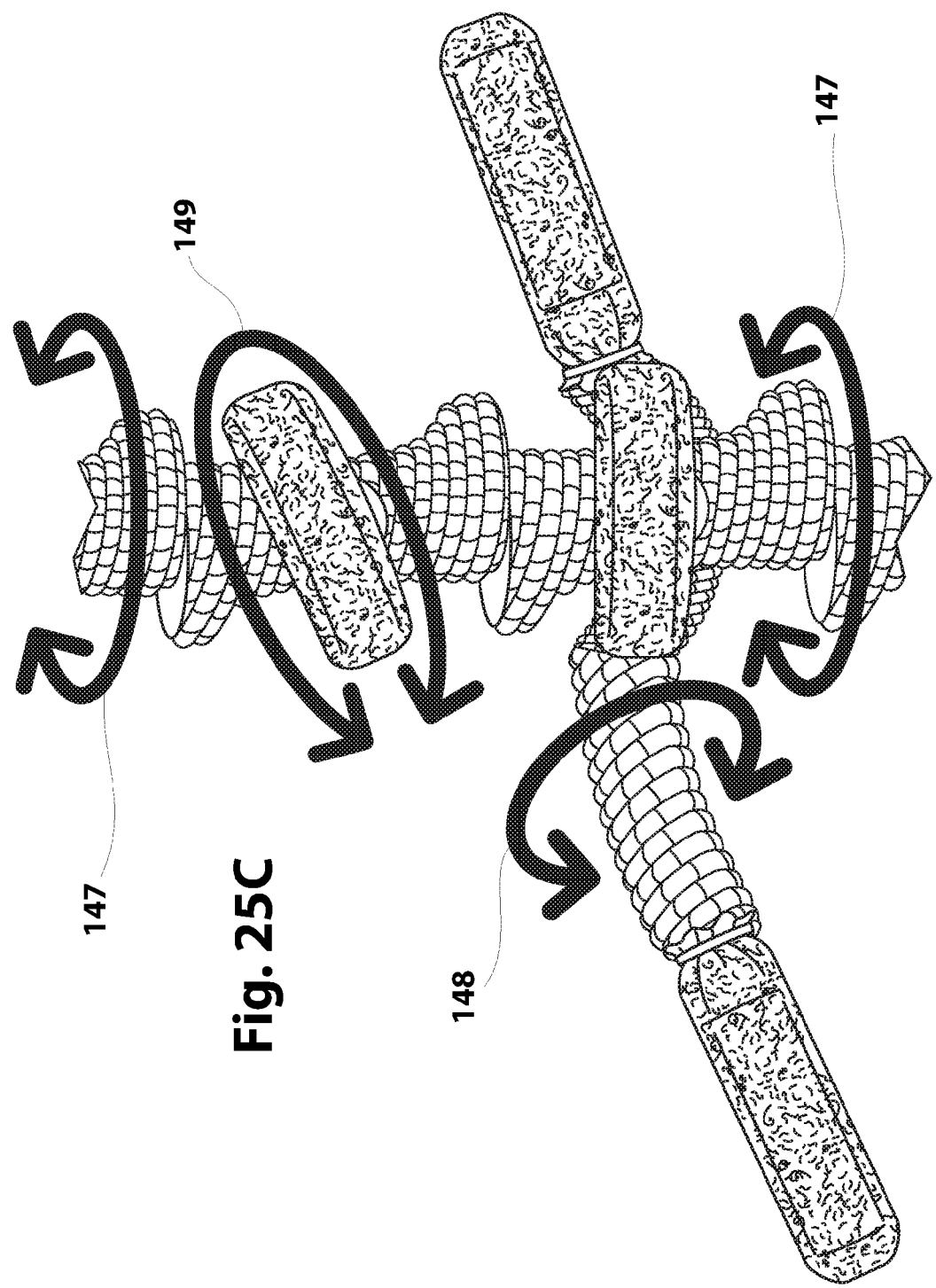

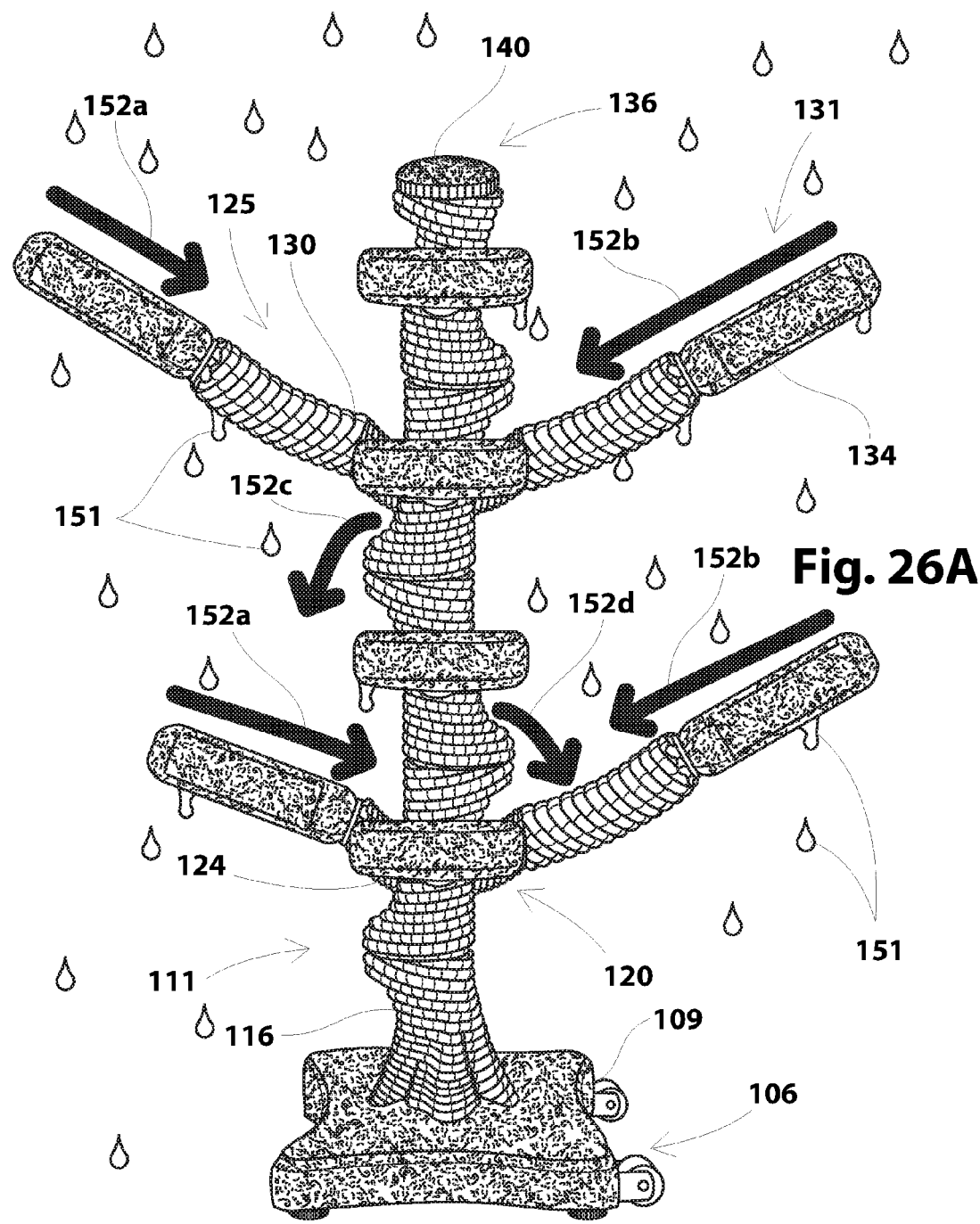

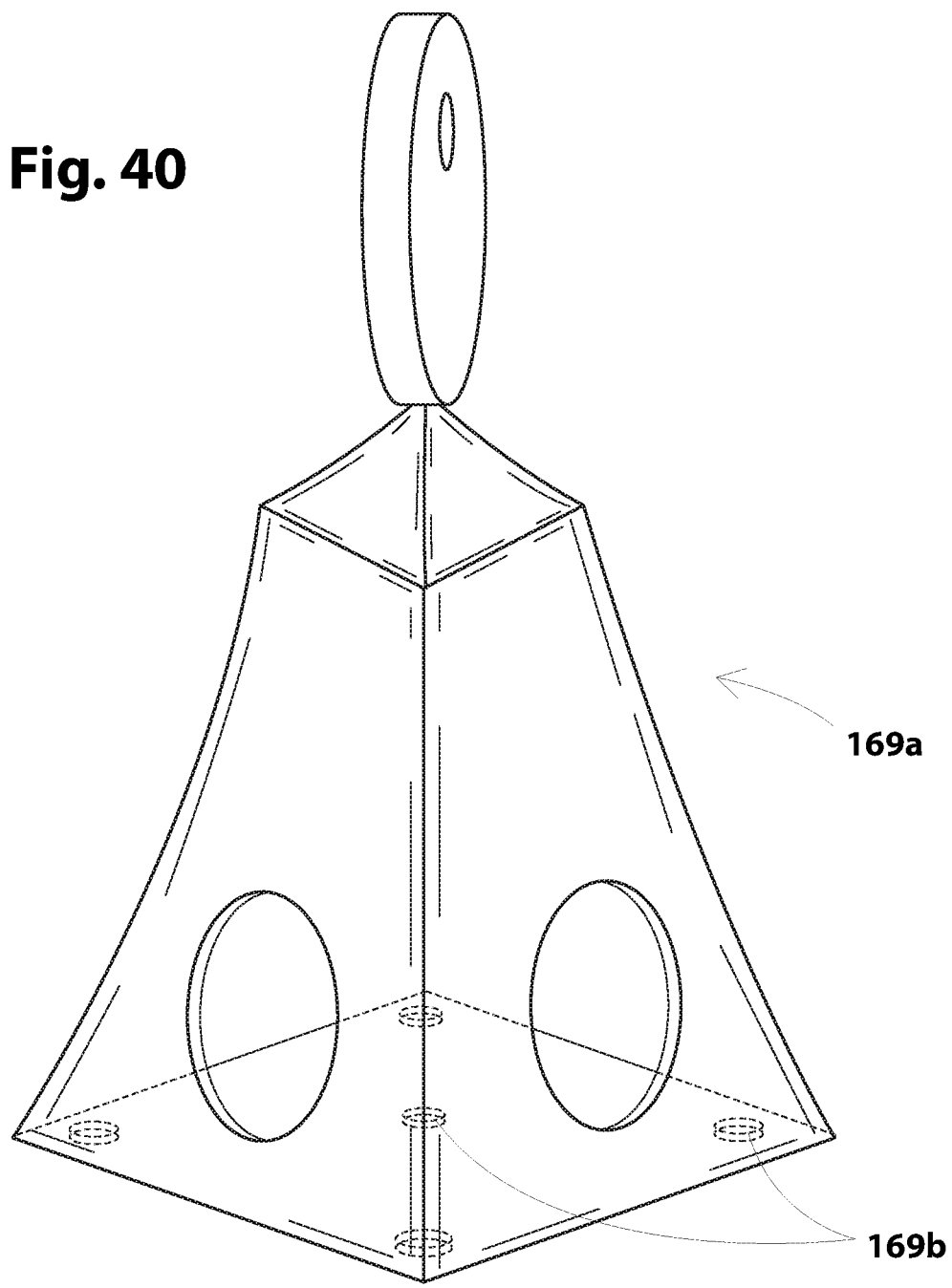

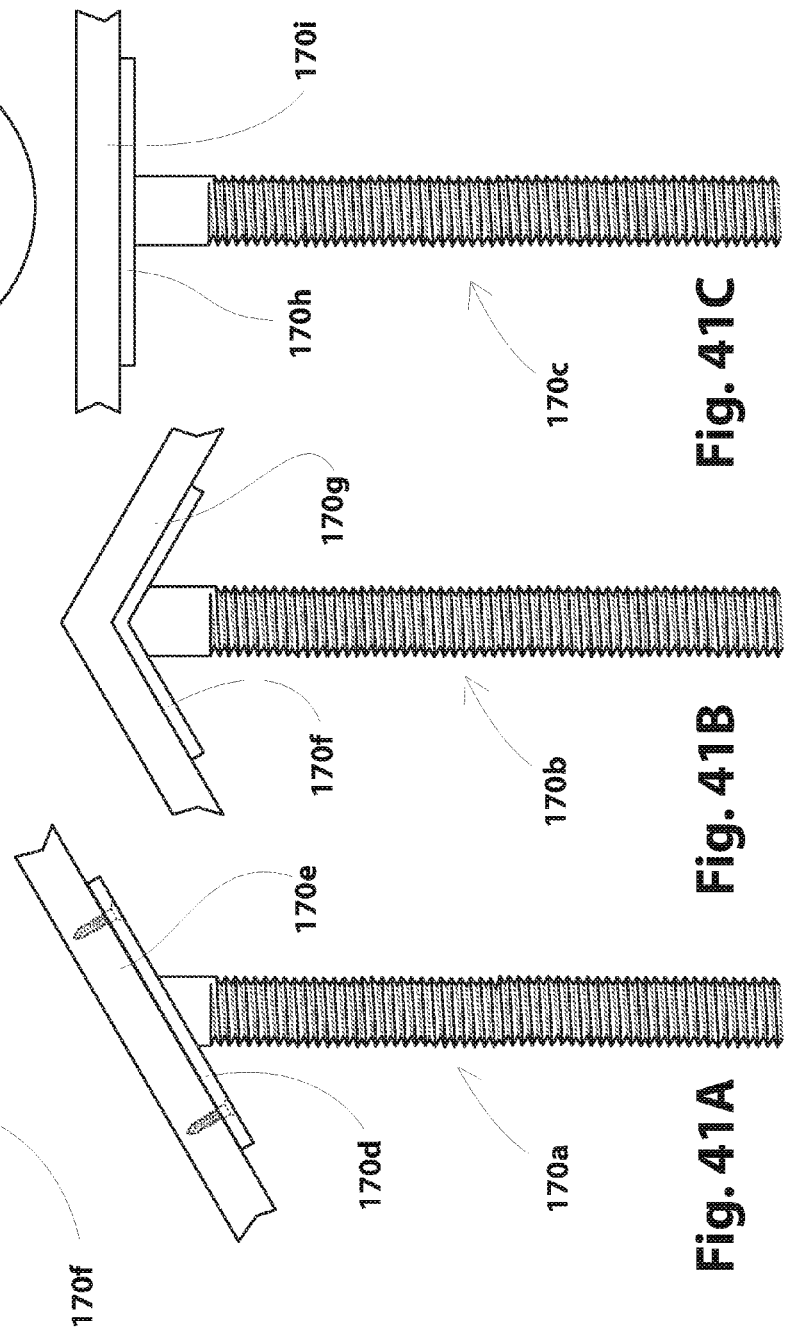

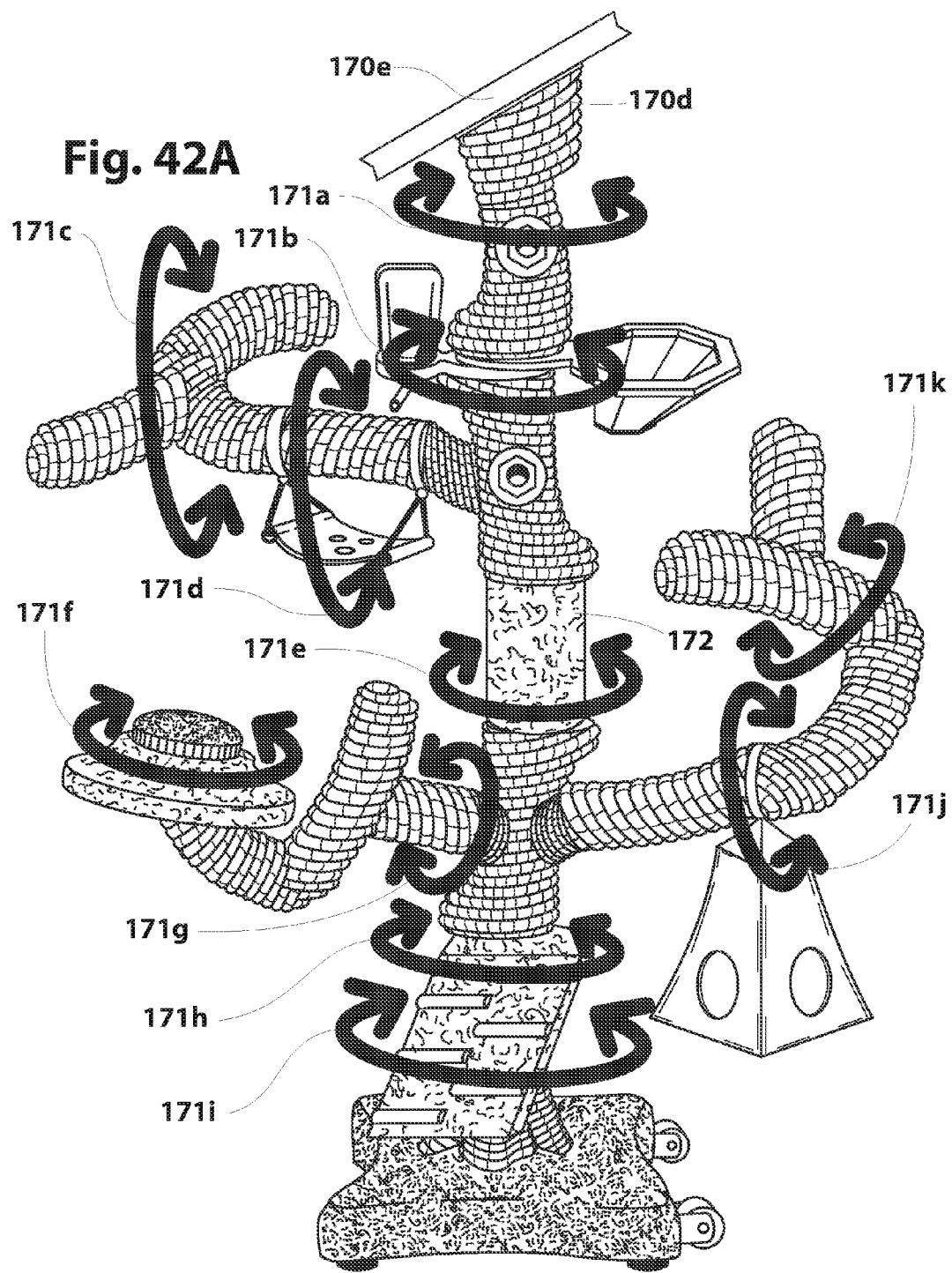

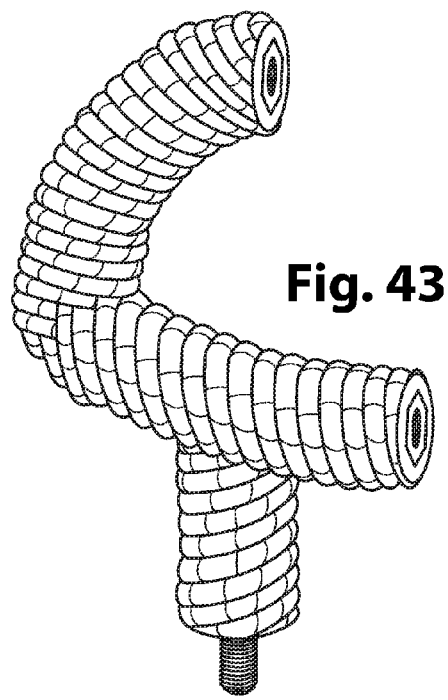
Fig. 43A
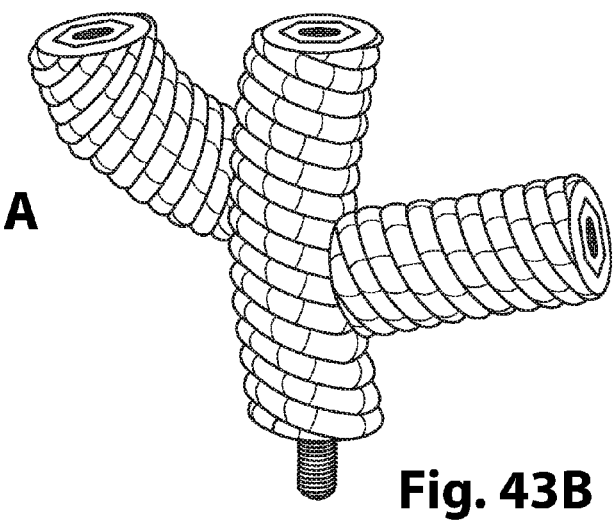
Fig. 43B
Fig. 43C
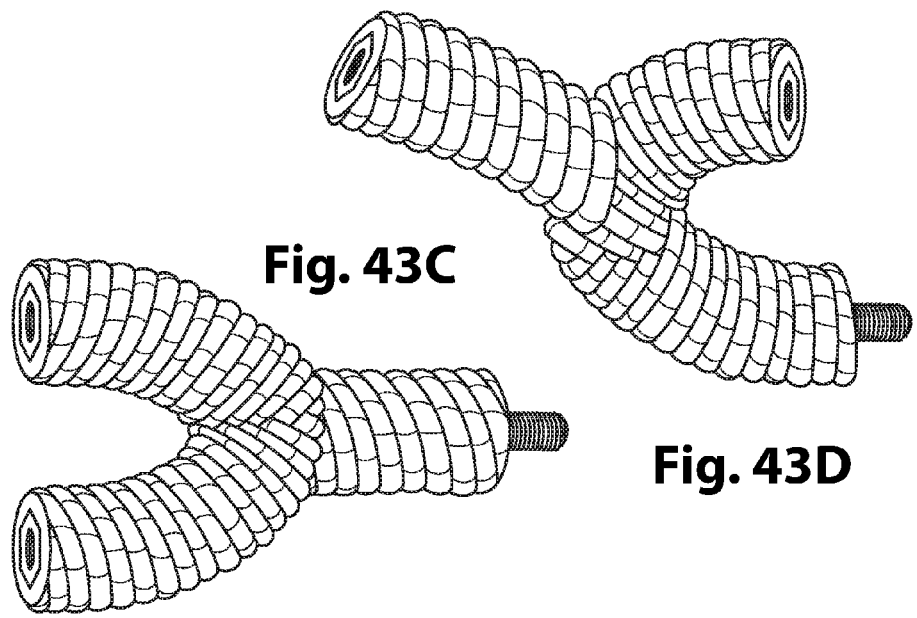
Fig. 43D

SHAPE-SHIFTING SELF-DRAINING INDOOR-OUTDOOR EXERCISE PET TREE, HAVING ROTATABLE SLANTING LOGS, ROTATABLE SLANTING STEPS, ROTATABLE SLANTING BRANCHES, ROTATABLE SLANTING HOUSES, ROTATABLE SLANTING ACCESSORIES, AND ROTATABLE SLANTING WHEELS

REFERENCE TO PREVIOUSLY FILED PROVISIONAL PATENT APPLICATION

Provisional Patent Application No. 62/255,522 was filed on Nov. 15, 2015.

FIELD OF THE INVENTION

The present invention relates to a pet tree or animal tree for multiple animals (at the same time) to play, exercise, perch, rest, sleep, move around thereon or therein. Particularly, the present invention relates to a unique shape-shifting self-draining water-repelling hygienic indoor-outdoor slanting pet tree system, which has:
  a) Individually-adjustable-height self-draining rotatable slanting leg system;
  b) Individually-adjustable-corner self-draining rotatable slanting pedestal system;
  c) Shape-shifting self-draining rotatable slanting log system;
  d) Shape-shifting self-draining rotatable slanting step system;
  e) Shape-shifting self-draining rotatable slanting connector system;
  f) Shape-shifting self-draining rotatable slanting branch system;
  g) Water-repelling self-draining rotatable slanting hygienic platform system;
  h) Water-repelling self-draining rotatable slanting hygienic cap system;
  i) Self-draining rotatable slanting L-bracket wheel system;
  j) Replaceable covering system;
  k) Quick-and-easy-assembly and quick-and-easy-disassembly capabilities for quick, easy, and convenient transportation, and storage; and
  l) Quick-and-easy-assembly and quick-and-easy-disassembly capabilities of all the components of any shape and size,
    for allowing a user to build his/her own shape and design of the slanting pet tree system.

DESCRIPTION OF THE PRIOR ART

A variety of pet trees have been introduced.

U.S. Pat. No. 2,894,487, issued 1959 Jul. 14, to Marvin Goldson, relates to an improved scratch post for cats and other household pets, and one of its objects is to provide a scratch post with a base on which a pile of fabric is mounted with means for detaching a used fabric covering and replacing the post with a fresh fabric covering consisting of a pre-constructed sleeve of canvas, carpeting and so forth, and an inner cushioning material to provide traction and support.

U.S. Pat. No. 3,595,209, issued 1971 Jul. 27, to Paul A. Parker, describes a household cat play and exercise post assembly of a knockdown nature which is adapted to be assembled in a stationary vertical floor to ceiling position in a room and is composed of separable wooden post sections joined in end-to-end contact by interfitting removable dowels and horizontal platforms anchored by the dowels at selected joints between the post sections that extend from a floor-engaging baseplate to a ceiling engaging top plate attached to the uppermost post section by a spring-biased dowel.

U.S. Pat. No. 4,177,763, issued 1979 Dec. 11, to Weldon R. Cook, outlines a scratching post assembly for cats, and other pets, which comprises an upright elongated post, covered with carpeting, or equivalent material, and which is detachably mounted on a base which, likewise, may be covered with carpeting, or equivalent material. The post is readily demountable from the base, and the base is formed of two hinged sections which may be folded against one another, so that the assembly may be packaged to occupy minimal space for shipping and display in retail outlets.

U.S. Pat. No. 4,803,952, issued 1989 Feb. 14, to David B. Houser, pertains to a portable shelter for small animals such as cats. The shelter is formed in modular assemblies which are readily assembled into a two story condominium having segregated toilet, resting and watching areas. The shelter provides unique territory and positive psychological reinforcement for the pet.

U.S. Pat. No. 5,275,128, issued 1994 Jan. 4, to Stephen H. Barnes, relates to an easily transportable roll up cat scratching pad with, flanges, for securing the ends to the top and bottom of a door. A flexible base member provides rollup ability and vertical support for extended horizontal pet resting or exercising platforms. The platforms include tubular tunnels and flat ledges. A frontal strap extends vertically across the apparatus for further vertical support. Carpeting may be used to cover all or part of the apparatus. Attachment devices at the top and bottom of the pad allow it to be secured to the top and bottom of structures e.g. doors.

U.S. Pat. No. 5,713,306, issued 1998 Feb. 3, to Arnold B. Johnson, defines a feline playground system with scratching, climbing, resting, playing, sleeping and observation facilities that can be easily erected or disassembled. The main assembly includes several sections and sizes of cylindrical shapes that are attached end to end via threaded internal fasteners. Once the sections are fully assembled a drop-in pressure maintaining device that is preassembled is installed at the top end together with a mobile multiple toy holder. The full assembly when installed between the floor and ceiling of a room is self-supporting and is afforded stability via the pressure derived from the pressure maintaining device.

U.S. Pat. No. 5,791,293, issued 1998 Aug. 11, to Melaney L. Northrop, relates to an animal shelter with a top shell that is shaped to resemble a natural object having an irregular surface, such as a tree stump that will blend into a natural setting. An extended floor may be attached to the base, and an extended covering may be attached to the top resembling an extension of the natural object, thus further enhancing the appearance of the animal shelter. A planter, removably seated upon the top, may be used to cultivate plants.

U.S. Pat. No. 6,152,553, issued 2000 Nov. 28, to Dale N. Wunderlich, outlines a system of modular furniture construction which includes corner posts, intermediate posts, and a corner leg converter post, which each have longitudinal slots to receive panels and a rows of equally spaced holes for retaining fasteners that hold shelves in place. Vertical bores in each end of the posts allow connecting rods to couple two or more posts vertically together. Different types of furniture may be readily assembled from these elements, including, desks, computer work stations, open shelves, entertainment centers, and so forth.

U.S. Pat. No. 6,431,119, issued 2002 Aug. 13, to Cyndi M. Beymer, describes a multi-purpose cat structure having a stored mode and a use mode which includes a hollow base with a first opening in one of four side walls and a door movable between an open position for inserting and removing a litter box and a closed position in which the first opening is substantially closed. The hollow base has a second opening for the ingress and egress of a cat or the like. A pair of vertical walls are removably attached to an upper surface of the base and an enclosed sleeping/play area, with an ingress and egress opening.

U.S. Pat. No. 6,886,495, issued 2005 May 3, to Walter G. Madden, relates to a modular, multi-level pet housing that comprises a plurality of multi-sided boxes. A plurality of tubular columns of a first length generally less than the height of the side walls and a plurality of tubular columns of a second length generally longer than the height of the side walls may be joined to each other by a coupling member. The top and bottom of each box has a hole at each corner that is sized to permit a tubular member to fit therethrough, but to prevent a sleeve member from fitting therethrough.

U.S. Pat. No. 6,892,675, issued 2005 May 17, to Paul H. Comerford, defines a cat toy for occupying a cat or functioning as a hunting decoy and includes a support structure, a motor assembly, an elongated member having a proximal end connected to the motor and a distal end disposed radially outwardly from the central axis, and an object connected to the distal end by a flexible line. The motor rotates the elongated member, thereby moving the object about the central axis of the support structure, preferably with haphazard, unpredictable movement that a cat finds enticing.

U.S. Pat. No. 7,037,170, issued 2006 May 2, to Jonathan M. Pacella, outlines a toy accessory which includes an arch and a connector attached to each end of the arch. The connector attaches to either of a top rail of a juvenile product and an edge of a play mat. The connector includes an arch connection portion configured to connect to the respective end of the arch and also includes a receiving portion configured to receive either of the top rail of the juvenile product and the edge of the play mat.

U.S. Pat. No. 7,040,053, issued 2006 May 9, to Brian Charles Beesley, pertains to a tiered planter apparatus for use with posts which includes a base section that is adapted to be placed on the ground and around a post. A plurality of stackable members are placed on top of the base section or on top of other stackable members. A plant support member to receive a plant, or a pot is attached to an arm which is attached to the stackable member or base section. Each plant support member is disposed at a different elevation and at a preferred radial position with respect to a plant support member that is disposed above or below it.

U.S. Pat. No. 7,040,585, issued 2006 May 9, to Huang-Yi Cheng, relates to a detachable toys bracing bracket for mounting on a playpen or a play pad. It includes a central pivot dock that has a first anchor section and a second anchor section to couple with a plurality of connection rods. Each of the connection rods is coupled with an elastic element so that the connection rods may be easily pulled and extended for mounting on the playpen or play pad, or be folded easily to facilitate carrying and storing, and to enhance safety.

U.S. Pat. No. 7,376,993, issued 2008 May 27, to Peter J. Myers, discloses a play gyms and methods of operating the same. A disclosed example includes a floor mat dimensioned to be positioned within a play yard and/or a bassinet. It also includes a play gym to suspend an object above the mat when the mat is positioned in the play yard and/or the bassinet, and at least one connector to couple the play gym to the mat when the mat is removed from the play gym and/or the bassinet.

U.S. Pat. No. 7,770,540, issued 2010 Aug. 10, to Eric Lee Halpern, defines a collapsible and scaleable floor to ceiling post forming an exercise and perch system for domestic cats using integral platforms that function as steps and perching areas. The post may be adjusted to different ceiling heights by adding or removing interchangeable sections and provides fine adjustment with a telescopic section that is spring biased to limit forces on the ceiling.

U.S. Pat. No. 7,832,361, issued 2010 Nov. 16, to Tracey Stevens, pertains to a system for climbing pets, particularly cats, featuring an expandable rod and an array of wall supports, platforms and accessories. The expandable rod is the only direct connection to a wall while the wall supports are suspended from the expandable rod and the platforms are secured to the wall supports. Accessories such as toys and food/water bowls may be snapped into place on the platform. The platforms can be at various elevations so that a cat can play, sleep, eat, and scratch in a secure and designated environment.

U.S. Pat. No. 8,020,518, issued 2011 Sep. 20, to Colleen Reinke, features a multi-configuration small animal play structure for use in displaying items in a home, retail establishment or a trade show. The structure includes a base member, a plurality of cylindrical tubular spacers, a plurality of shelf members and walls, all of which can be threadably connected in a configuration desired by the user.

U.S. Pat. No. 8,505,239, issued 2013 Aug. 13, to Hugh L. Tompkins, IV, describes a pet toy device for holding objects that are attractive to the senses of animals, including a protective enclosure for a live catnip plant; which cage includes a plurality of bars to restrict access to the interior and direct contact with the object while allowing liquid, air, and light to pass through the bars to sustain the plant life and allowing the plant to grow through the bars to the exterior of the device for access by the cat.

U.S. Pat. No. 8,695,533, issued 2014 Apr. 15, to Leesa Ann Mulligan, presents a modular cat station comprising a plurality of spaced apart, removably connected platforms disposed at different heights relative to a connected base plate, with camouflaging elements representative of leaves, branches, flowers, twigs, and/or other parts of a tree or other plant life.

U.S. Pat. No. 8,776,727, issued 2014 Jul. 15, to Kathryn Nelligan, discloses a multiple use modular apparatus for animals having a tower and a base that is light weight, easily assembled and reconfigured, and ballast inside the tower and base to stabilize the apparatus. The tower is inserted into the base in a very snug interference fit, and the tower has tiers of rows of recesses around its periphery facing in different directions into which shelf pieces of different sizes and shapes are inserted.

U.S. Pat. No. 9,282,723, issued 2016 Mar. 15, to David Haaf, pertains to a cat scratching device for residing upon a substantially horizontal surface. The device includes three scratching posts each having first and second ends, the scratching posts being separated from one another at their first ends and joined at their second ends resulting in a three-legged self-supporting device.

U.S. Pat. No. D422,754, issued 2000 Apr. 11, to Kevin Kolozsvari, features an ornamental design for a pet tower.

U.S. Publication No. 20030221628, published 2003 Dec. 4, to Sylvia Ann Leon, discloses a wall supported modular cat furniture structure comprising a number of interconnecting components such as vertical posts, horizontal platforms, and base coupling which are press-fitted together to form an upright structure characterized by a central support post to which platforms connect. The structure is positioned adjacent to a flat wall or a corner wall and platform edges are securely attached to the wall for stability. The structure, which satisfies the needs of cats to climb, scratch, and perch in elevated places, has carpet, sisal rope or other claw penetrable material covering exposed surfaces.

U.S. Publication No. 20050284407, published 2005 Dec. 29, to Monica DeRaspe-Bolles, describes a reconfigurable modular play structure for animals including a base, a plurality of cylindrical support members, and one or more platforms to support an animal. The cylindrical support members are helically wrapped with a plurality of flexible line wrappings, allowing different colors and types of wrappings to be used in combination. One or more of the platforms or an upper portion of the structure may be rotated on a rotating connection.

DISADVANTAGES OF THE PRIOR ART

The prior art have failed to solve many problems associated with such pet tree, as follows:
1) No prior art mention or disclose any pet tree, having
   shape-shifting self-draining 360-degree-rotatable condo system,
   shape-shifting self-draining 360-degree-rotatable log system,
   shape-shifting self-draining 360-degree-rotatable step system,
   shape-shifting self-draining 360-degree-rotatable connector system,
   shape-shifting self-draining 360-degree-rotatable branch system,
   shape-shifting self-draining 360-degree-rotatable platform system,
   shape-shifting self-draining 360-degree-rotatable hammock system,
   shape-shifting self-draining 360-degree-rotatable feeding bow system,
   shape-shifting self-draining 360-degree-rotatable water-bottle system, and
   shape-shifting self-draining 360-degree-rotatable exercise rope system,
   Therefore, the prior art of pet tree:
   a) Can not allow gravitational force and kinetic force of water (from a hose, spraying into the inside of the prior art of pet tree and weighing on its components, appendages, attachments, and accessories) to shift and rotate its components, appendages, attachments, and accessories to shift their positions
      to create new shapes and designs of the prior art of pet tree and its components, appendages, attachments, and accessories;
   b) Can not allow gravitational force and kinetic force of water (from rain, pouring down on its components, appendages, attachments, and accessories) to shift and rotate its components, appendages, attachments, and accessories to shift their positions
      to create new shapes and designs of the prior art of pet tree and its components, appendages, attachments, and accessories;
   c) Can not allow gravitational force and kinetic force of wind (from air movement, blowing on its components, appendages, attachments, and accessories) to shift and rotate its components, appendages, attachments, and accessories to shift their positions
      to create new shapes and designs of the prior art of pet tree and its components, appendages, attachments, and accessories;
   d) Can not allow human force (from a user, manually rotating its components, appendages, attachments, and accessories) to shift and rotate its components, appendages, attachments, and accessories to shift their positions
      to create new shapes and designs of the prior art of pet tree and its components, appendages, attachments, and accessories;
   e) Can not allow gravitational force and kinetic force (from an animal, climbing into the inside of the prior art of pet tree and weighing on its components, appendages, attachments, and accessories) to shift and rotate its components, appendages, attachments, and accessories to shift their positions
      to create new shapes and designs of the prior art of pet tree and its components, appendages, attachments, and accessories.
2) No prior art mention or disclose any pet tree, having individually-adjustable-height self-draining rotatable slanting leg system.
   Therefore, the prior art of pet tree:
   a) Can not provide a frictional grip where the legs come in contact with the ground
      to reduce horizontal slipping or sliding across the ground surface;
   b) Can not be easily vertically elevated
      to provide a level pedestal base on various uneven surfaces;
   c) Can not be easily vertically lowered
      to provide a level pedestal base on various uneven surfaces;
   d) Can not be easily three-dimensionally adjusted
      to provide a level pedestal base on various uneven surfaces;
   e) Can not be easily three-dimensionally adjusted
      to provide a stable pedestal base on various uneven surfaces;
   f) Is not anti-sliding when pushed; and
   g) Is not quick and easy
      to adjust upward or downward.
3) No prior art mention or disclose any pet tree, having individually-adjustable-corner self-draining rotatable slanting pedestal system.
   Therefore, the prior art of pet tree:
   a) Can not be three-dimensionally adjusted
      to be level and stable;
   b) Can not provide a range of 360-degree-rotatable and various shape-shifting positions to all the components, appendages, attachments, and accessories of the prior art of pet tree, and to the prior art of pet tree (such that all of them remain functional),
      to provide numerous individualized shapes and configurations of the pet tree, based on individual owner preferences;
   c) Can not receive the screwed on attachment of at least one of the following appendages, a) Shape-shifting self-draining rotatable slanting log system, b) Shape-shifting-rotatable branch system, c) Shape-shifting self-draining rotatable slanting step system, d) Self-draining-hygienic-slanting-platform screw, and e) Rotatable slanting L-bracket wheel system
      to provide for quick assembly and disassembly (that does not require tools);

d) Can not receive the screwed on attachment of 360-degree-rotatable slanting L-bracket wheel system
to allow easy rolling transport and mobility of shape-shifting self-draining water-repelling hygienic indoor-outdoor slanting pet tree system;
e) Can not be assembled in numerous configurations;
f) Can not be assembled with infinite rotational positions;
g) Require tools to be assembled and disassembled; and
h) Require a lot of time to be assembled and disassembled.

4) No prior art mention or disclose any pet tree, having shape-shifting self-draining rotatable slanting log system. Therefore, the prior art of pet tree:
a) Can not quickly and easily be screwed together (without using any tools), to have a wide variety of trunk shapes and configurations; also providing a wide variety of pet climbing challenges;
b) Can not allow for quick and easy 360-degree rotation of each section to allow shape-shifting self-draining rotatable slanting branch system and water-repelling self-draining rotatable slanting hygienic platform system to be attached from any direction to better fit into various spaces, and to meet owner's individual wishes;
c) Can not easily receive and support branches, and platforms in numerous configurations
to provide support and allow individualized shape-shifting positioning of shape-shifting self-draining rotatable slanting step system, shape-shifting self-draining rotatable slanting branch system, and water-repelling self-draining rotatable slanting hygienic platform system to achieve a wide variety of configurations of the unique shape-shifting self-draining water-repelling hygienic indoor-outdoor slanting pet tree system;
d) Can not be dissembled and washed as separate sections in a tub or joined together and sprayed down with a hose
to promote cleanliness and eliminate odors;
e) Can not be covered with quick-drying, water-repelling hygienic material
to promote quick-drying;
f) Do not promote water-drainage;
g) Do not repel water;
h) Do not promote quick drying;
i) Do not provide traction for pets to climb on; and
j) Can not quickly and easily be assembled by hand (without using any tools).

5) No prior art mention or disclose any pet tree, having shape-shifting self-draining rotatable slanting step system. Therefore, the prior art of pet tree:
a) Can not provide weight-bearing 360-degree-rotatable steps
to aid and engage pets in climbing up, down, around, in, and out the prior art of pet tree;
b) Can not provide various climbing configurations, preferences, and difficulties
to add interest and challenge to pets in climbing up, down, around, in, and out the prior art of pet tree;
c) Do not provide traction and interest to aid pets in climbing activities.

6) No prior art mention or disclose any pet tree, having shape-shifting self-draining rotatable slanting connector system. Therefore, the prior art of pet tree:
a) Can not easily receive and support branches, and platforms in numerous configurations
to allow individualized positioning of shape-shifting self-draining rotatable slanting branch system, and water-repelling self-draining rotatable slanting hygienic platform system to achieve a wide variety of configurations of the unique shape-shifting self-draining water-repelling hygienic indoor-outdoor slanting pet tree system;
b) Can not easily receive and support shape-shifting self-draining rotatable slanting branch system, and water-repelling self-draining rotatable slanting hygienic platform system in a slanted position
to assist gravity in more efficient drainage of rain or wash water;
c) Require tools to be assembled and disassembled; and
d) Require a lot of time to be assembled and disassembled.

7) No prior art mention or disclose any pet tree, having shape-shifting self-draining rotatable slanting branch system. Therefore, the prior art of pet tree:
a) Can not receive and support platform or additional branch systems,
to extend length of branches and expand size of pet tree;
b) Can not support platform or additional branch systems,
to allow an indoor pet tree to have branch systems that extend out the window and;
c) Can not receive and support platform or additional branch systems,
to provide more climbing opportunities for pets;
d) Can not receive and support platform systems,
to provide a perch for pets;
e) Can not receive and support pet tree accessories such as slanting water bottle, perch, spinning wheel, hammock, bed, exercise rope, and feeder bowl,
to add variety, interest, and utility for pets;
f) Can not be dissembled and washed by sections in a tub or joined together and sprayed down with a hose
to promote cleanliness and eliminate odors;
g) Can not be covered with quick-drying, water-repelling hygienic material
to promote quick-drying;
h) Do not promote water-drainage;
i) Do not repel water;
j) Do not promote quick drying; and
k) Can not be connected in an unlimited number of shapes and sizes.

8) No prior art mention or disclose any pet tree, having water-repelling self-draining rotatable slanting hygienic platform system. Therefore, the prior art of pet tree:
a) Can not quickly and easily be screwed into branch or log system (no tool is needed)
to extend length of branches and expand size of pet tree;
b) Can not quickly and easily be screwed into branch or log system (no tool is needed)
to provide more climbing opportunities for pets;

c) Can not quickly and easily be screwed into branch or log system (no tool is needed)
   to provide a perch for pets;
d) Can not be dissembled (no tool is needed) and sections can be washed separately
   to promote cleanliness and eliminate odors;
e) Can not be covered with quick-drying, water-repelling hygienic platform cover that can be simply removed and washed separately
   to make it easier and more convenient for owner to maintain cleanliness and eliminate odors;
f) Do not promote water-drainage;
g) Do not repel water;
h) Do not promote quick drying; and
i) Do not provide traction for pets to climb on.

9) No prior art mention or disclose any pet tree, having water-repelling self-draining rotatable slanting hygienic cap system.
   Therefore, the prior art of pet tree:
   a) Can not quickly and easily cap off shape-shifting self-draining rotatable slanting log system
      to prevent water from entering;
   b) Do not promote water-drainage;
   c) Do not repel water;
   d) Do not promote quick drying; and
   e) Do not provide traction for pets to climb on.

10) No prior art mention or disclose any pet tree, having water-repelling self-draining rotatable slanting L-bracket wheel system.
    Therefore, the prior art of pet tree:
    a) Can not allow the prior art of pet tree
       to be rolled from place to place for convenient transport and mobility;
    b) Can not allow the prior art of pet tree
       to be used as an indoor system exclusively, or to be used as an outdoors system exclusively, or to be easily rolled from outdoors to indoors as the weather changes or for any other reason; and
    c) Can not allow the prior art of pet tree to be wheeled outdoors,
       to be sprayed down from top to bottom with the garden hose, thereby making it easier and more convenient to wash and keep sanitary, as well as looking and smelling cleaner.

11) No prior art mention or disclose any pet tree, having multiple additional capabilities.
    Therefore, the prior art of pet tree:
    a) Can not have one or multiple pet houses or pet condos attachable thereto and/or to each other with door openings and water-draining holes
       to allow pets to access one or more small pet houses (while staying inside the prior art of pet tree) which add interest and utility to the unique shape-shifting self-draining water-repelling hygienic indoor-outdoor slanting pet tree system;
    b) Can not have 360-degree-rotatable ladder system for pets
       to climb on, rest on, and enjoy;
    c) Can not have a ceiling connector
       to suspend the prior art of pet tree from ceiling, or to act as a stabilizer to the prior art of pet tree while the unique pet tree system is being attached to a foundation;
    d) Can not be used by multiple pets or animals at the same time; and
    e) Can not enhance the life of pets and animals by allowing them to move around inside the unique pet tree system (from condo to condo, from branch to branch, from log to log) without the need for getting on the outside of the unique pet tree system);

OBJECTS AND ADVANTAGES OF THE INVENTION

The new invention substantially departs from the conventional concepts and designs of the prior art. In doing so, the new invention provides a unique shape-shifting self-draining water-repelling hygienic indoor-outdoor slanting pet tree system having many unique and significant features, functions, and advantages, which overcome all the disadvantages of the prior art, as follows:

1) It is an object of the new invention to provide a unique shape-shifting self-draining water-repelling hygienic indoor-outdoor slanting pet tree system, having
   shape-shifting self-draining 360-degree-rotatable condo system,
   shape-shifting self-draining 360-degree-rotatable log system,
   shape-shifting self-draining 360-degree-rotatable step system,
   shape-shifting self-draining 360-degree-rotatable connector system,
   shape-shifting self-draining 360-degree-rotatable branch system,
   shape-shifting self-draining 360-degree-rotatable platform system,
   shape-shifting self-draining 360-degree-rotatable hammock system,
   shape-shifting self-draining 360-degree-rotatable feeding bow system,
   shape-shifting self-draining 360-degree-rotatable water-bottle system, and
   shape-shifting self-draining 360-degree-rotatable exercise rope system,
   Therefore, the unique shape-shifting self-draining water-repelling hygienic indoor-outdoor slanting pet tree system:
   a) Can allow gravitational force and kinetic force of water (from a hose, spraying into the inside of the prior art of pet tree and weighing on its components, appendages, attachments, and accessories) to shift and rotate its components, appendages, attachments, and accessories to shift their positions
      to create new shapes and designs of shape-shifting self-draining water-repelling hygienic indoor-outdoor slanting pet tree system and its components, appendages, attachments, and accessories;
   b) Can allow gravitational force and kinetic force of water (from rain, pouring down on its components, appendages, attachments, and accessories) to shift and rotate its components, appendages, attachments, and accessories to shift their positions
      to create new shapes and designs of shape-shifting self-draining water-repelling hygienic indoor-outdoor slanting pet tree system and its components, appendages, attachments, and accessories;
   c) Can allow gravitational force and kinetic force of wind (from air movement, blowing on its components, appendages, attachments, and accessories) to shift and rotate its components, appendages, attachments, and accessories to shift their positions
      to create new shapes and designs of shape-shifting self-draining water-repelling hygienic indoor-outdoor slanting pet tree system and its components, appendages, attachments, and accessories;
d) Can allow human force (from a user, manually rotating its components, appendages, attachments, and accessories) to shift and rotate its components, appendages, attachments, and accessories to shift their positions
to create new shapes and designs of shape-shifting self-draining water-repelling hygienic indoor-outdoor slanting pet tree system and its components, appendages, attachments, and accessories;
e) Can allow gravitational force and kinetic force (from an animal, climbing into the inside of the prior art of pet tree and weighing on its components, appendages, attachments, and accessories) to shift and rotate its components, appendages, attachments, and accessories to shift their positions
to create new shapes and designs of the prior art of pet tree and its components, appendages, attachments, and accessories.

2) It is another object of the new invention to provide a unique shape-shifting self-draining water-repelling hygienic indoor-outdoor slanting pet tree system, having individually-adjustable-height self-draining rotatable slanting leg system.
Therefore, the unique shape-shifting self-draining water-repelling hygienic indoor-outdoor slanting pet tree system:
a) Can provide a frictional grip where the legs come in contact with the ground
to reduce horizontal slipping or sliding across the ground surface;
b) Can be easily vertically elevated
to provide a level pedestal base on various uneven surfaces;
c) Can be easily vertically lowered
to provide a level pedestal base on various uneven surfaces;
d) Can be easily three-dimensionally adjusted
to provide a level pedestal base on various uneven surfaces;
e) Can be easily three-dimensionally adjusted
to provide a stable pedestal base on various uneven surfaces;
f) Is anti-sliding when pushed; and
g) Is quick and easy
to adjust upward or downward.

3) It is another object of the new invention to provide a unique shape-shifting self-draining water-repelling hygienic indoor-outdoor slanting pet tree system, having individually-adjustable-corner self-draining rotatable slanting pedestal system.
Therefore, the unique shape-shifting self-draining water-repelling hygienic indoor-outdoor slanting pet tree system:
a) Can be three-dimensionally adjusted
to be level and stable;
b) Can provide a range of 360-degree-rotatable and various shape-shifting positions to all the components, appendages, attachments, and accessories of the unique shape-shifting self-draining water-repelling hygienic indoor-outdoor slanting pet tree system, and to the unique shape-shifting self-draining water-repelling hygienic indoor-outdoor slanting pet tree system (such that all of them remain functional), to provide numerous individualized shapes and configurations of the pet tree, based on individual owner preferences;
c) Can receive the screwed on attachment of at least one of the following appendages, a) Shape-shifting self-draining rotatable slanting log system, b) Shape-shifting-rotatable branch system, c) Shape-shifting self-draining rotatable slanting step system, d) Self-draining-hygienic-slanting-platform screw, and e) Rotatable slanting L-bracket wheel system
to provide for quick assembly and disassembly (that does not require tools);
d) Can receive the screwed on attachment of 360-degree-rotatable slanting L-bracket wheel system
to allow easy rolling transport and mobility of shape-shifting self-draining water-repelling hygienic indoor-outdoor slanting pet tree system;
e) Can be assembled in numerous configurations;
f) Can be assembled with infinite rotational positions;
g) Requires no tools to be assembled and disassembled; and
h) Requires less time to be assembled and disassembled.

4) It is a further object of the new invention to provide a unique shape-shifting self-draining water-repelling hygienic indoor-outdoor slanting pet tree system, having shape-shifting self-draining rotatable slanting log system.
Therefore, the unique shape-shifting self-draining water-repelling hygienic indoor-outdoor slanting pet tree system:
a) Can quickly and easily be screwed together (without using any tools),
to have a wide variety of trunk shapes and configurations; also providing a wide variety of pet climbing challenges;
b) Can allow for quick and easy 360-degree rotation of each section
to allow shape-shifting self-draining rotatable slanting branch system and water-repelling self-draining rotatable slanting hygienic platform system to be attached from any direction to better fit into various spaces, and to meet owner's individual wishes;
c) Can easily receive and support branches, and platforms in numerous configurations
to provide support and allow individualized shape-shifting positioning of shape-shifting self-draining rotatable slanting step system, shape-shifting self-draining rotatable slanting branch system, and water-repelling self-draining rotatable slanting hygienic platform system to achieve a wide variety of configurations of the unique shape-shifting self-draining water-repelling hygienic indoor-outdoor slanting pet tree system;
d) Can be dissembled and washed as separate sections in a tub or joined together and sprayed down with a hose
to promote cleanliness and eliminate odors;
e) Can be covered with quick-drying, water-repelling hygienic material
to promote quick-drying;
f) Promotes water-drainage;
g) Repels water;
h) Promotes quick drying;
i) Provides traction for pets to climb on; and
j) Can quickly and easily be assembled by hand (without using any tools).

5) It is an even further object of the new invention to provide a unique shape-shifting self-draining water-repelling hygienic indoor-outdoor slanting pet tree system, having shape-shifting self-draining rotatable slanting step system.
Therefore, the unique shape-shifting self-draining water-repelling hygienic indoor-outdoor slanting pet tree system:
  a) Can provide weight-bearing 360-degree-rotatable steps
    to aid and engage pets in climbing up, down, around, in, and out the unique shape-shifting self-draining water-repelling hygienic indoor-outdoor slanting pet tree system;
  b) Can provide various climbing configurations, preferences, and difficulties
    to add interest and challenge to pets in climbing up, down, around, in, and out the unique shape-shifting self-draining water-repelling hygienic indoor-outdoor slanting pet tree system;
  c) Provides traction and interest to aid pets in climbing activities.
6) It is another object of the new invention to provide a unique shape-shifting self-draining water-repelling hygienic indoor-outdoor slanting pet tree system, having shape-shifting self-draining rotatable slanting connector system.
Therefore, the unique shape-shifting self-draining water-repelling hygienic indoor-outdoor slanting pet tree system:
  a) Can easily receive and support branches, and platforms in numerous configurations
    to allow individualized positioning of shape-shifting self-draining rotatable slanting branch system, and water-repelling self-draining rotatable slanting hygienic platform system to achieve a wide variety of configurations of the unique shape-shifting self-draining water-repelling hygienic indoor-outdoor slanting pet tree system;
  b) Can easily receive and support shape-shifting self-draining rotatable slanting branch system, and water-repelling self-draining rotatable slanting hygienic platform system in a slanted position
    to assist gravity in more efficient drainage of rain or wash water;
  c) Requires no tools to be assembled and disassembled; and
  d) Requires less time to be assembled and disassembled.
7) It is yet another object of the new invention to provide a unique shape-shifting self-draining water-repelling hygienic indoor-outdoor slanting pet tree system, having shape-shifting self-draining rotatable slanting branch system.
Therefore, the unique shape-shifting self-draining water-repelling hygienic indoor-outdoor slanting pet tree system:
  a) Can receive and support platform or additional branch systems,
    to extend length of branches and expand size of pet tree;
  b) Can support platform or additional branch systems, to allow an indoor pet tree to have branch systems that extend out the window and;
  c) Can receive and support platform or additional branch systems,
    to provide more climbing opportunities for pets;
  d) Can receive and support platform systems,
    to provide a perch for pets;
  e) Can receive and support pet tree accessories such as slanting water bottle, perch, spinning wheel, hammock, bed, exercise rope, and feeder bowl,
    to add variety, interest, and utility for pets;
  f) Can be dissembled and washed by sections in a tub or joined together and sprayed down with a hose
    to promote cleanliness and eliminate odors;
  g) Can be covered with quick-drying, water-repelling hygienic material
    to promote quick-drying;
  h) Promotes water-drainage;
  i) Repels water;
  j) Promotes quick drying; and
  k) Can be connected in an unlimited number of shapes and sizes.
8) It is still yet another object of the new invention to provide a unique shape-shifting self-draining water-repelling hygienic indoor-outdoor slanting pet tree system, having water-repelling self-draining rotatable slanting hygienic platform system.
Therefore, the unique shape-shifting self-draining water-repelling hygienic indoor-outdoor slanting pet tree system:
  a) Can quickly and easily be screwed into branch or log system (no tool is needed)
    to extend length of branches and expand size of pet tree;
  b) Can quickly and easily be screwed into branch or log system (no tool is needed)
    to provide more climbing opportunities for pets;
  c) Can quickly and easily be screwed into branch or log system (no tool is needed)
    to provide a perch for pets;
  d) Can be dissembled (no tool is needed) and sections can be washed separately
    to promote cleanliness and eliminate odors;
  e) Can be covered with quick-drying, water-repelling hygienic platform cover that can be simply removed and washed separately
    to make it easier and more convenient for owner to maintain cleanliness and eliminate odors;
  f) Promotes water-drainage;
  g) Repels water;
  h) Promotes quick drying; and
  i) Provides traction for pets to climb on.
9) It is still yet an even further object of the new invention to provide a unique shape-shifting self-draining water-repelling hygienic indoor-outdoor slanting pet tree system, having
  water-repelling self-draining rotatable slanting hygienic cap system.
Therefore, the unique shape-shifting self-draining water-repelling hygienic indoor-outdoor slanting pet tree system:
  a) Can quickly and easily cap off shape-shifting self-draining rotatable slanting log system
    to prevent water from entering;
  b) Promotes water-drainage;
  c) Repels water;
  d) Promotes quick drying; and
  e) Provides traction for pets to climb on.
10) It is still yet an even further object of the new invention to provide a unique shape-shifting self-draining water-repelling hygienic indoor-outdoor slanting pet tree system, having water-repelling self-draining rotatable slanting L-bracket wheel system.

Therefore, the unique shape-shifting self-draining water-repelling hygienic indoor-outdoor slanting pet tree system:
  a) Can allow the unique shape-shifting self-draining water-repelling hygienic indoor-outdoor slanting pet tree system
    to be rolled from place to place for convenient transport and mobility;
  b) Can allow the unique shape-shifting self-draining water-repelling hygienic indoor-outdoor slanting pet tree system
    to be used as an indoor system exclusively, or to be used as an outdoors system exclusively, or to be easily rolled from outdoors to indoors as the weather changes or for any other reason; and
  c) Can allow the unique shape-shifting self-draining water-repelling hygienic indoor-outdoor slanting pet tree system to be wheeled outdoors,
    to be sprayed down from top to bottom with the garden hose, thereby making it easier and more convenient to wash and keep sanitary, as well as looking and smelling cleaner.

11) It is still yet an even further object of the new invention to provide a unique shape-shifting self-draining water-repelling hygienic indoor-outdoor slanting pet tree system, having
multiple additional capabilities.

Therefore, the unique shape-shifting self-draining water-repelling hygienic indoor-outdoor slanting pet tree system:
  a) Can have one or multiple pet houses or pet condos attachable thereto and/or to each other with door openings and water-draining holes
    to allow pets to access one or more small pet houses (while staying inside the unique shape-shifting self-draining water-repelling hygienic indoor-outdoor slanting pet tree system) which add interest and utility to the unique shape-shifting self-draining water-repelling hygienic indoor-outdoor slanting pet tree system;
  b) Can have 360-degree-rotatable ladder system for pets
    to climb on, rest on, and enjoy;
  c) Can have a ceiling connector
    to suspend the unique shape-shifting self-draining water-repelling hygienic indoor-outdoor slanting pet tree system from ceiling, or to act as a stabilizer to the unique shape-shifting self-draining water-repelling hygienic indoor-outdoor slanting pet tree system while the unique pet tree system is being attached to a foundation;
  d) Can be used by multiple pets or animals at the same time; and
  e) Can enhance the life of pets and animals by allowing them to move around inside the unique pet tree system (from condo to condo, from branch to branch, from log to log) without the need for getting on the outside of the unique pet tree system).

Other objects and advantages of the present invention will become apparent from a consideration of the accompanying drawings and the ensuing description.

BRIEF DESCRIPTION OF THE DRAWINGS

FIGS. 1, 2A, 2B, and 2C illustrate front and bottom views of an individually-adjustable-height leg system of the unique shape-shifting self-draining water-repelling hygienic indoor-outdoor pet tree system.

FIGS. 3 and 4 illustrate top and bottom views of an individually-adjustable-corner pedestal system of the unique shape-shifting self-draining water-repelling hygienic indoor-outdoor pet tree system.

FIGS. 10A, 10B, and 11 illustrate perspective views of a shape-shifting rotatable branch system of the unique shape-shifting self-draining water-repelling hygienic indoor-outdoor pet tree system.

FIGS. 14A and 14B illustrate front views of how to assemble, adjust, level, and stabilize the individually-adjustable-height leg system to the individually-adjustable-corner pedestal system.

FIG. 15 illustrates a perspective view of how to assemble the individually-adjustable-corner pedestal system to the shape-shifting rotatable log system.

FIGS. 17 and 18 illustrate perspective views of how to assemble the shape-shifting connector system to the shape-shifting rotatable log system.

FIG. 19 illustrates a perspective view of how to assemble the shape-shifting rotatable branch system to the shape-shifting connector system.

FIG. 21A illustrates a perspective view of how to assemble the self-draining water-repelling hygienic cap system to the shape-shifting rotatable log system.

FIG. 21B illustrates a side view of how to assemble the L-bracket wheel system to the individually-adjustable-corner pedestal system.

FIGS. 22, 23A, 23B, 24A, 24B, 24C, 25A, 25B, and 25C illustrate perspective views of how to shift all the shapes of the shape-shifting rotatable log system, the shape-shifting rotatable step system, the shape-shifting connector system, the shape-shifting rotatable branch system, and the self-draining water-repelling hygienic cap system to create multiple various shapes of the unique shape-shifting self-draining water-repelling hygienic indoor-outdoor pet tree system.

17

Figure 1:
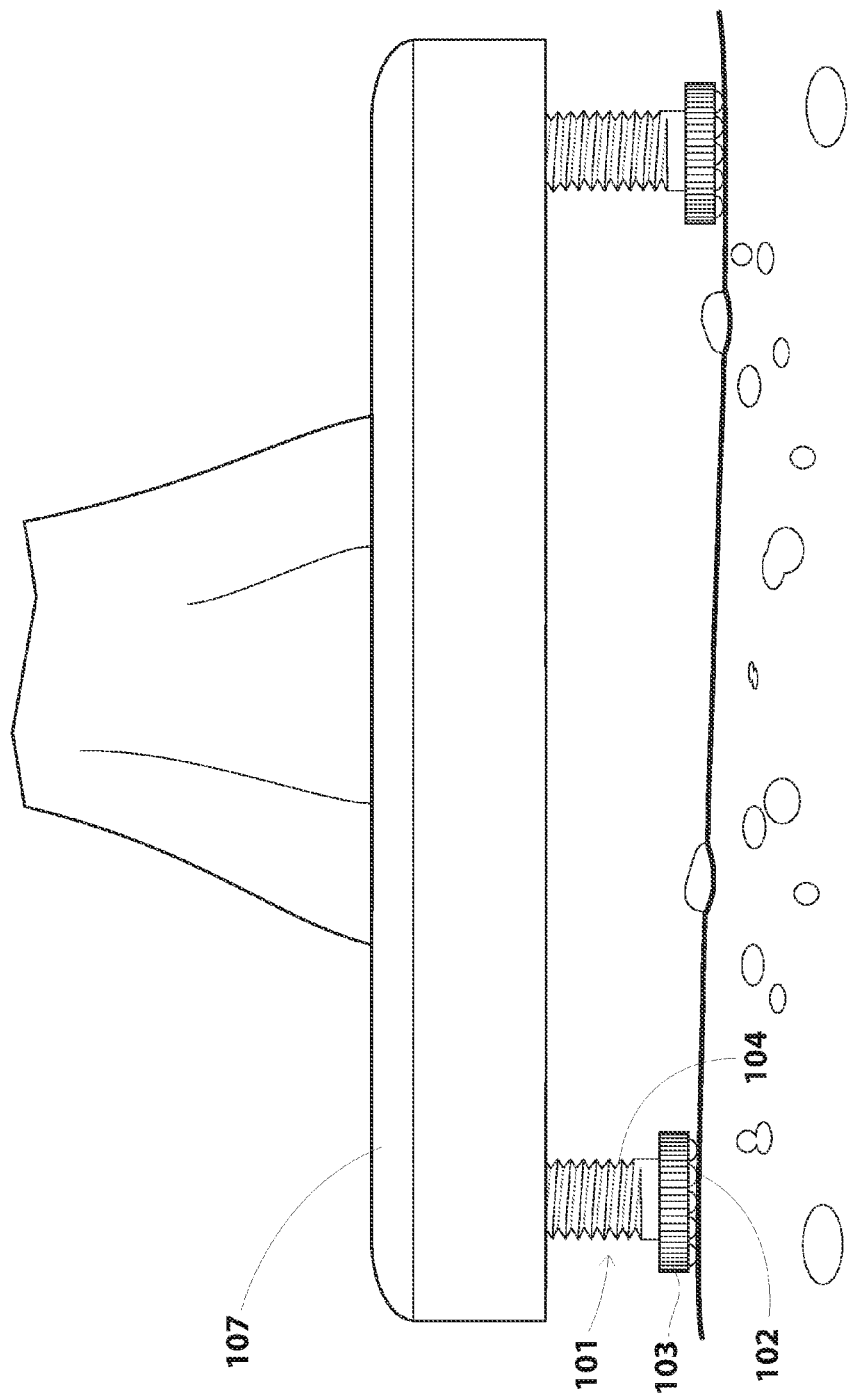
Figure 2B:
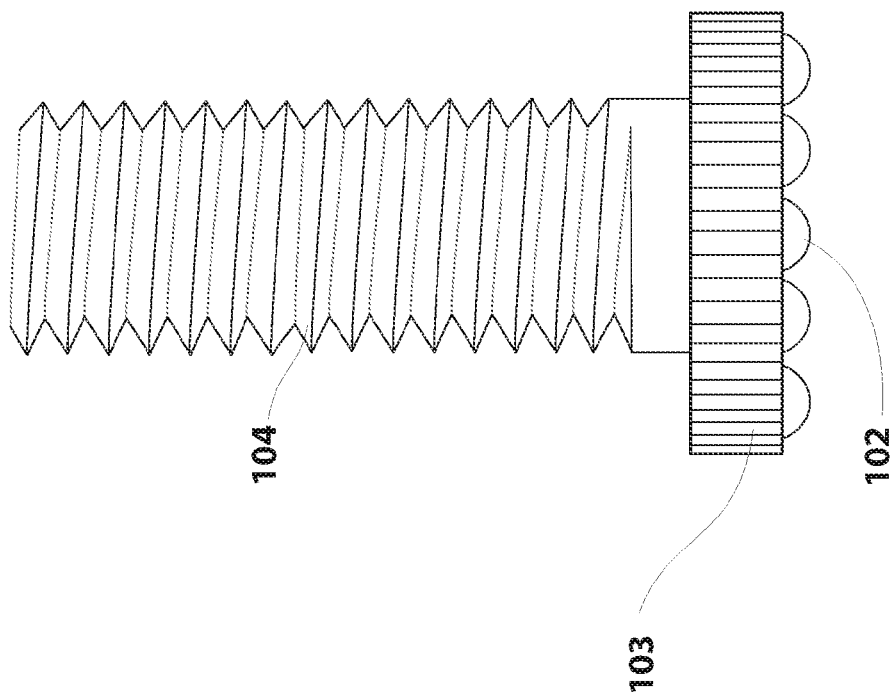
Figure 2C:
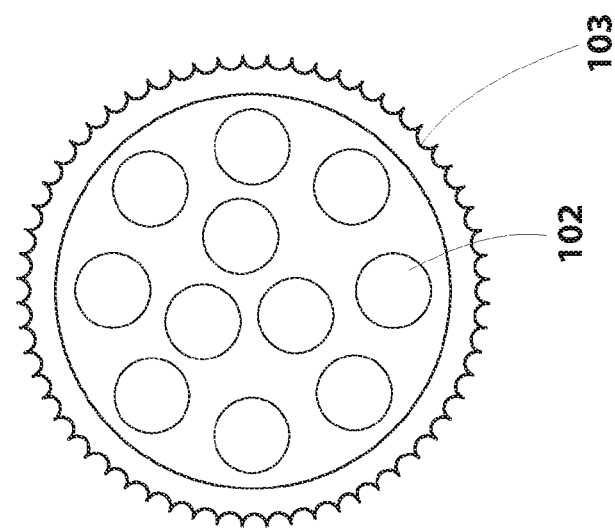
Figure 5A:
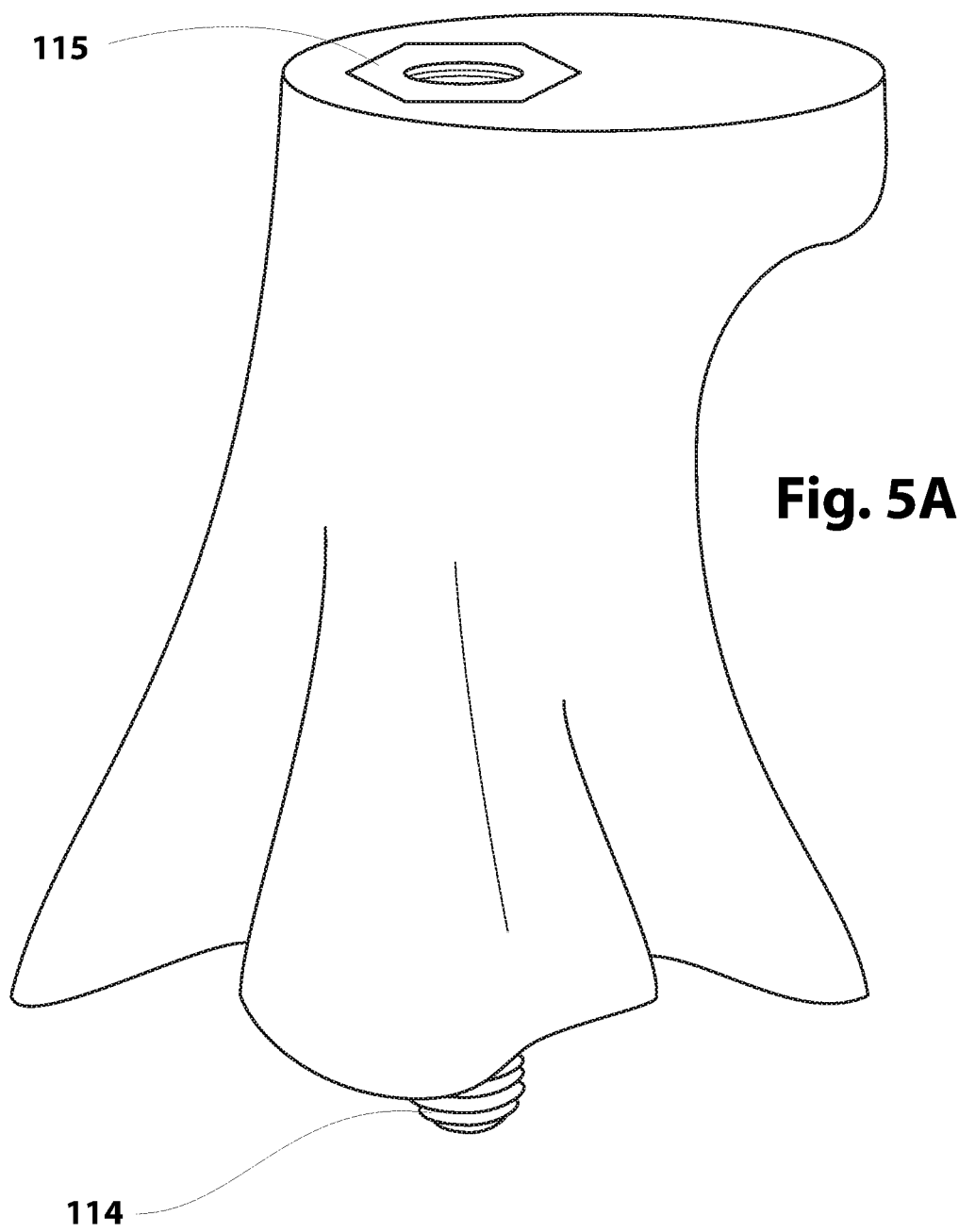
FIGS. 5A, 5B, 5C, and 6 illustrate perspective views of a shape-shifting rotatable log system of the unique shape-shifting self-draining water-repelling hygienic indoor-outdoor pet tree system.
Figure 5B:
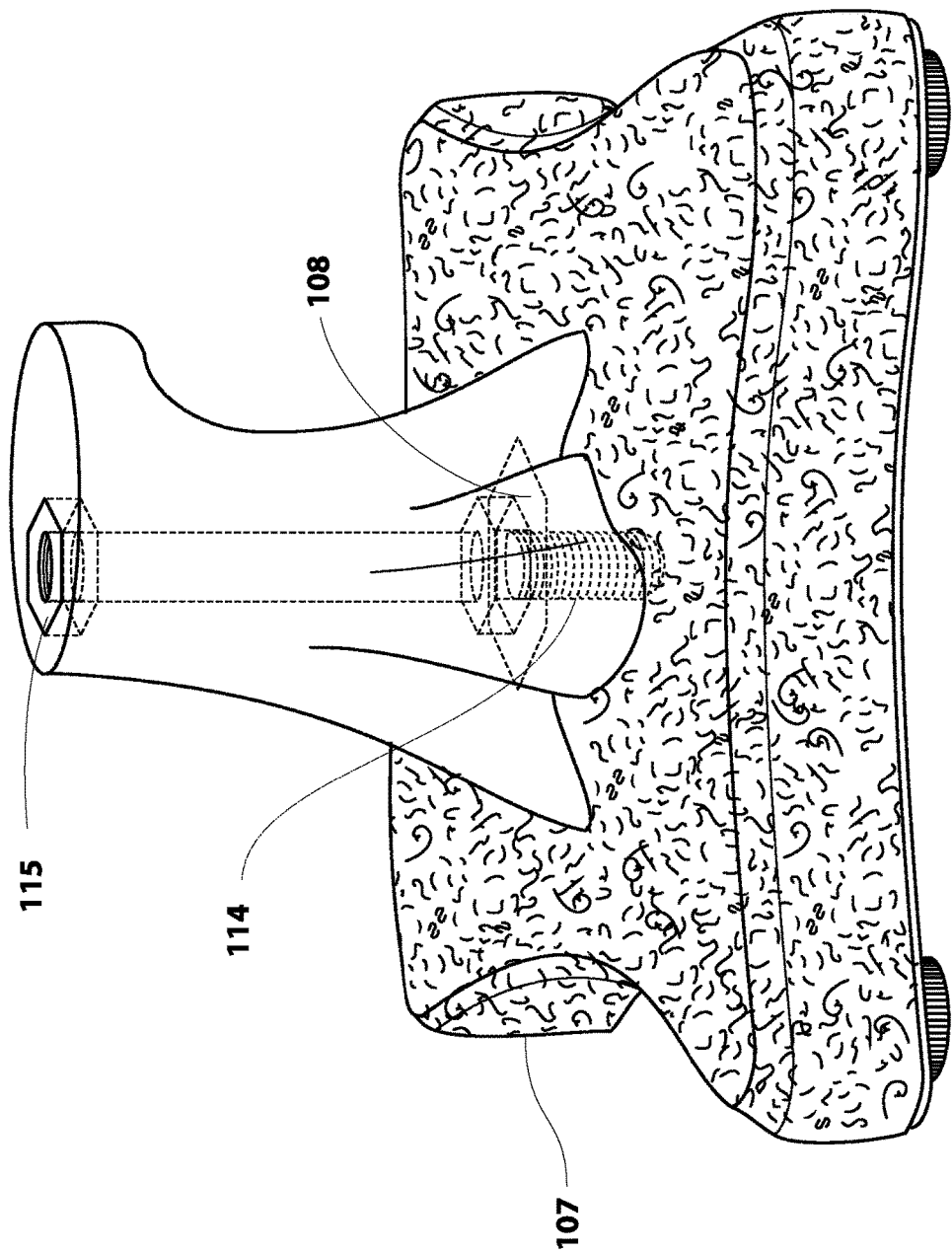
Figure 5C:
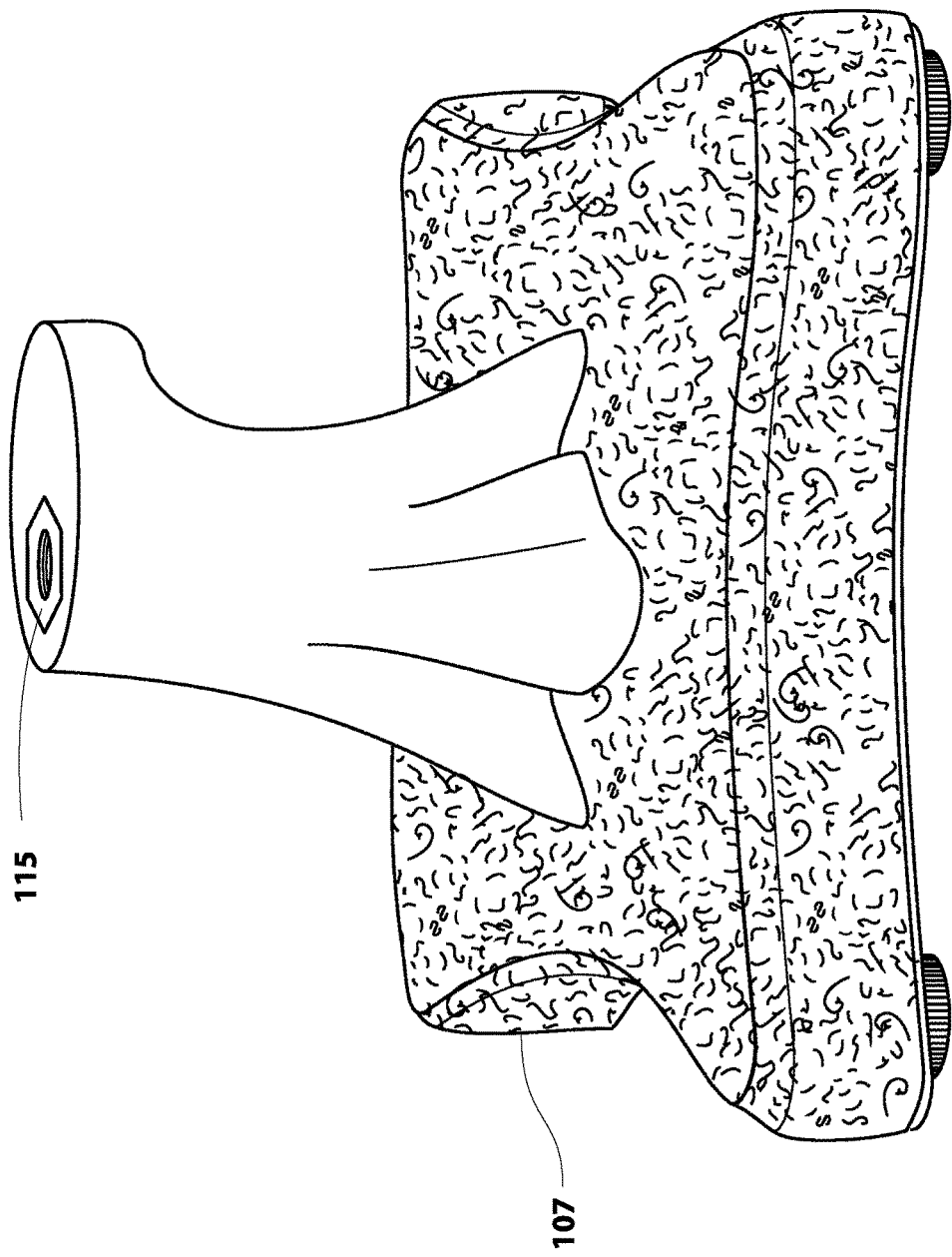
Figure 6:
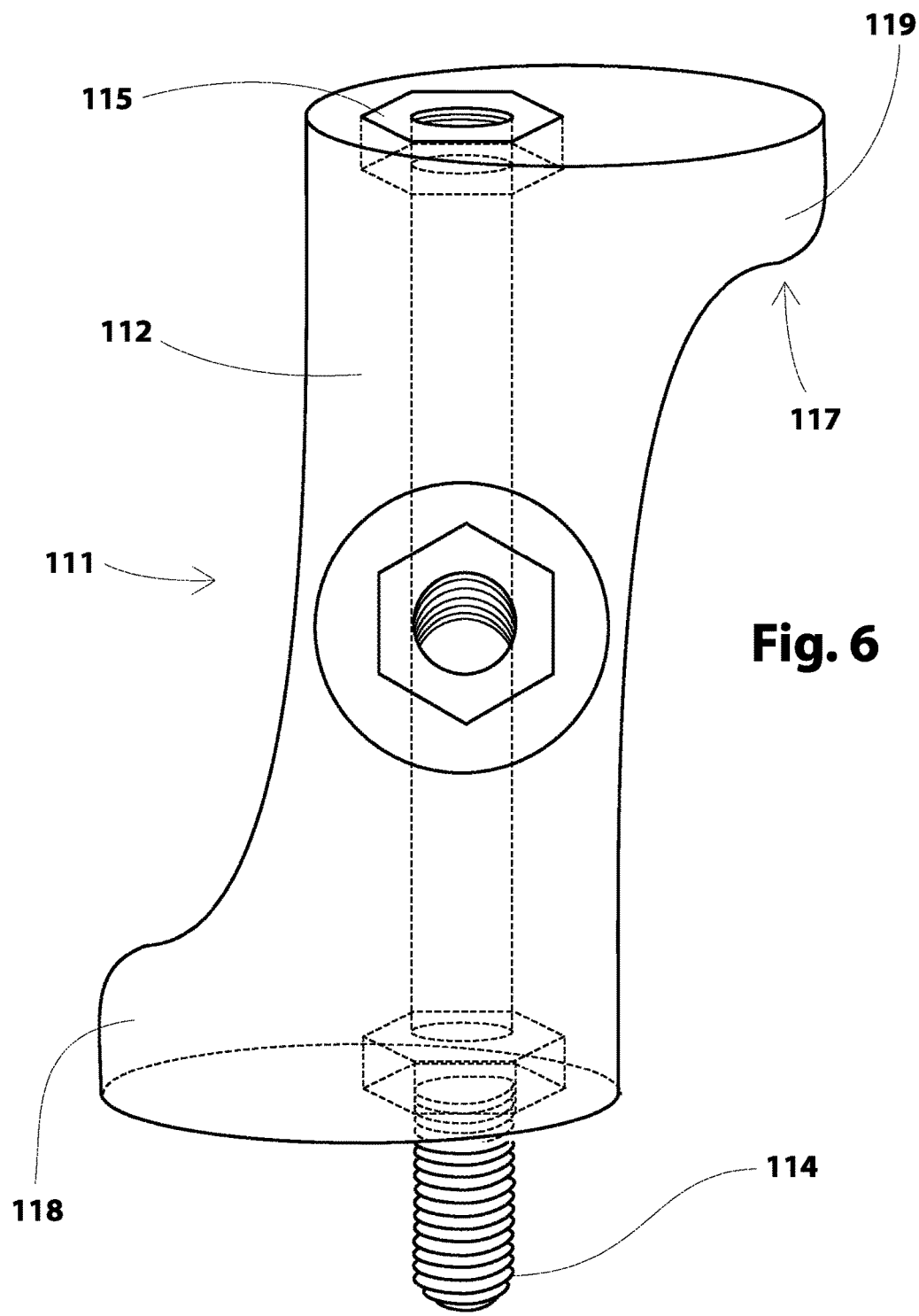
Figure 7A:
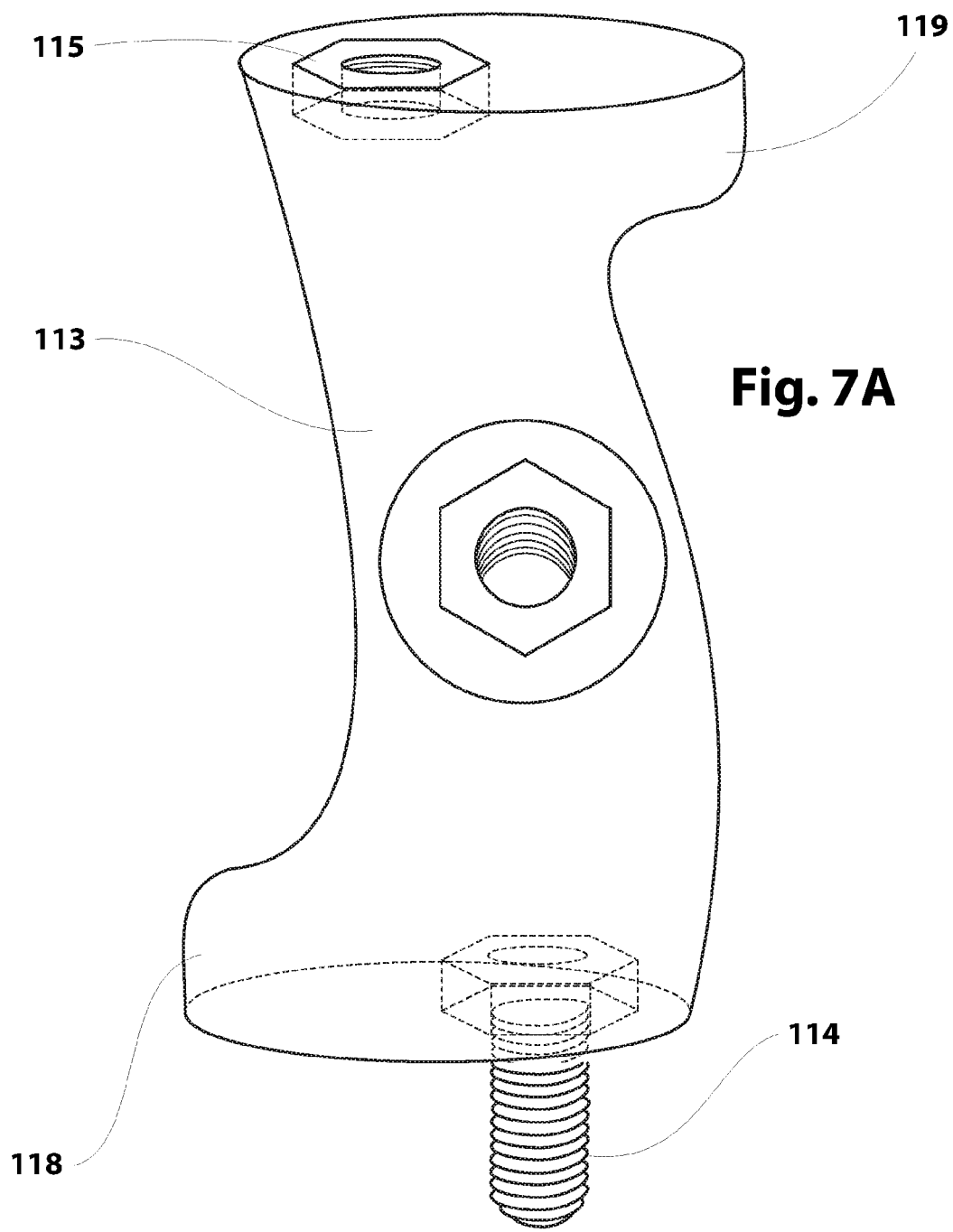
FIGS. 7A and 7B illustrate perspective views of a shape-shifting rotatable step system of the unique shape-shifting self-draining water-repelling hygienic indoor-outdoor pet tree system.
Figure 7B:
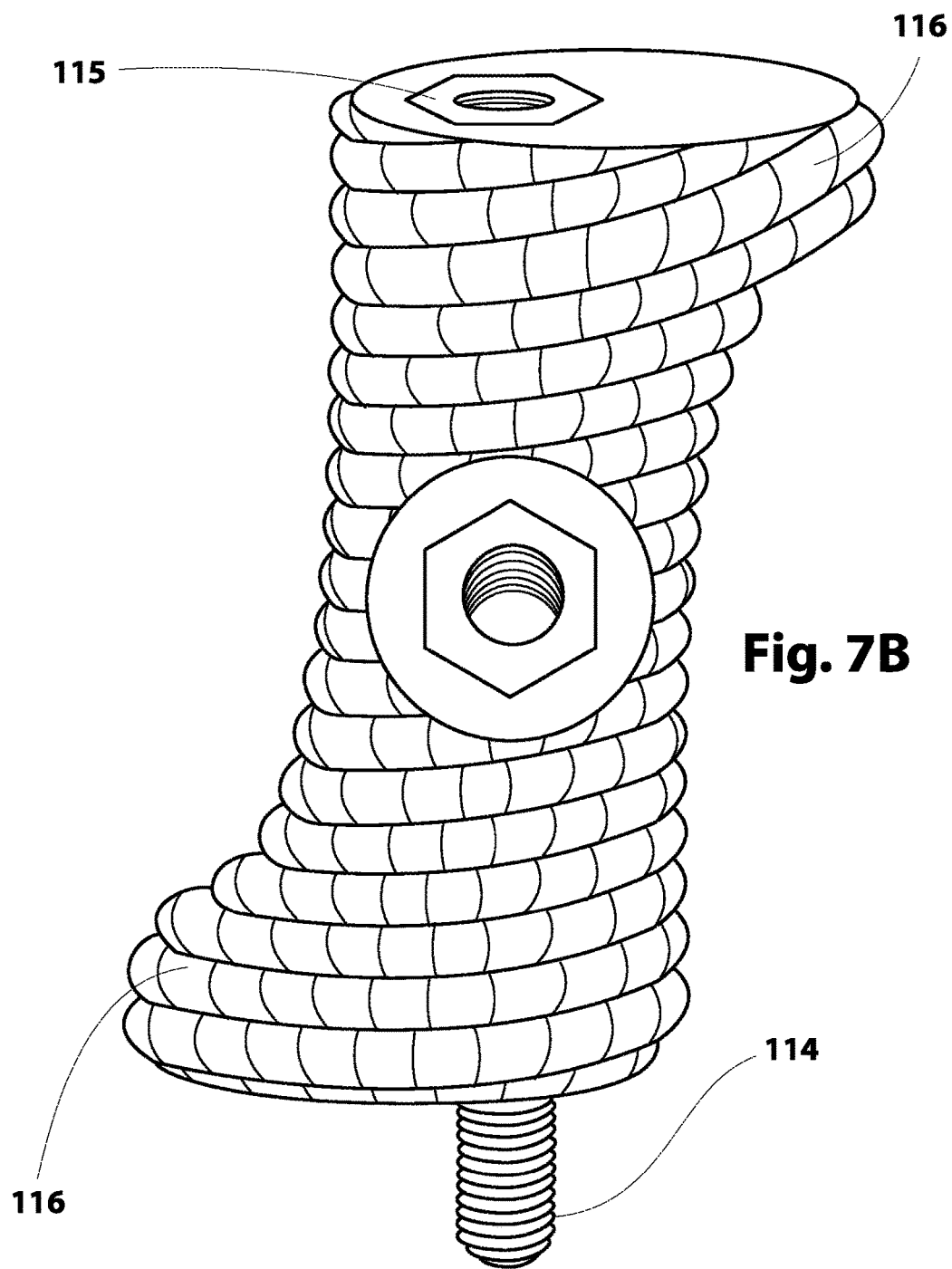
Figure 8:
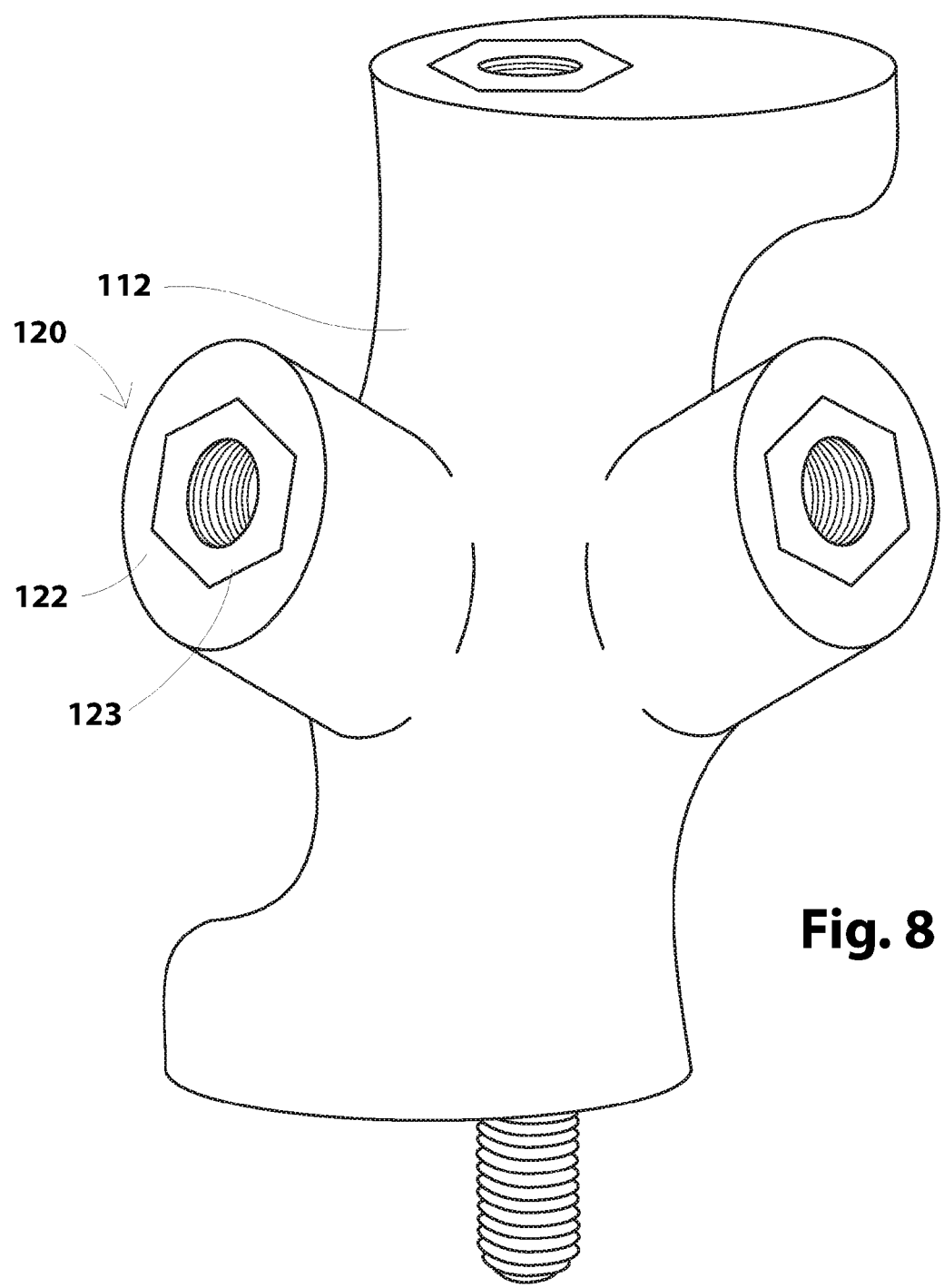
FIGS. 8 and 9 illustrate perspective views of a shape-shifting connector system of the unique shape-shifting self-draining water-repelling hygienic indoor-outdoor pet tree system.
Figure 9:
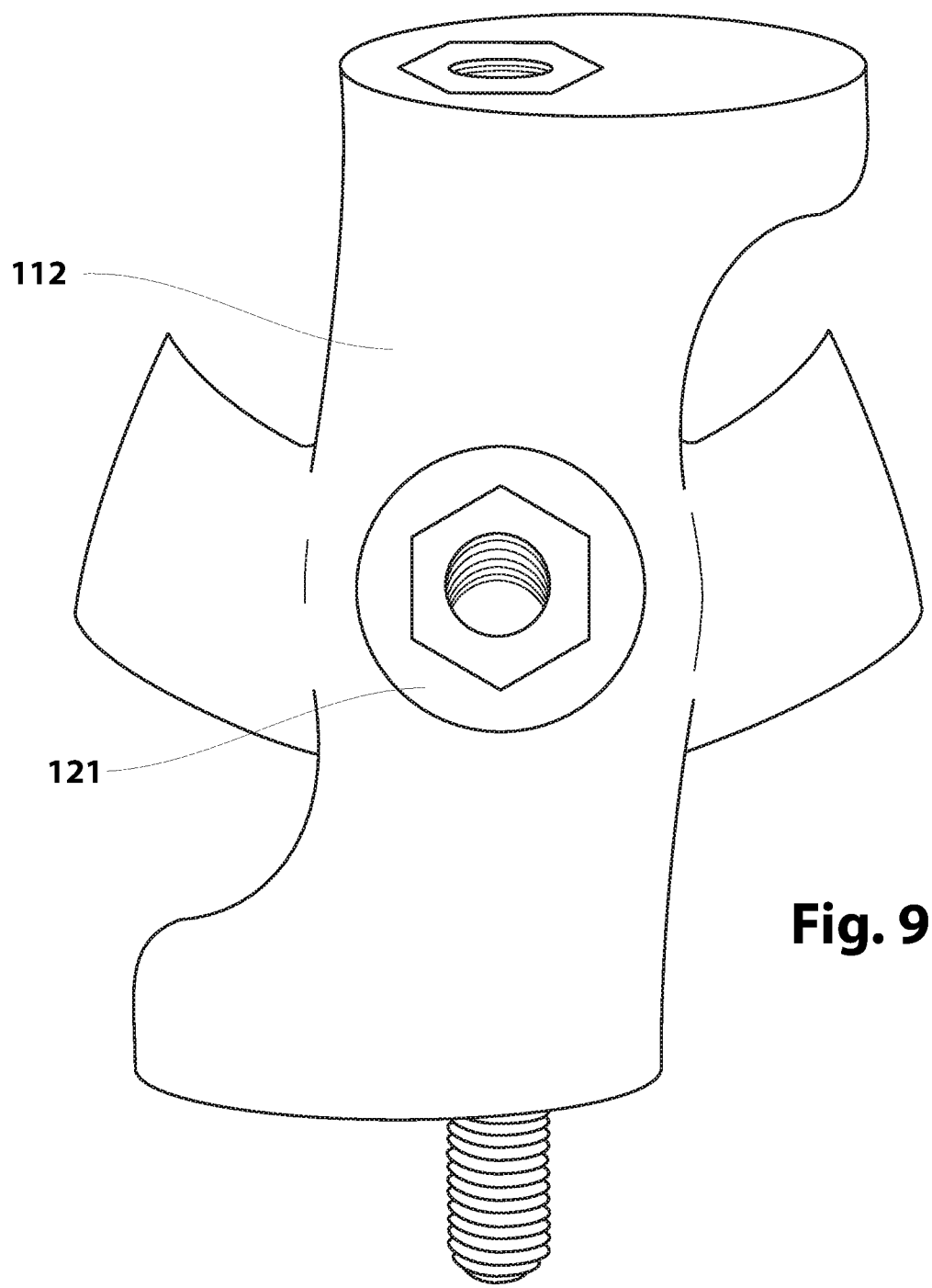
Figure 10A:
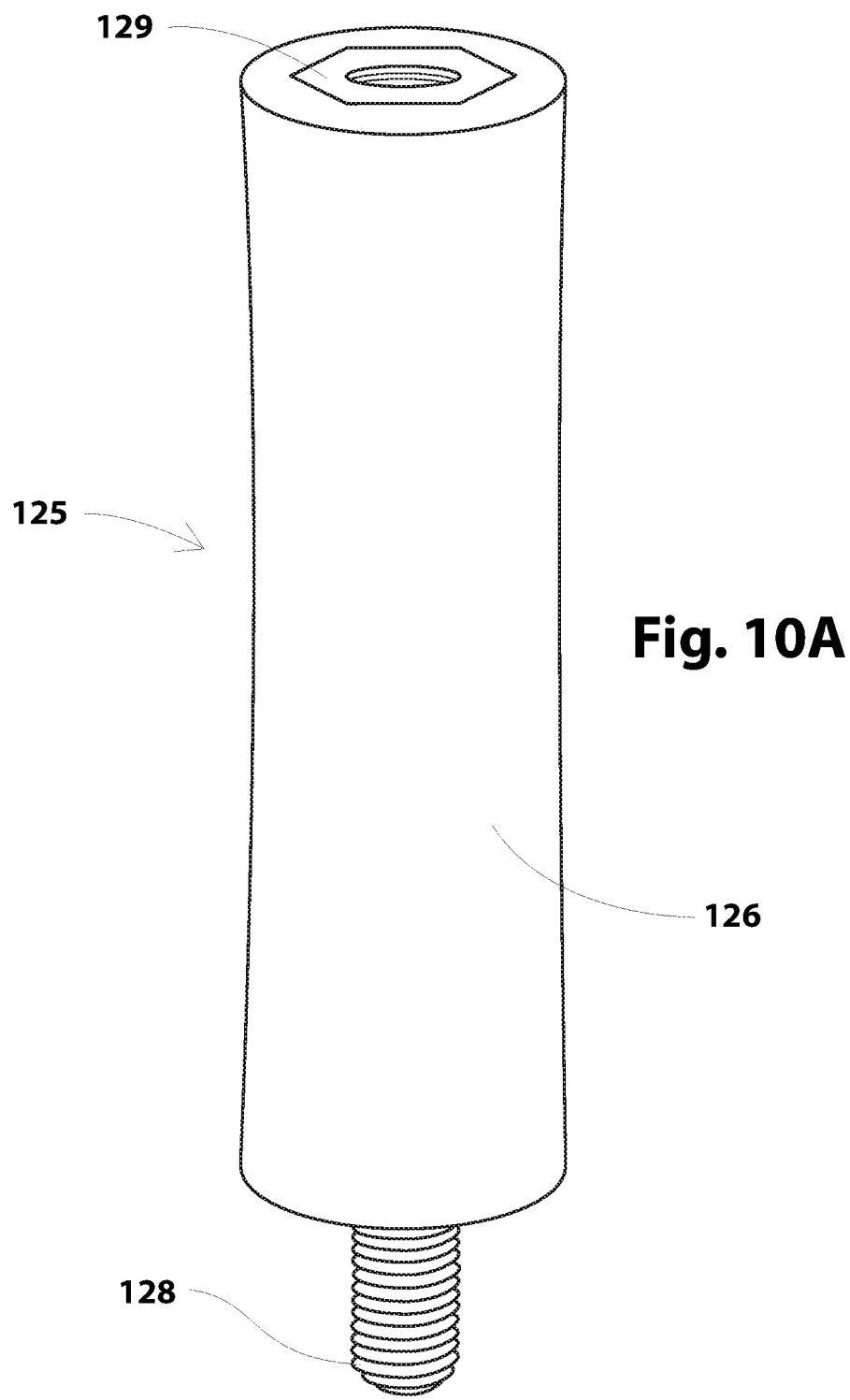
Figure 11:
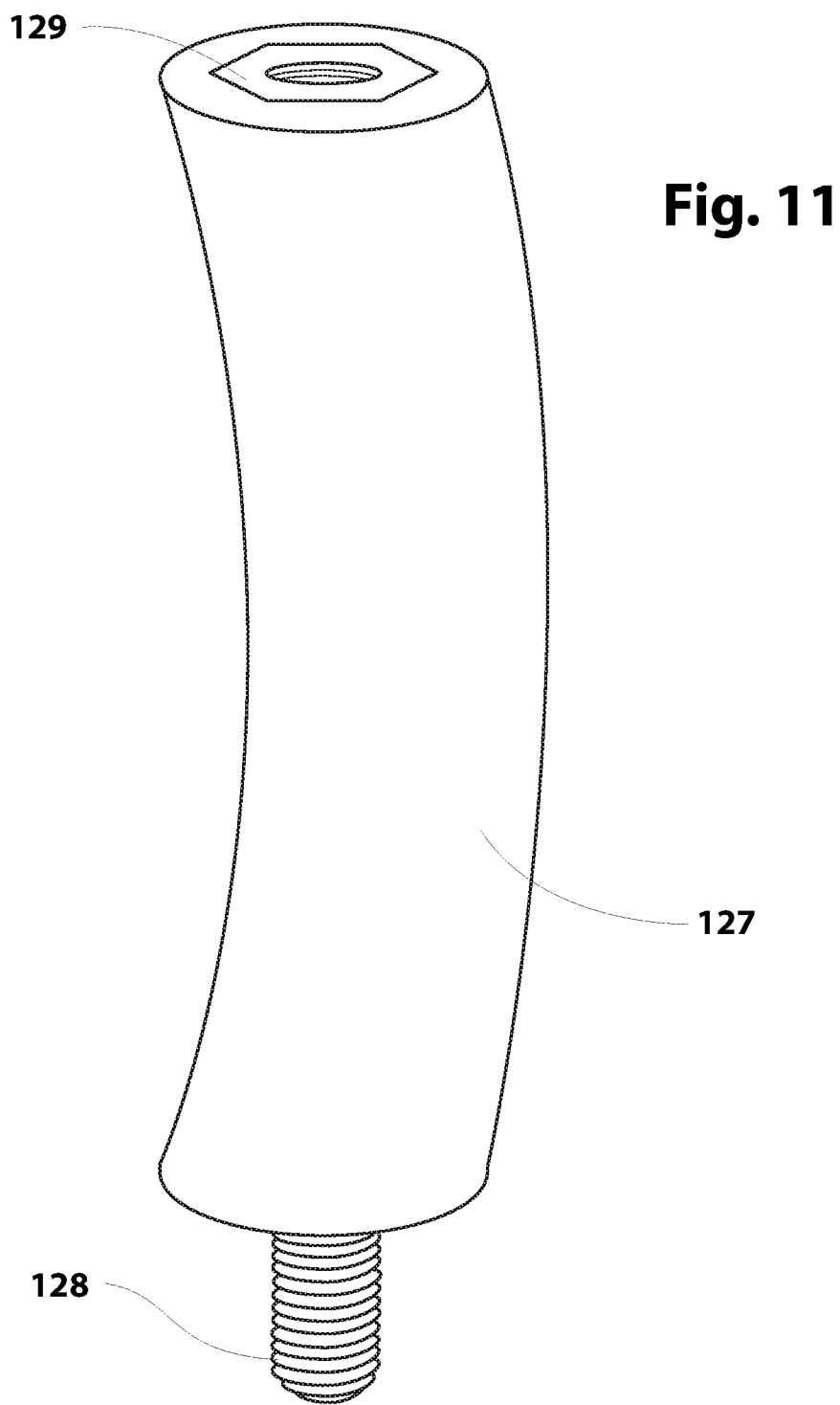
Figure 12A:
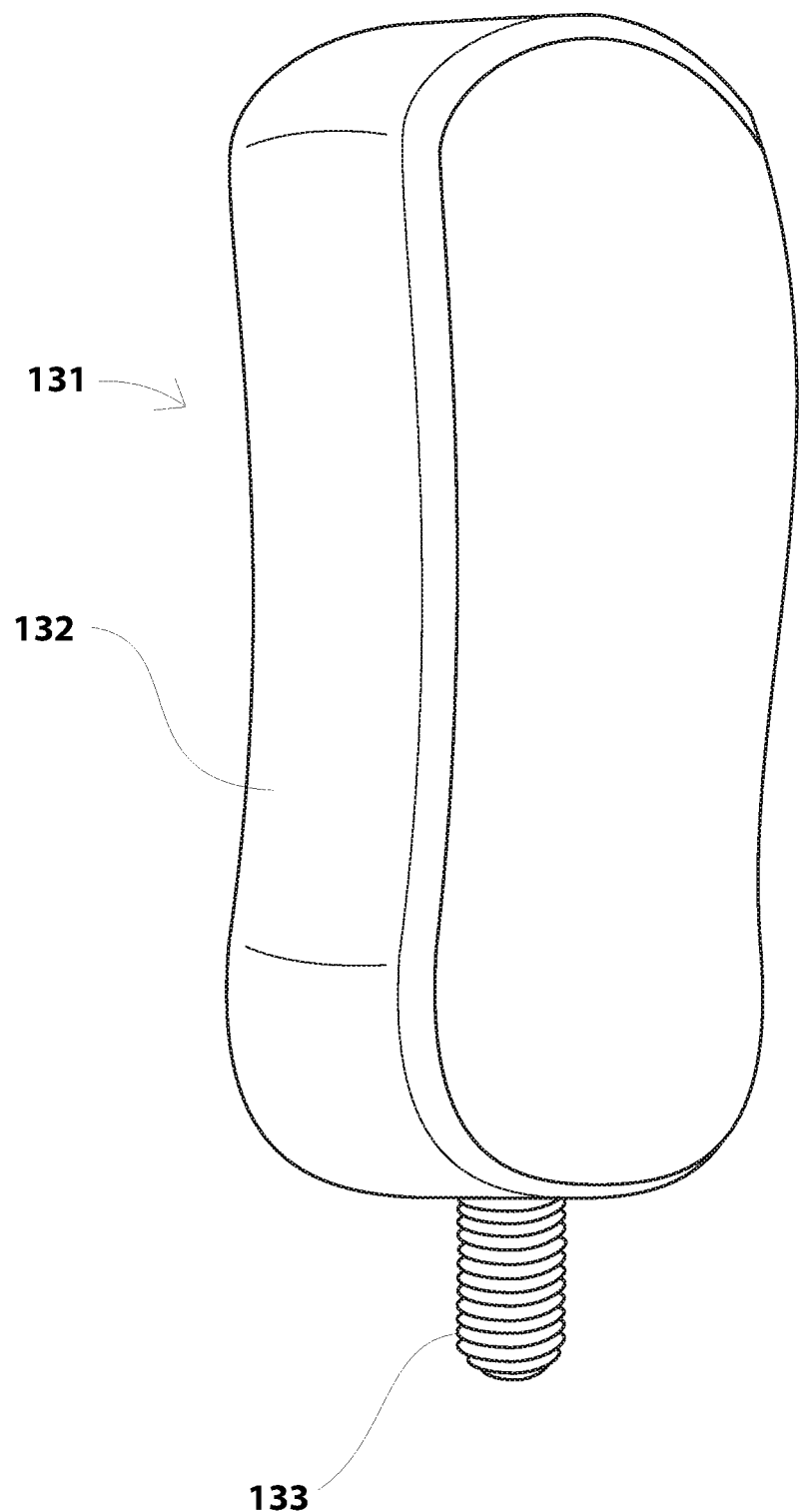
FIGS. 12A, 12B, 12C, 12D, and 12E illustrate perspective, front, rear, side, and top views of a self-draining water-repelling hygienic slanting-platform system of the unique shape-shifting self-draining water-repelling hygienic indoor-outdoor pet tree system.
Figure 12B:
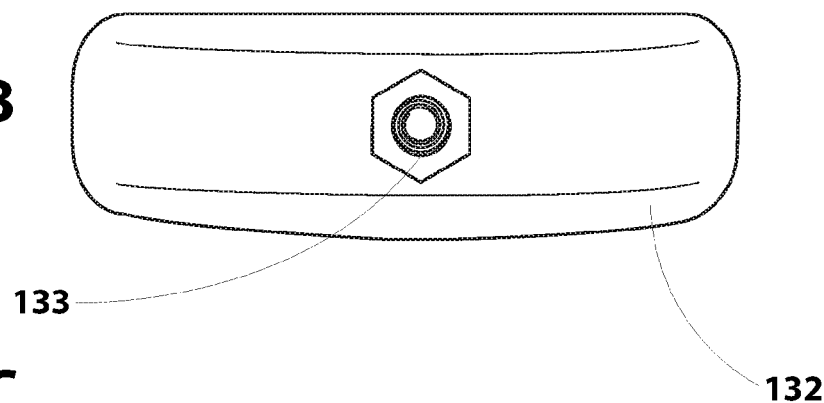
Figure 12C:
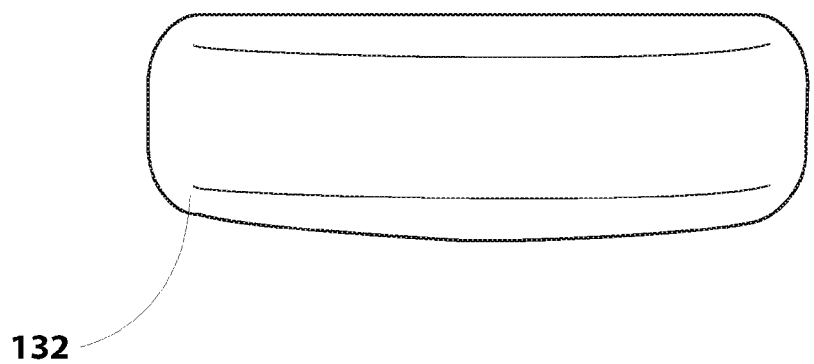
Figure 12D:
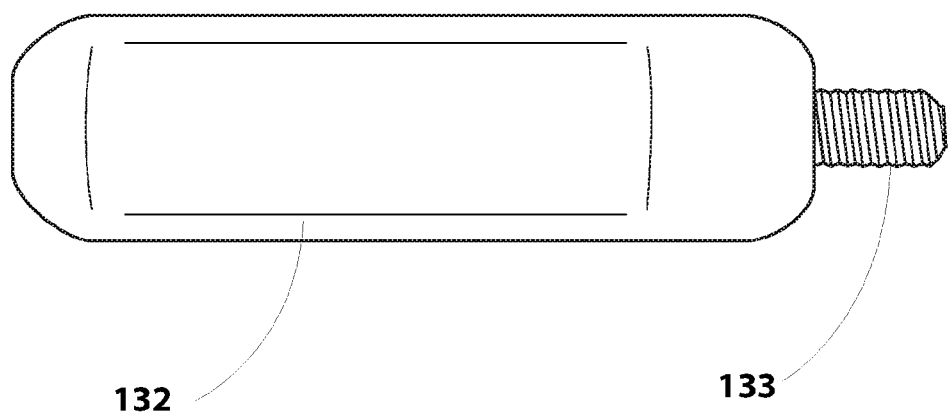
Figure 12E:
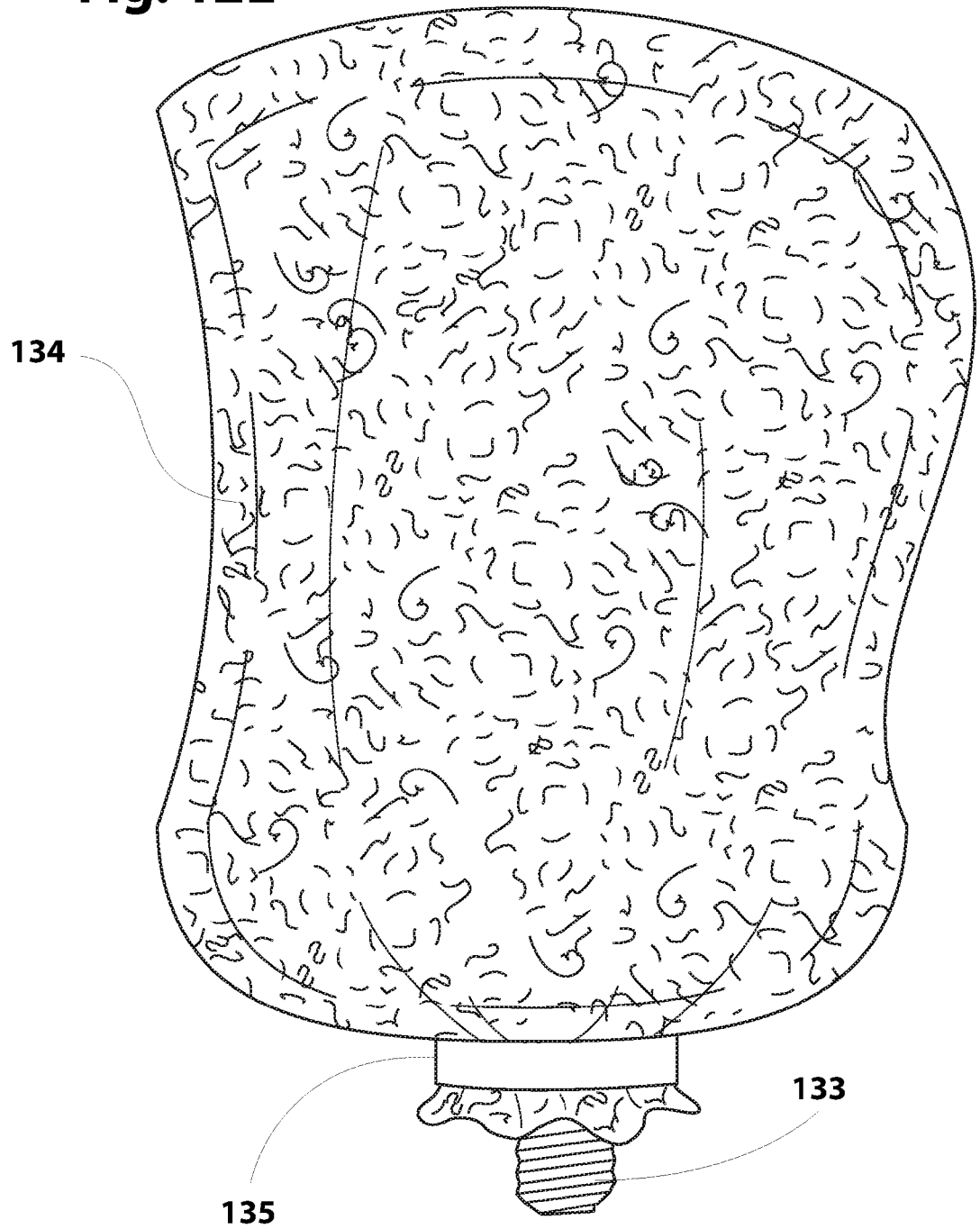
Figure 13A:
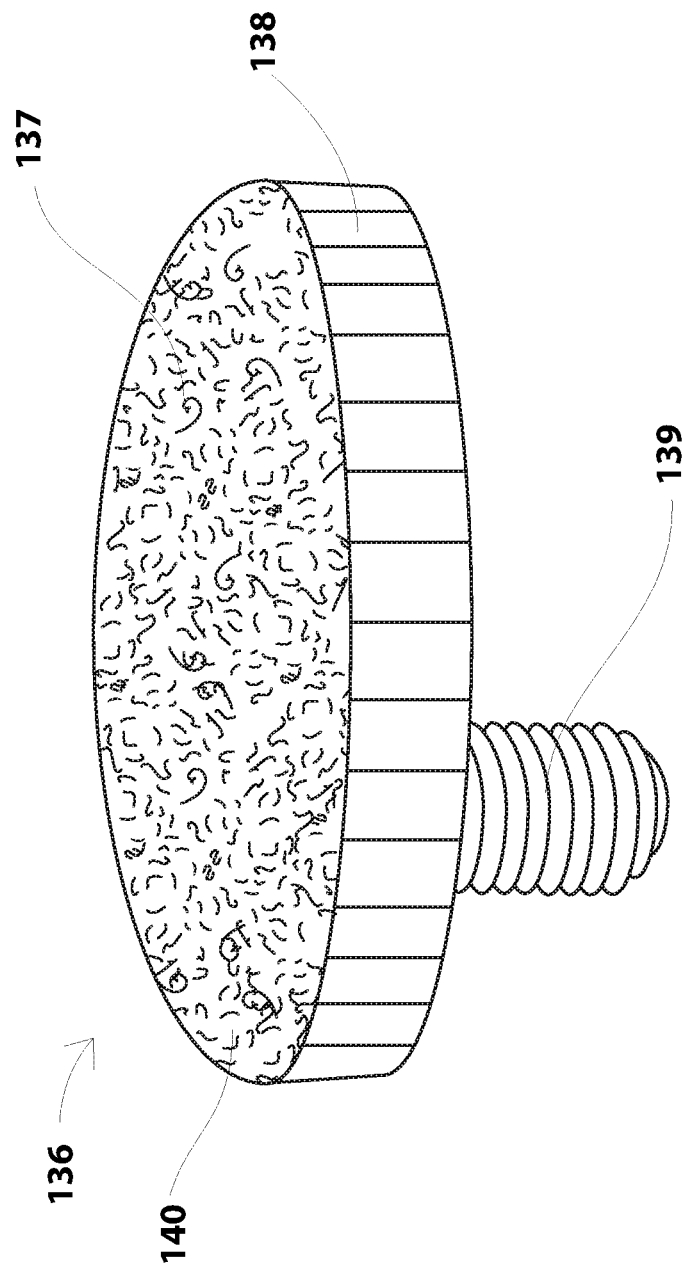
FIG. 13A illustrates a perspective view of a self-draining water-repelling hygienic cap system of the unique shape-shifting self-draining water-repelling hygienic indoor-outdoor pet tree system.
Figure 13B:
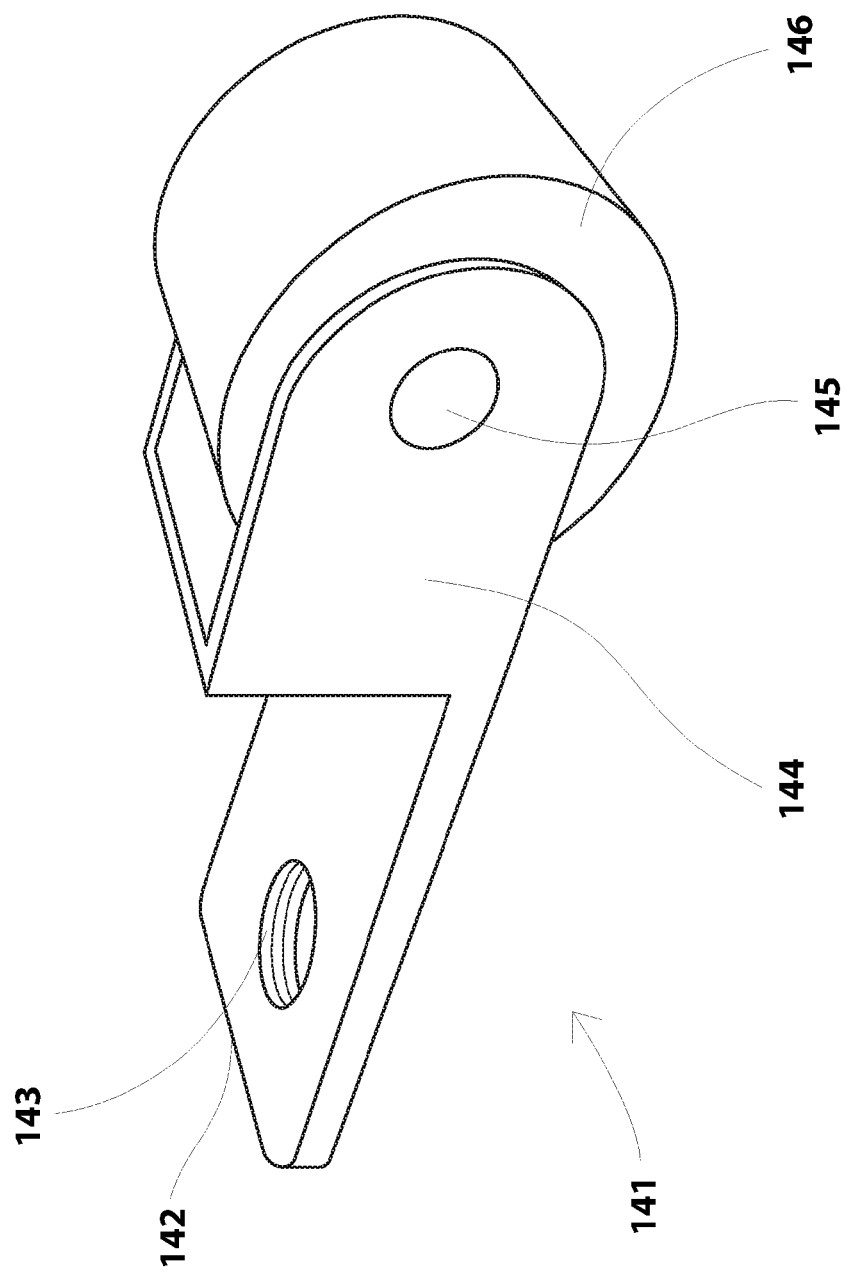
FIG. 13B illustrates a perspective view of an L-bracket wheel system of the unique shape-shifting self-draining water-repelling hygienic indoor-outdoor pet tree system.
Figure 16:
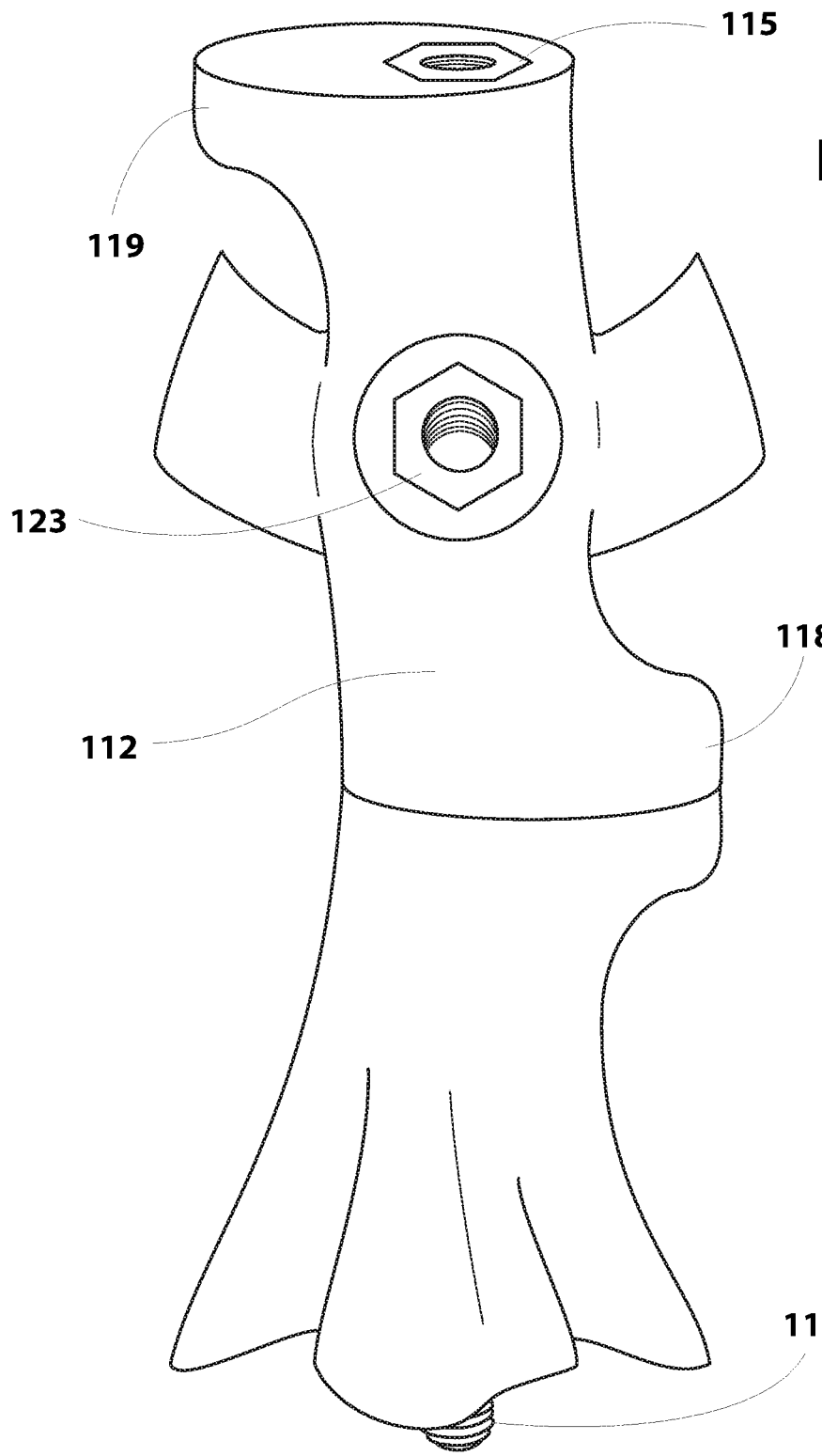
FIG. 16 illustrates a perspective view of how to assemble the shape-shifting rotatable log system together.
Figure 17:
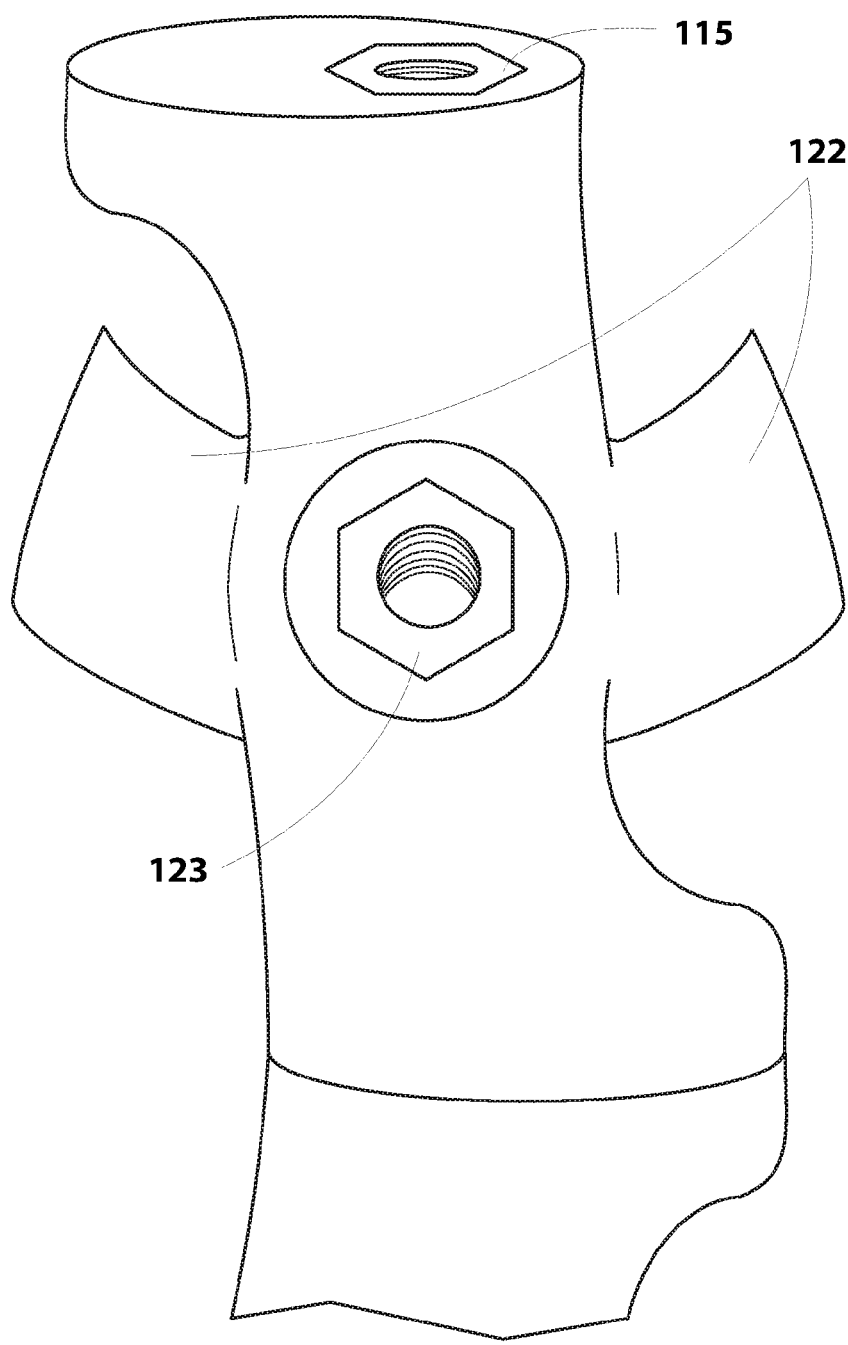
Figure 20A:
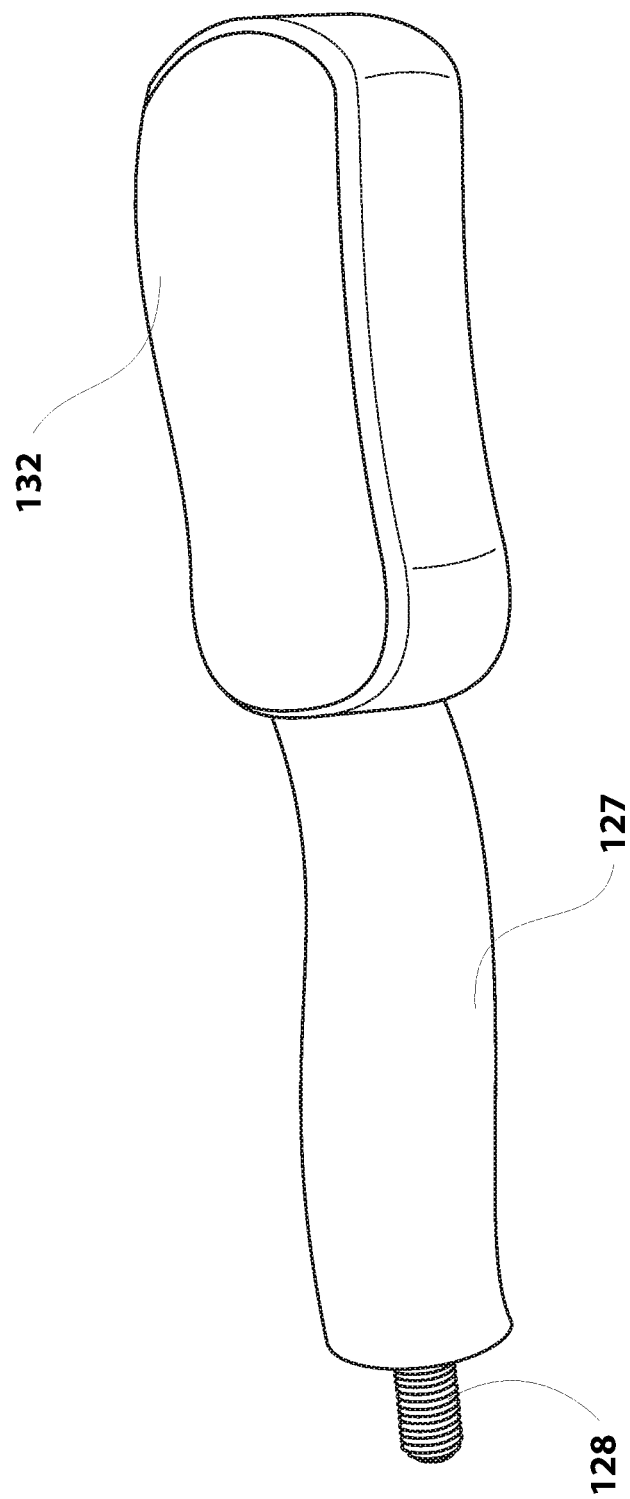
FIGS. 20A and 20B illustrate perspective views of how to assemble the self-draining water-repelling hygienic slanting-platform system to the self-draining water-repelling hygienic cap system.
Figure 20B:
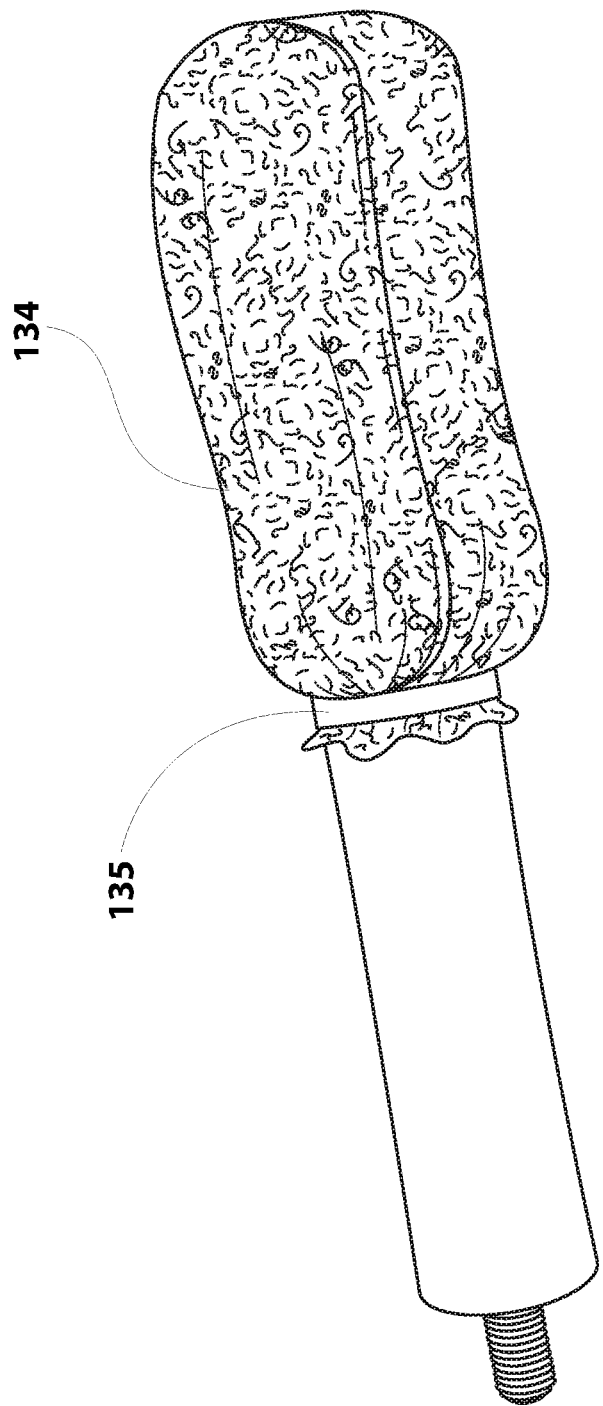
Figure 22:
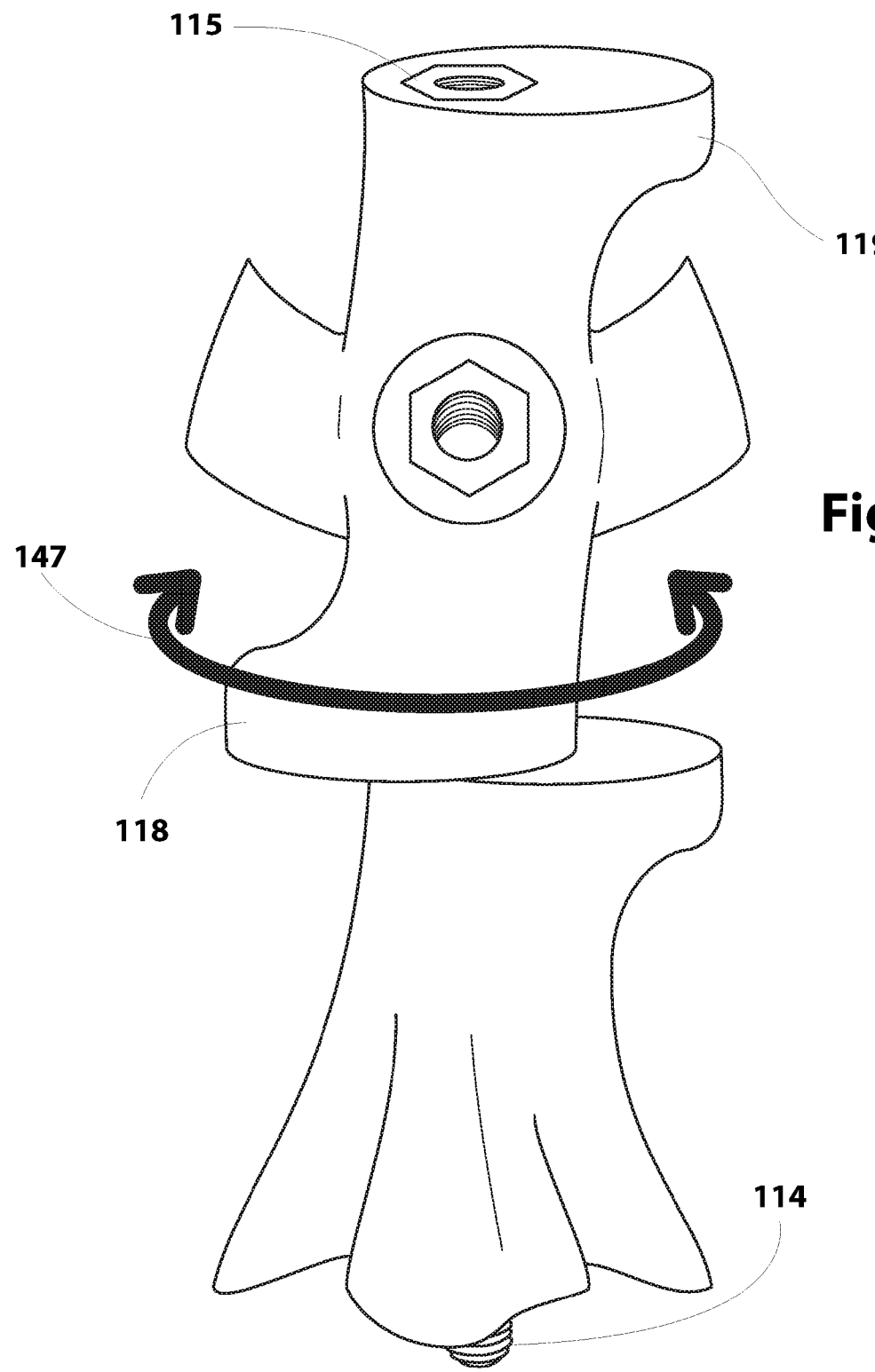
Figure 23A:
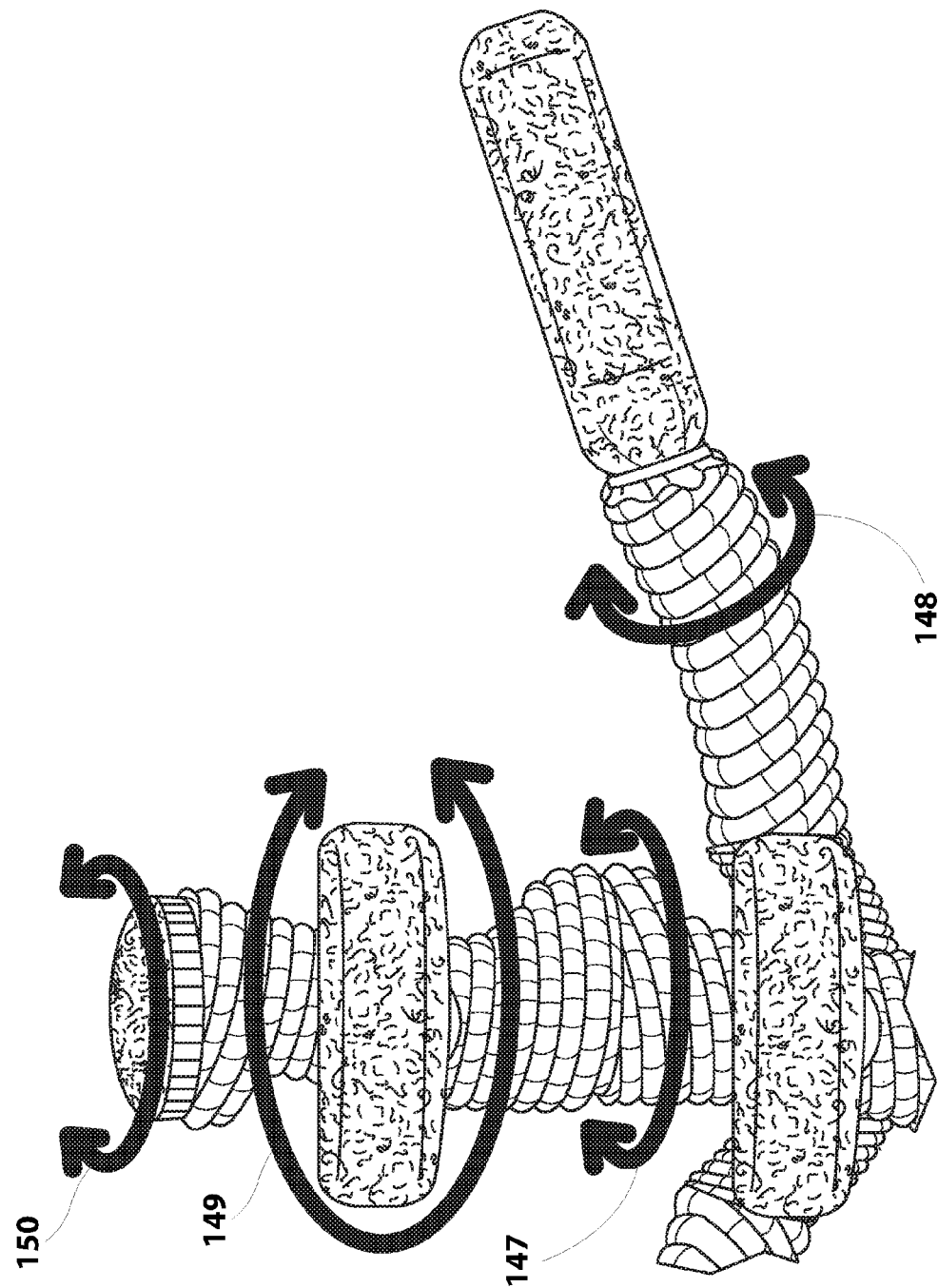
Figure 23B:
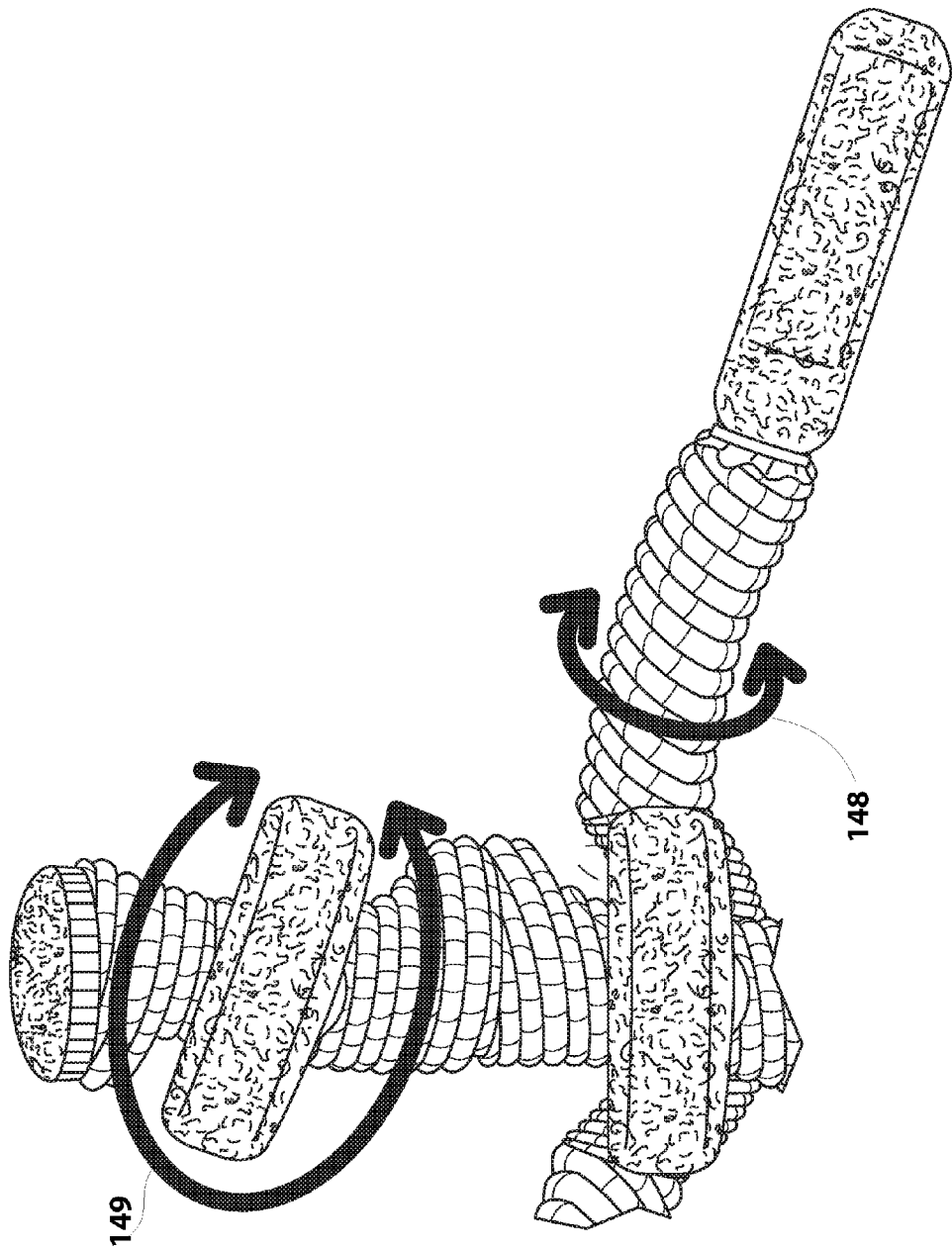
Figure 24A:
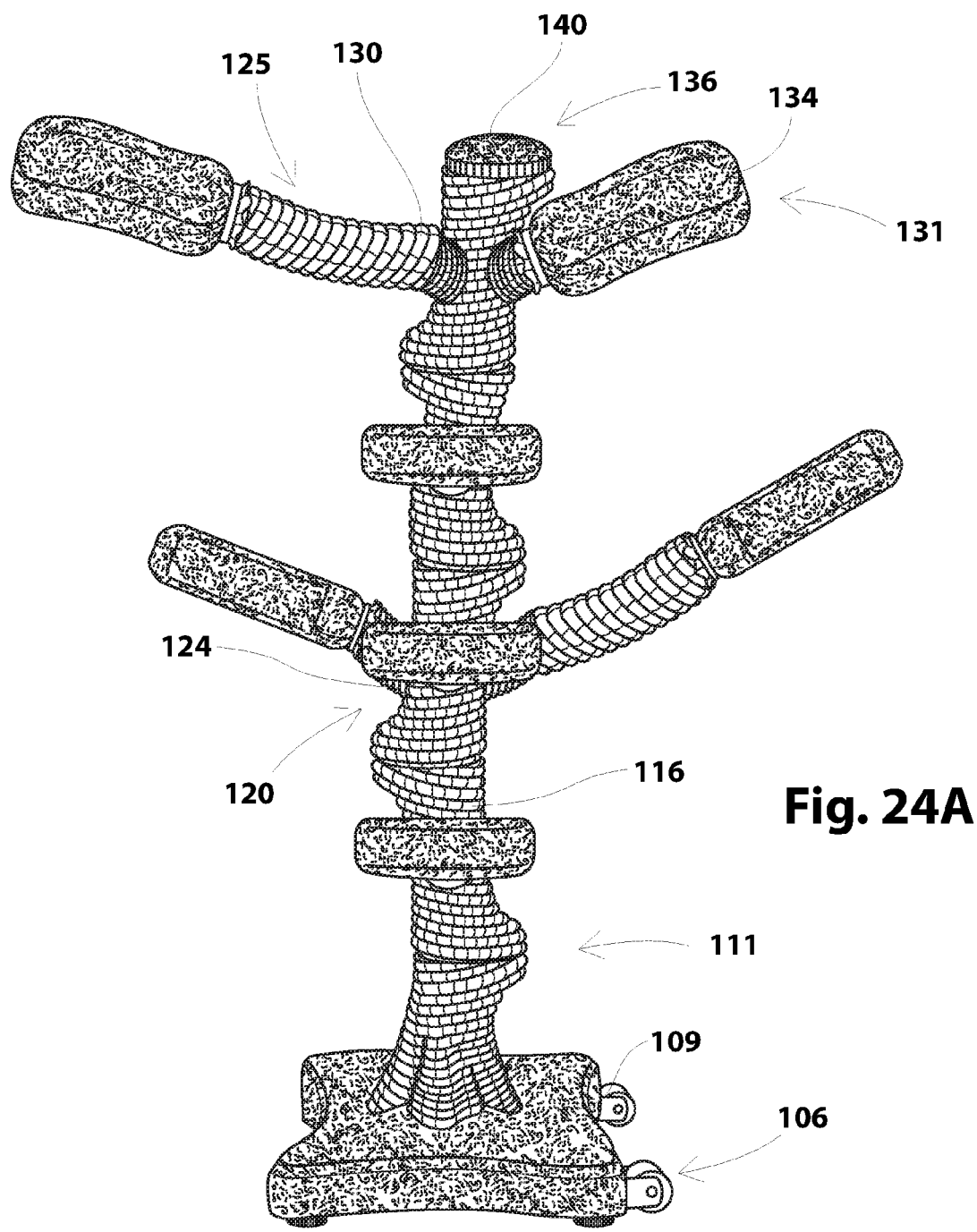
Figure 24B:
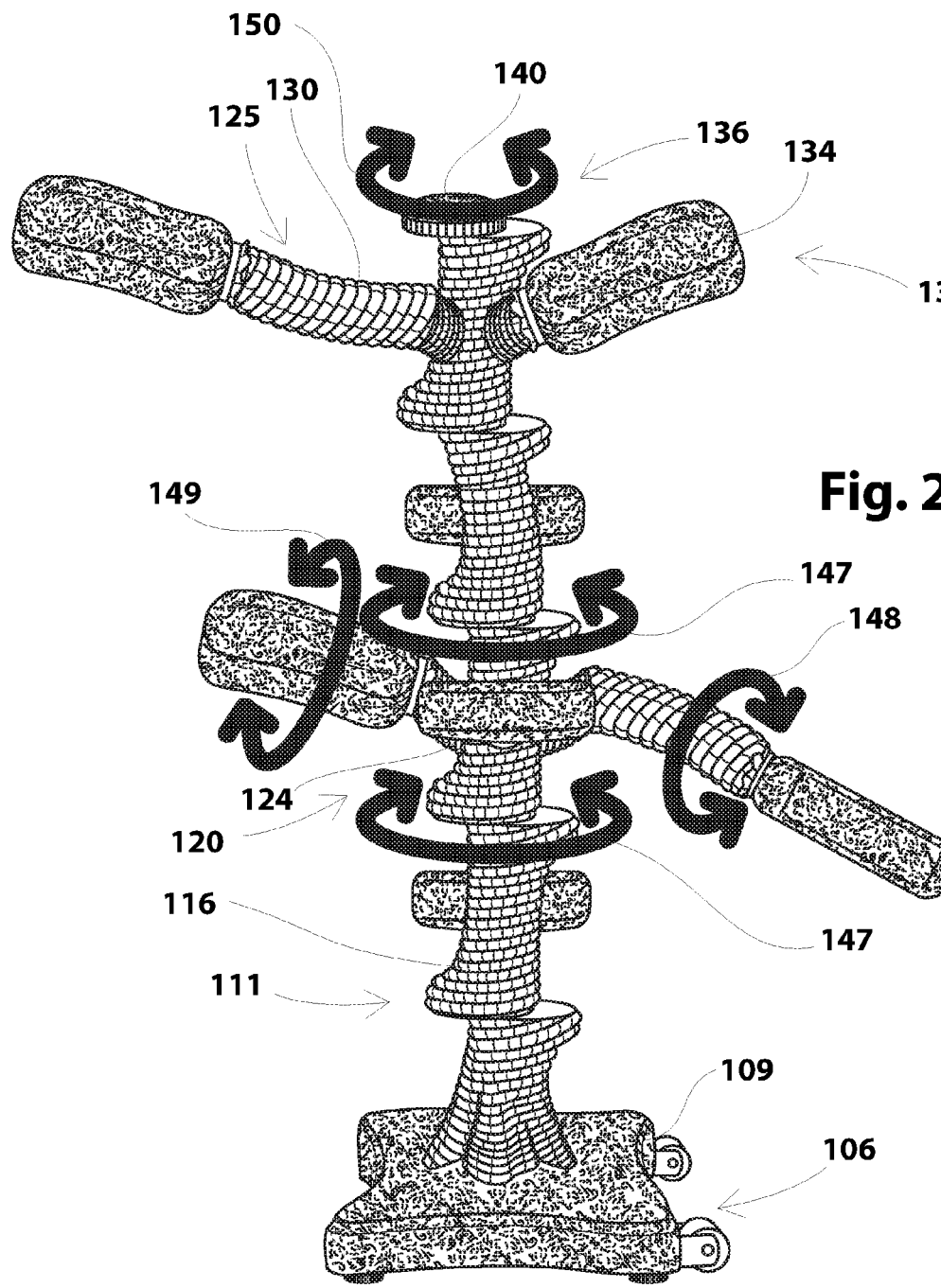
Figure 25A:
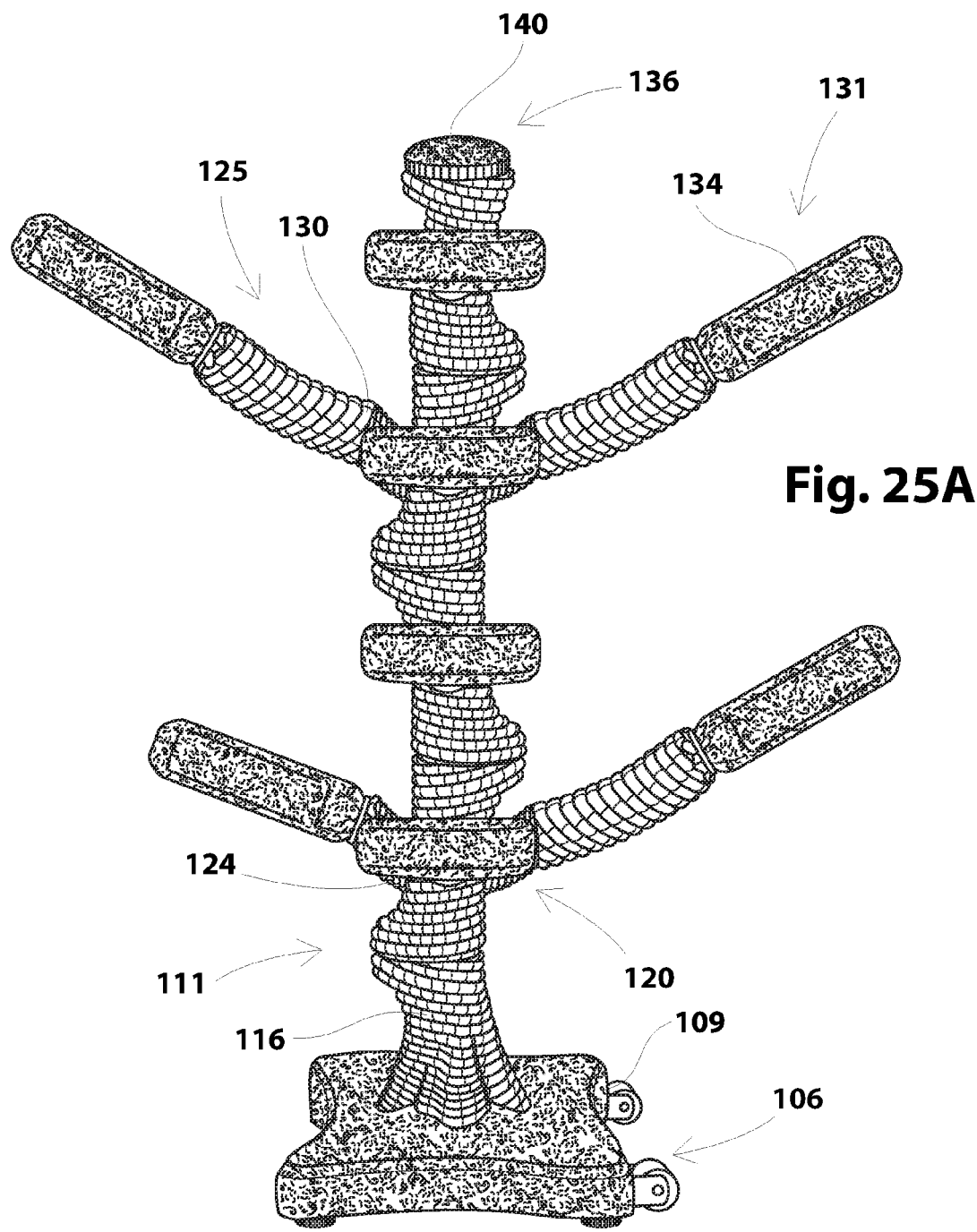
Figure 25B:
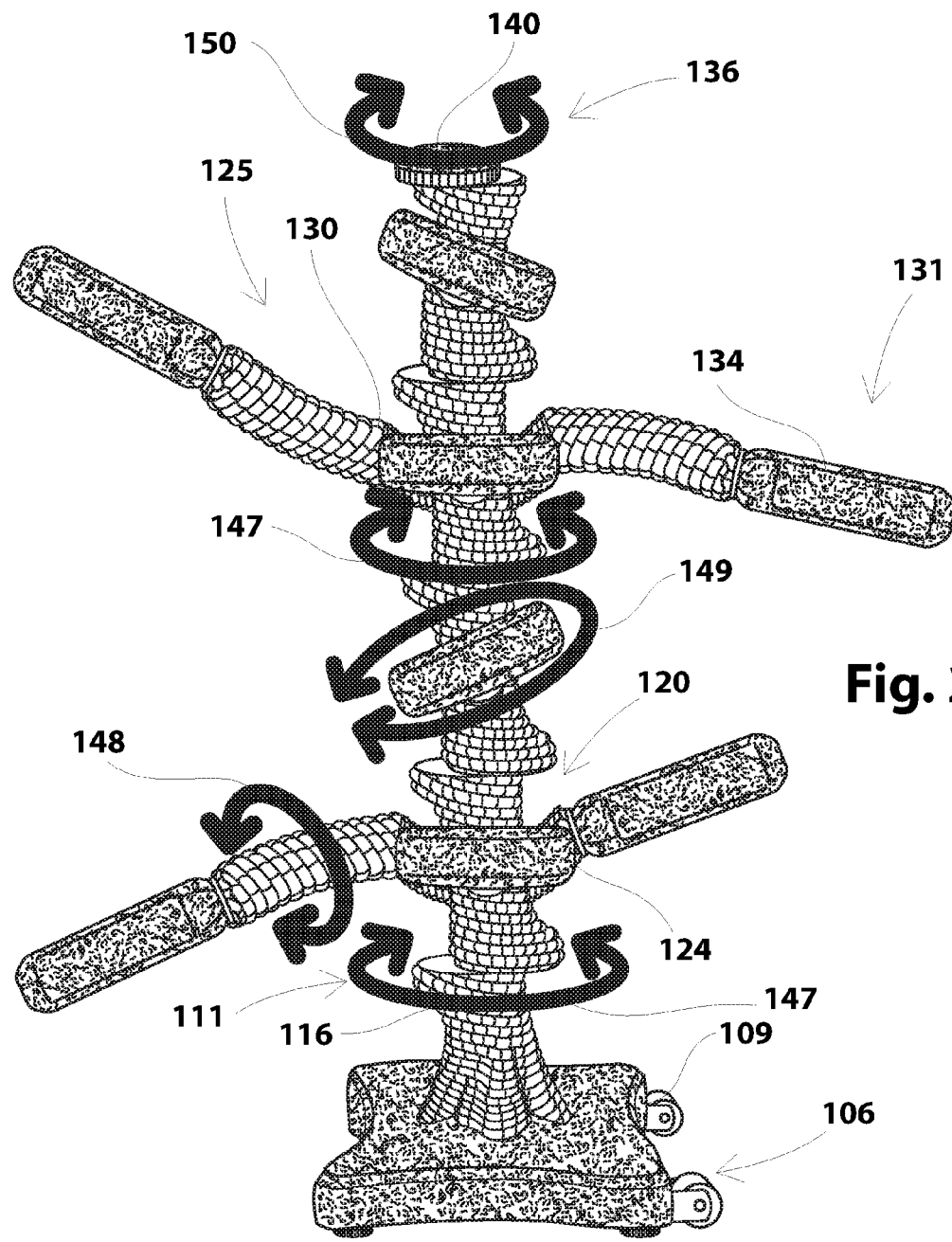
Figure 26B:
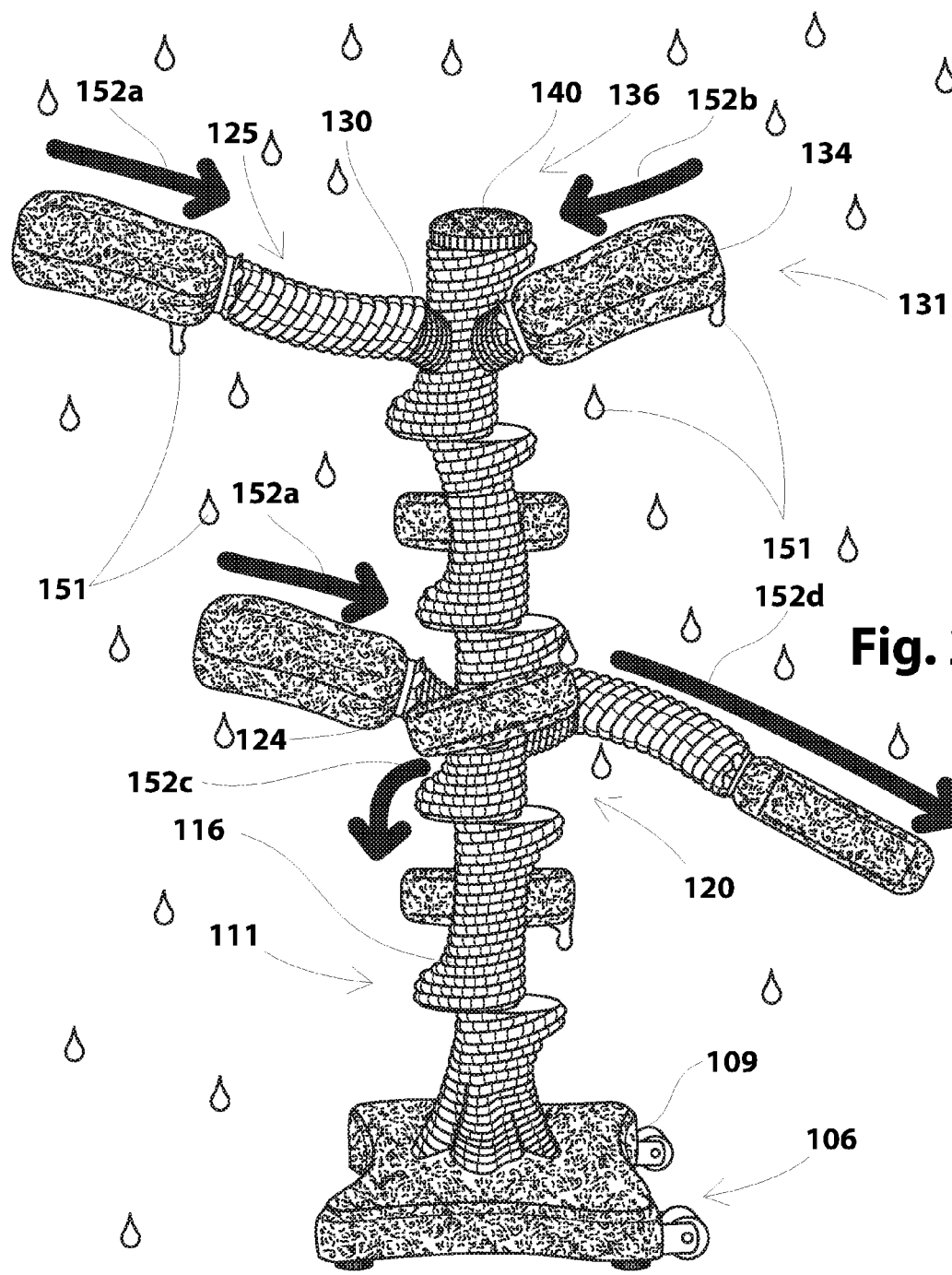

FIGS. 26A and 26B illustrate perspective views of how to drain the rain water from all the individually-adjustable-height leg system, the individually-adjustable-corner pedestal system, the shape-shifting rotatable log system, the shape-shifting rotatable step system, the shape-shifting connector system, the shape-shifting rotatable branch system, the self-draining water-repelling hygienic slanting-platform system, and the self-draining water-repelling hygienic cap system.

Figure 27:
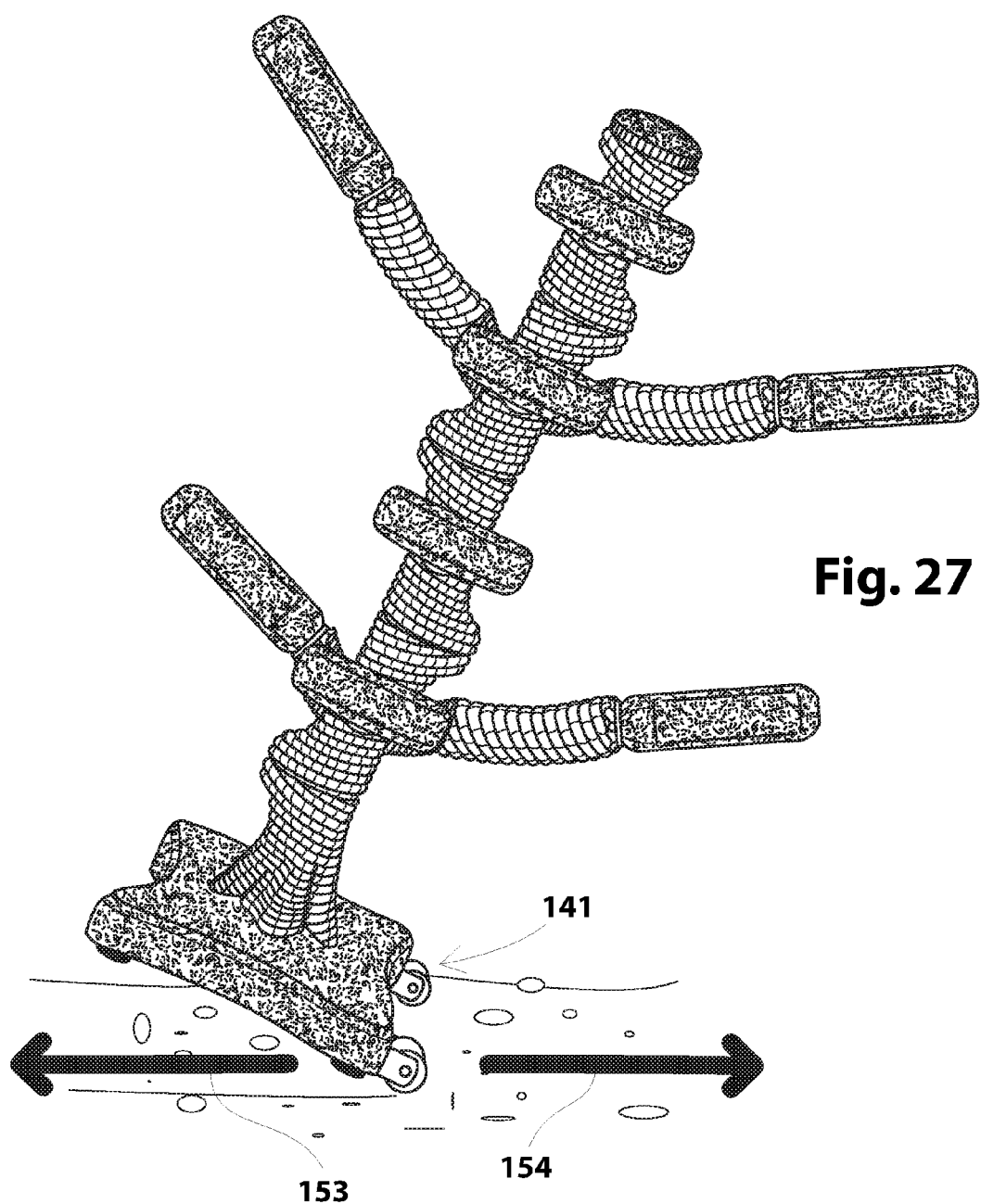

FIG. 27 illustrates a perspective view of how to indoor-use and outdoor-use the unique shape-shifting self-draining water-repelling hygienic indoor-outdoor pet tree system.

Figure 28:
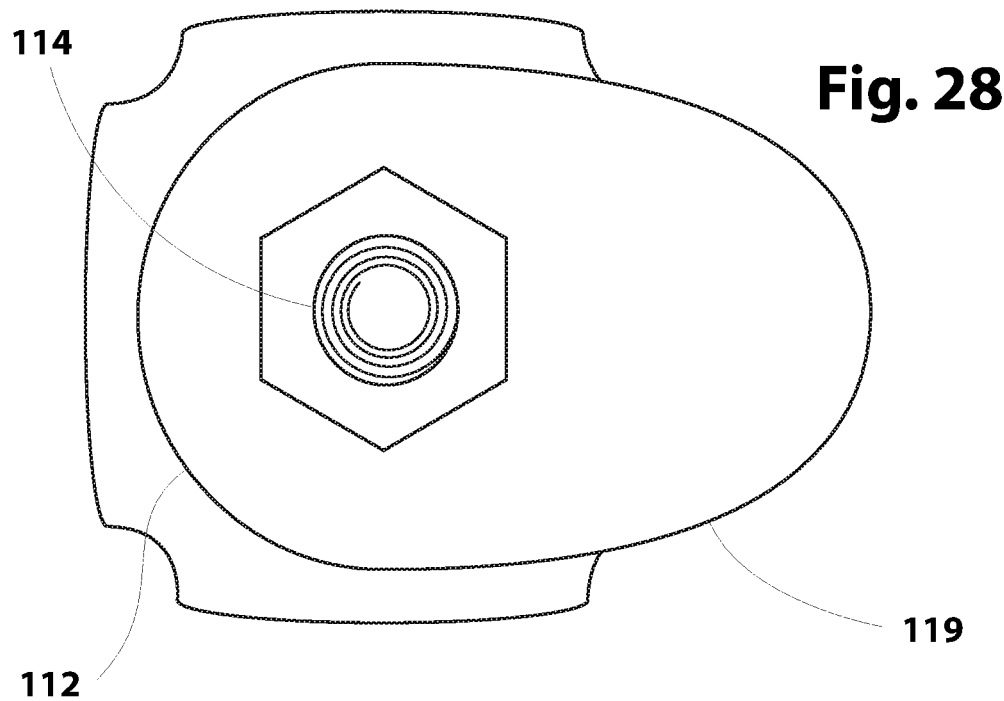
Figure 29:
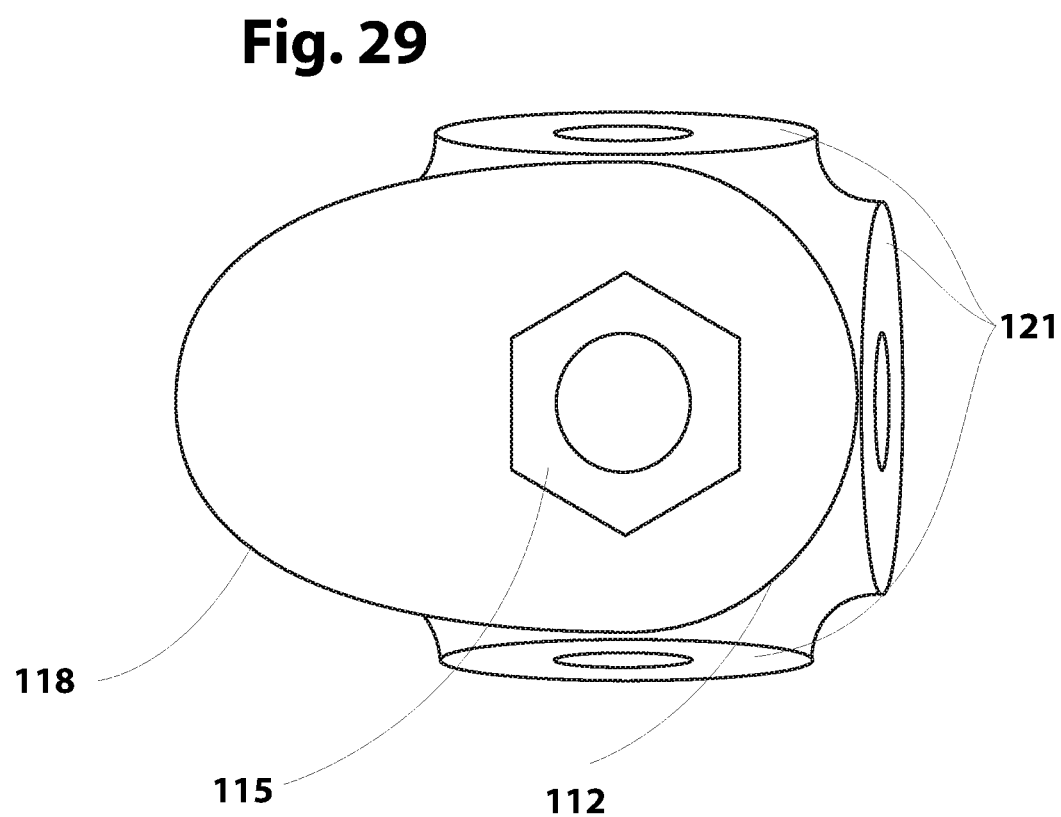

FIGS. 28 and 29 illustrate top and bottom views of how any component(s) of the unique shape-shifting self-draining water-repelling hygienic indoor-outdoor pet tree system can be attached to any of its other component(s).

Figure 30A:
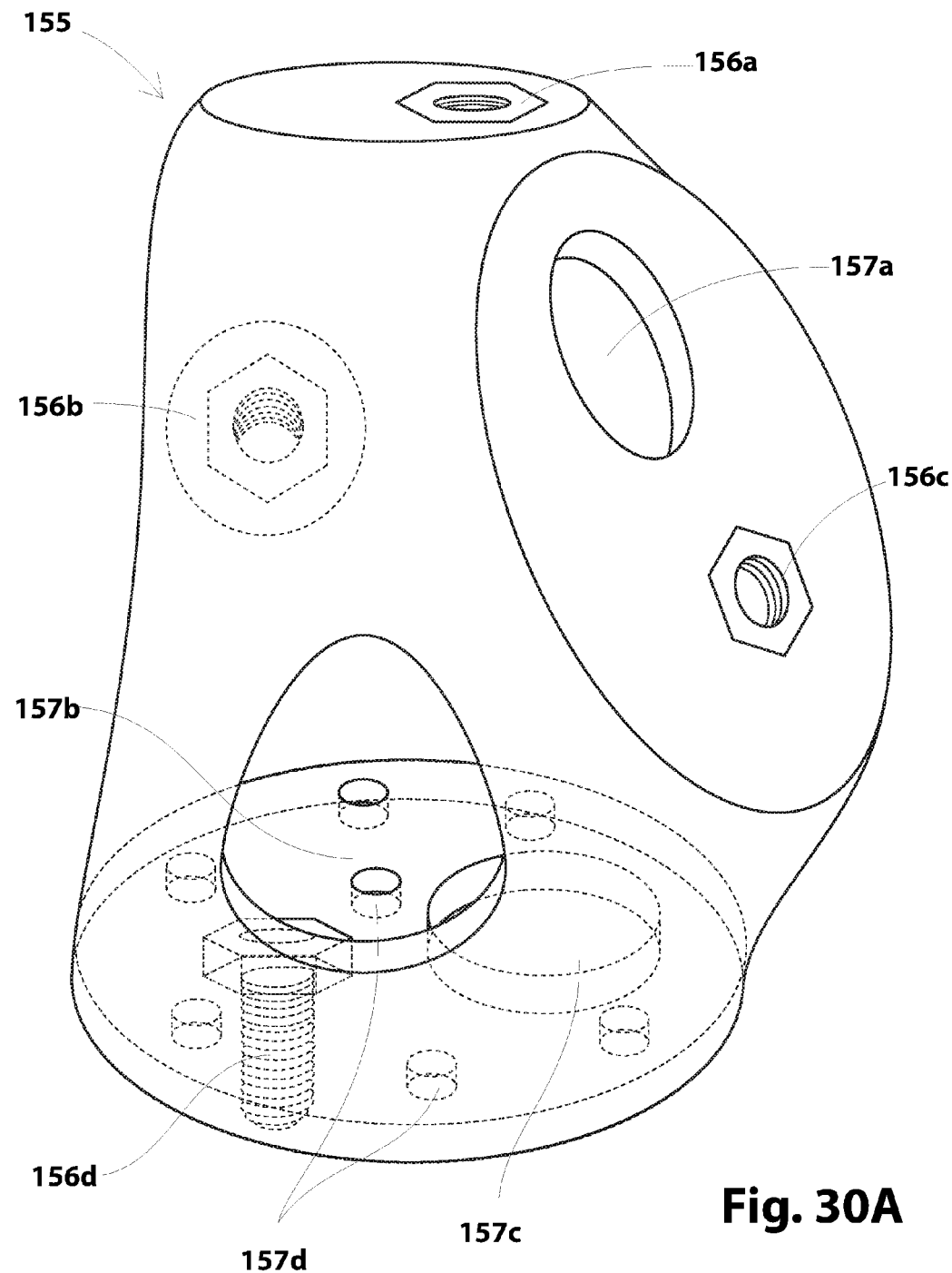
Figure 30B:
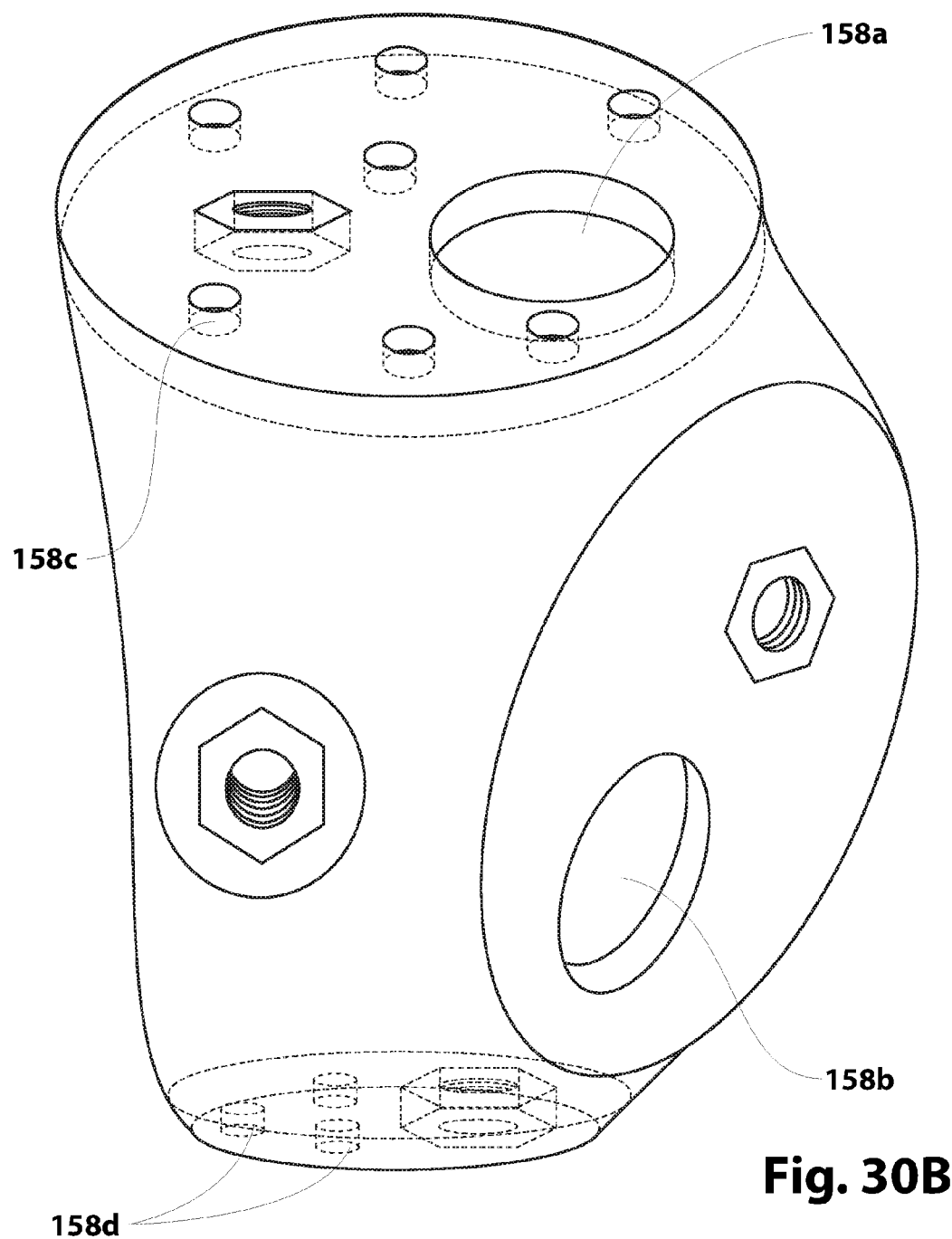
Figure 30C:
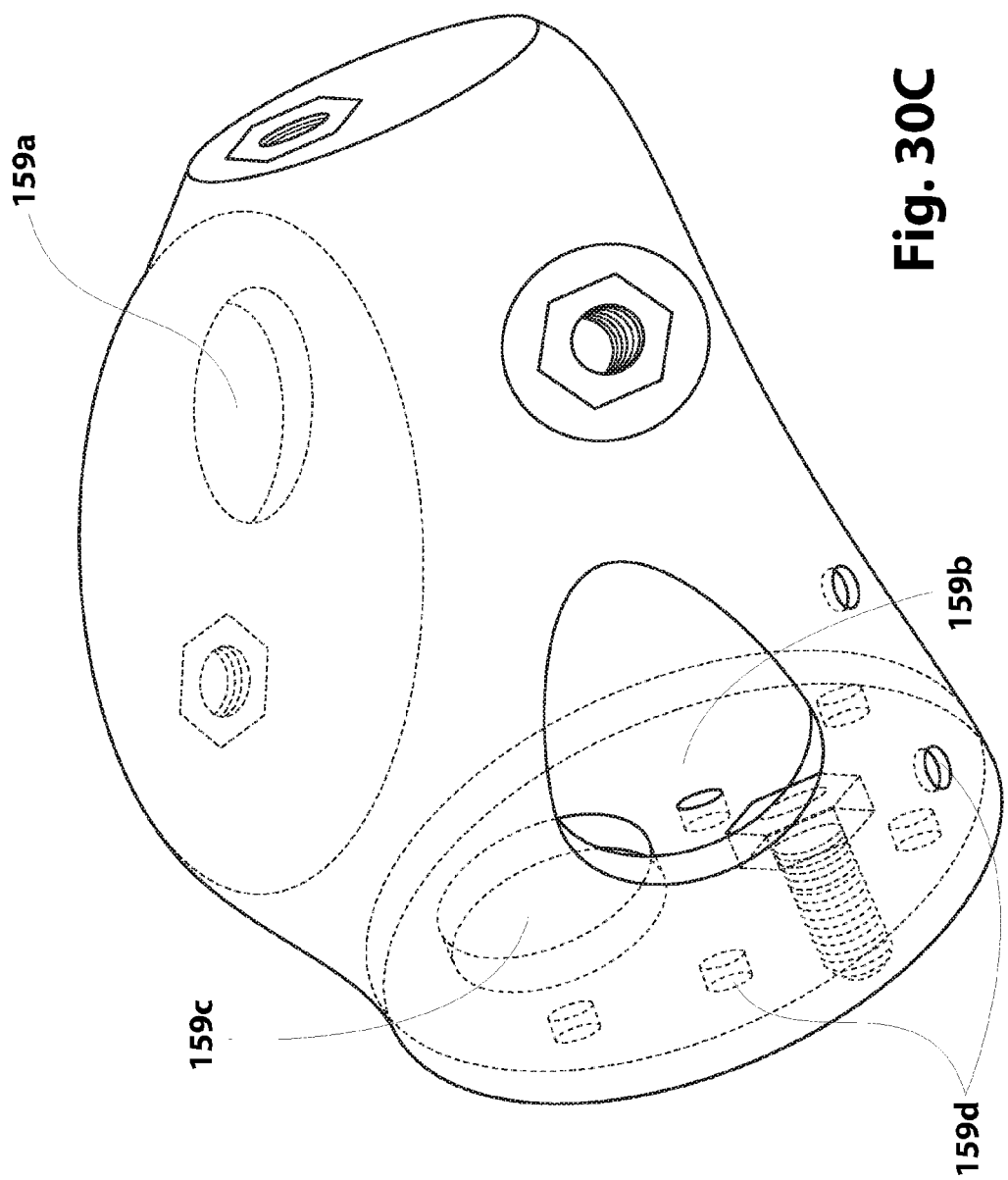

FIGS. 30A, 30B, and 30C illustrate a first house or condo, a second house or condo, and a third house or condo, respectively.

Figure 31:
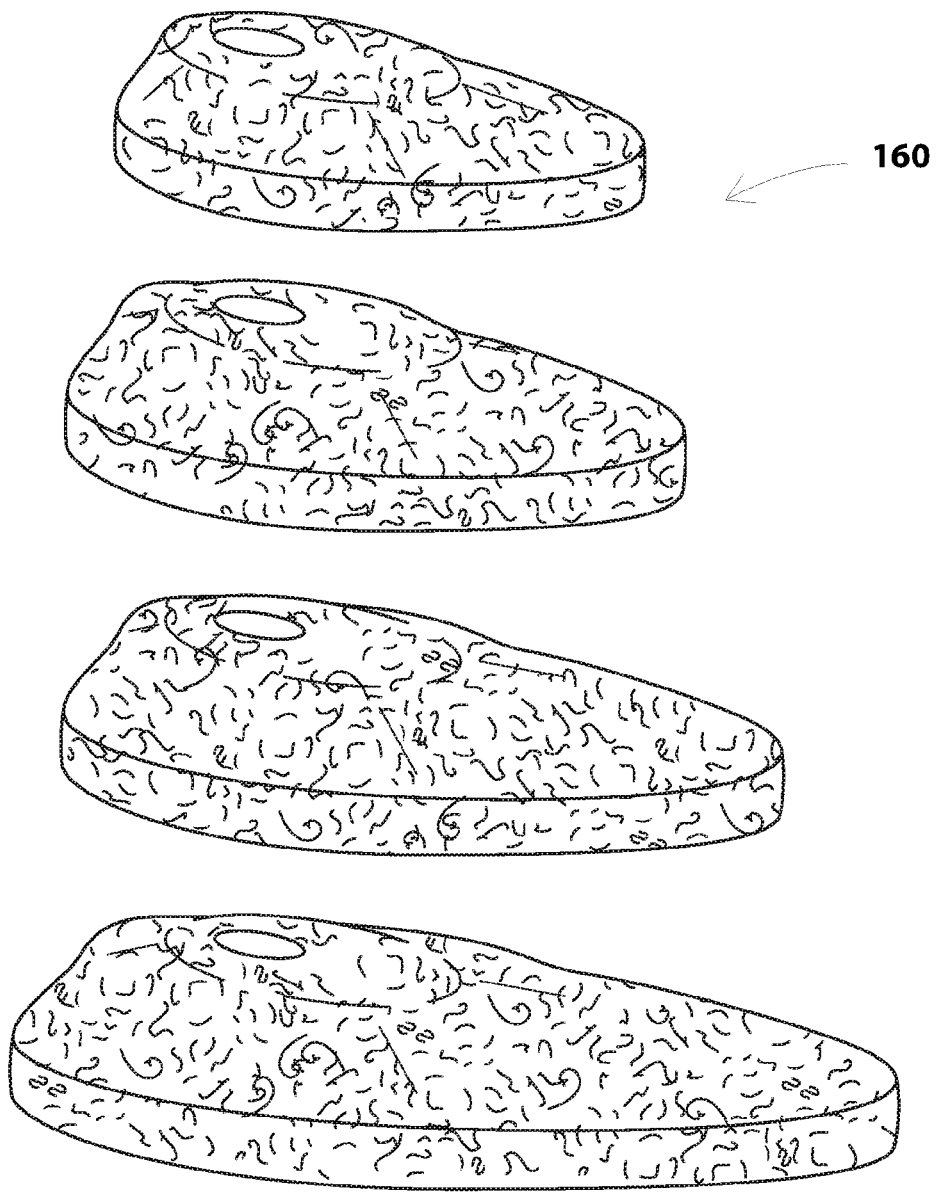
Figure 32:
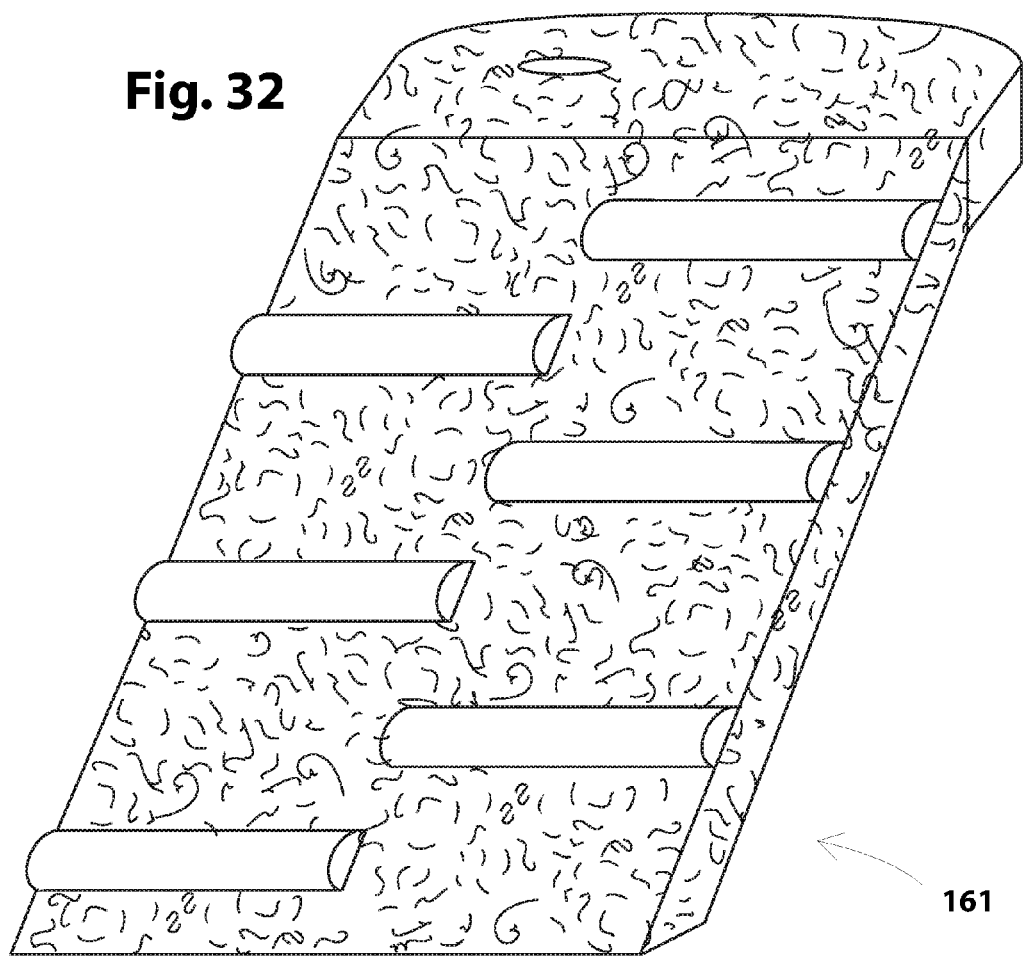

FIGS. 31 and 32 illustrate slanting ladder and/or slanting staircase, respectively.

Figure 33:
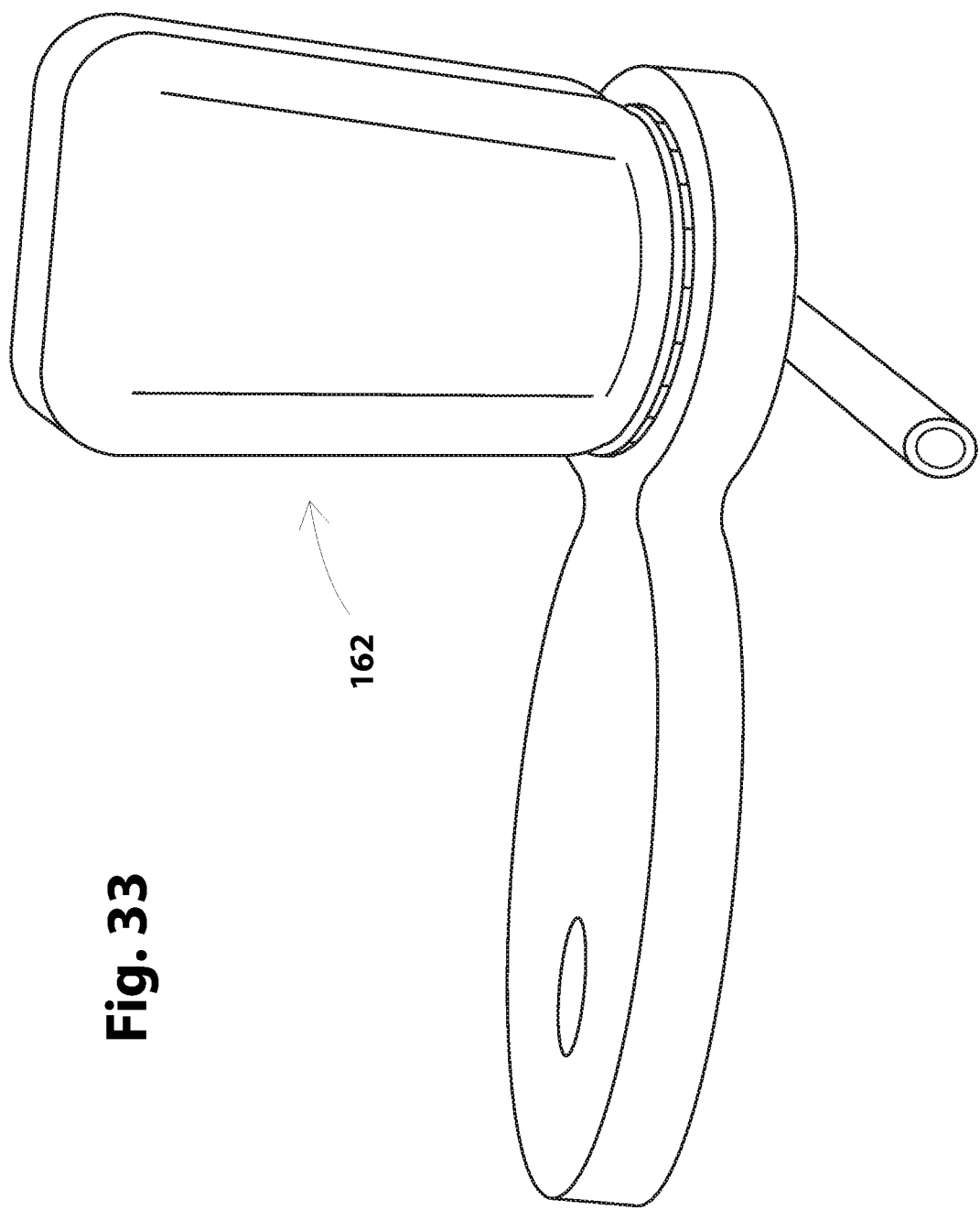
Figure 34:
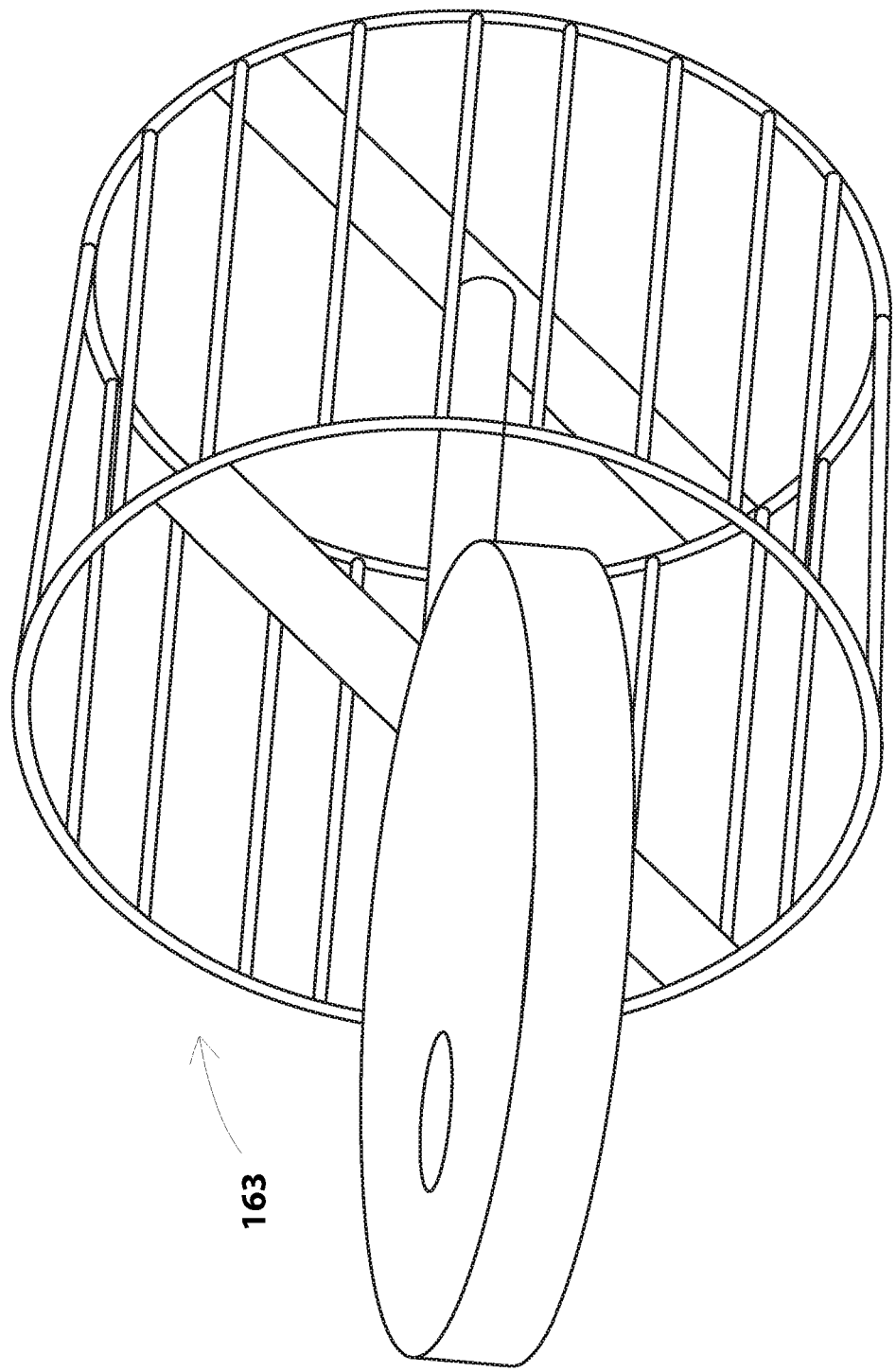
Figure 35:
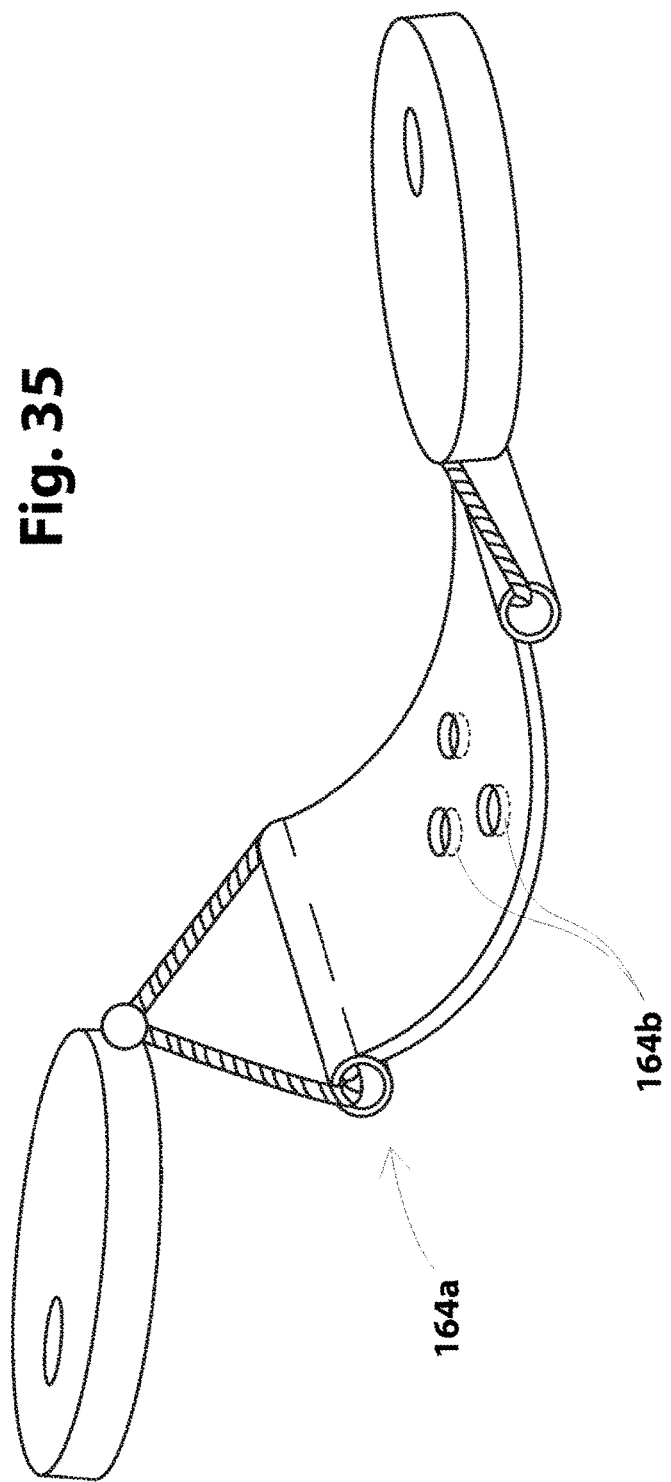
Figure 36:
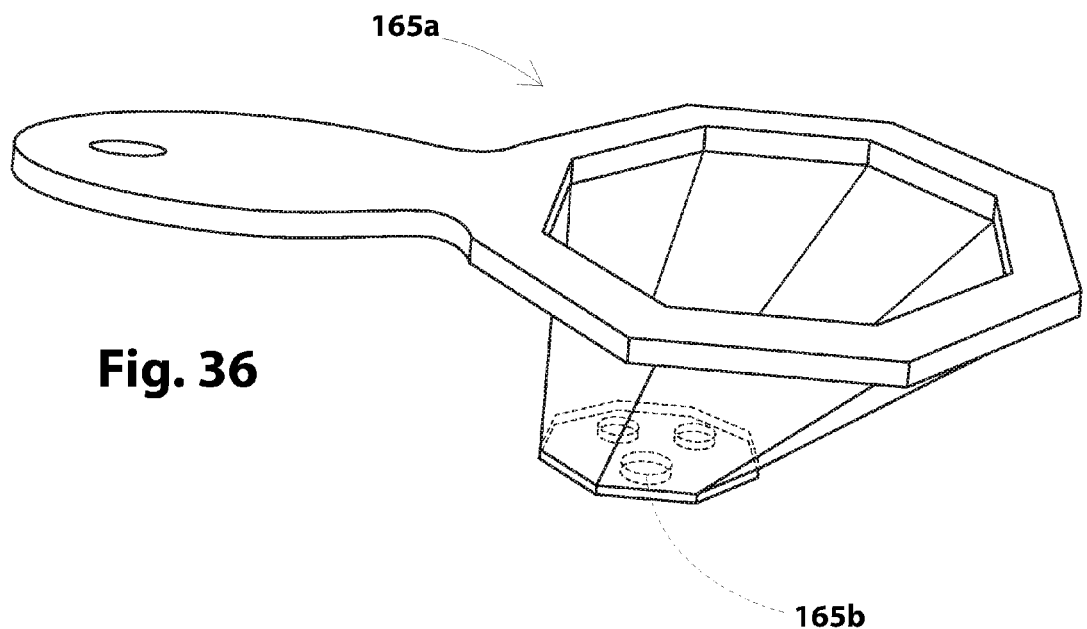
Figure 37:
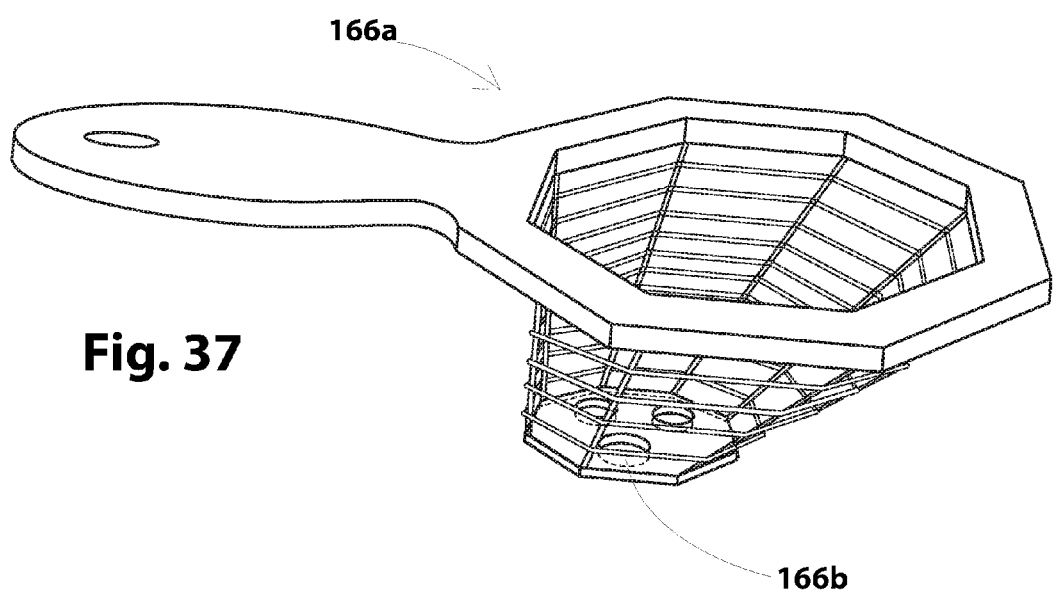
Figure 38:
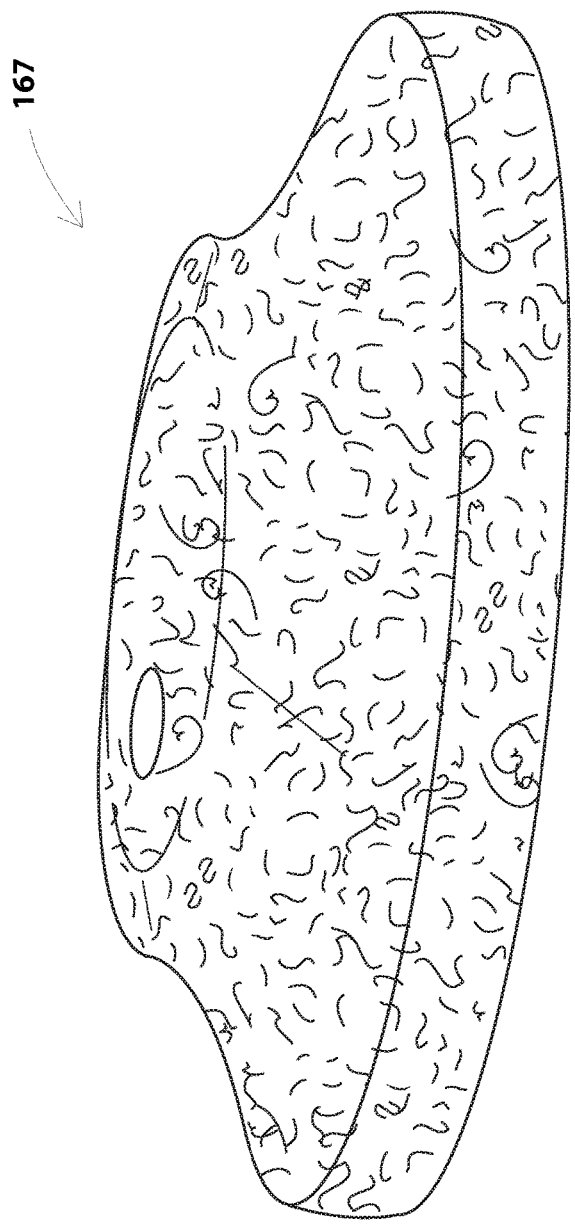
Figure 39:
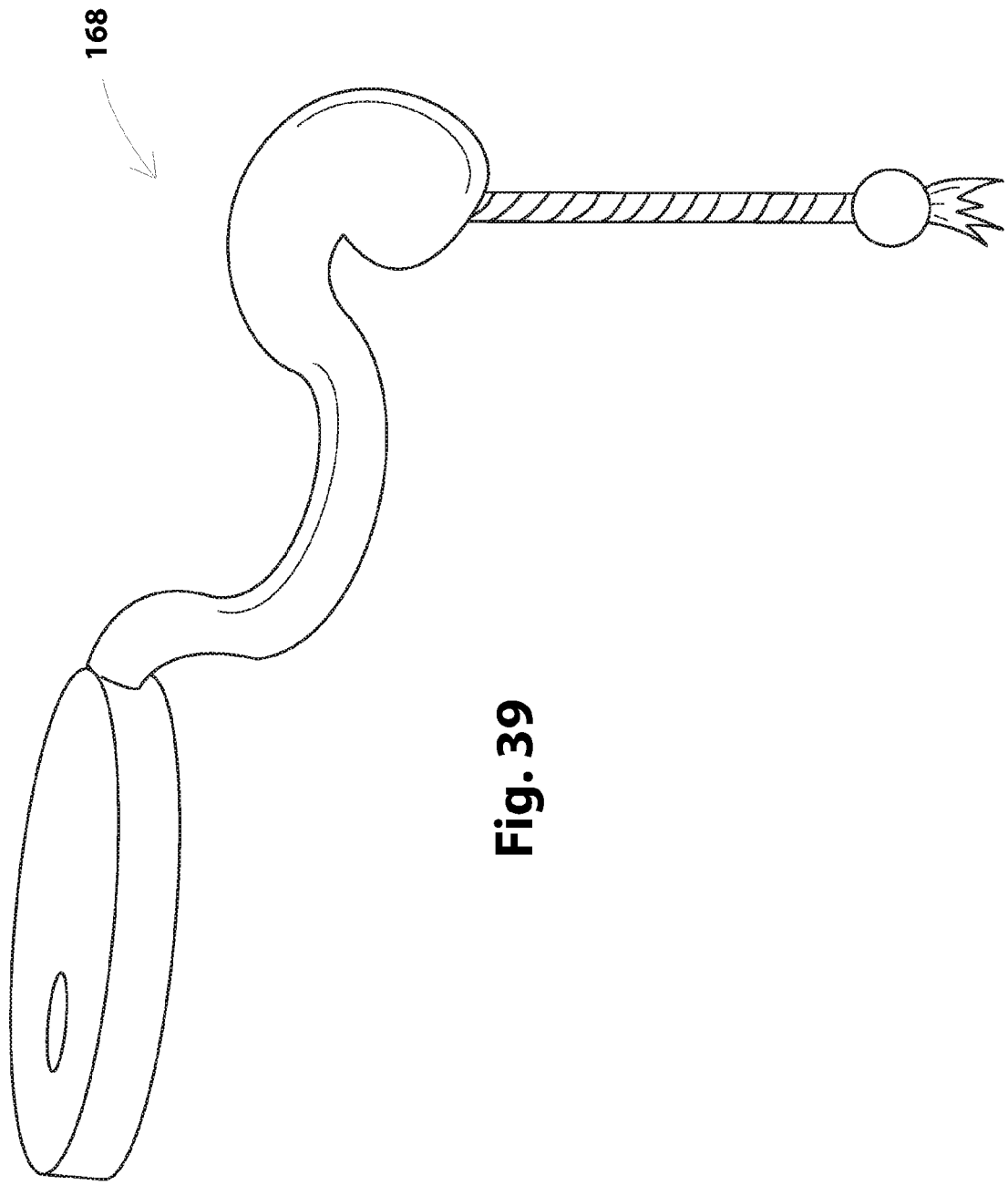
Figure 42B:
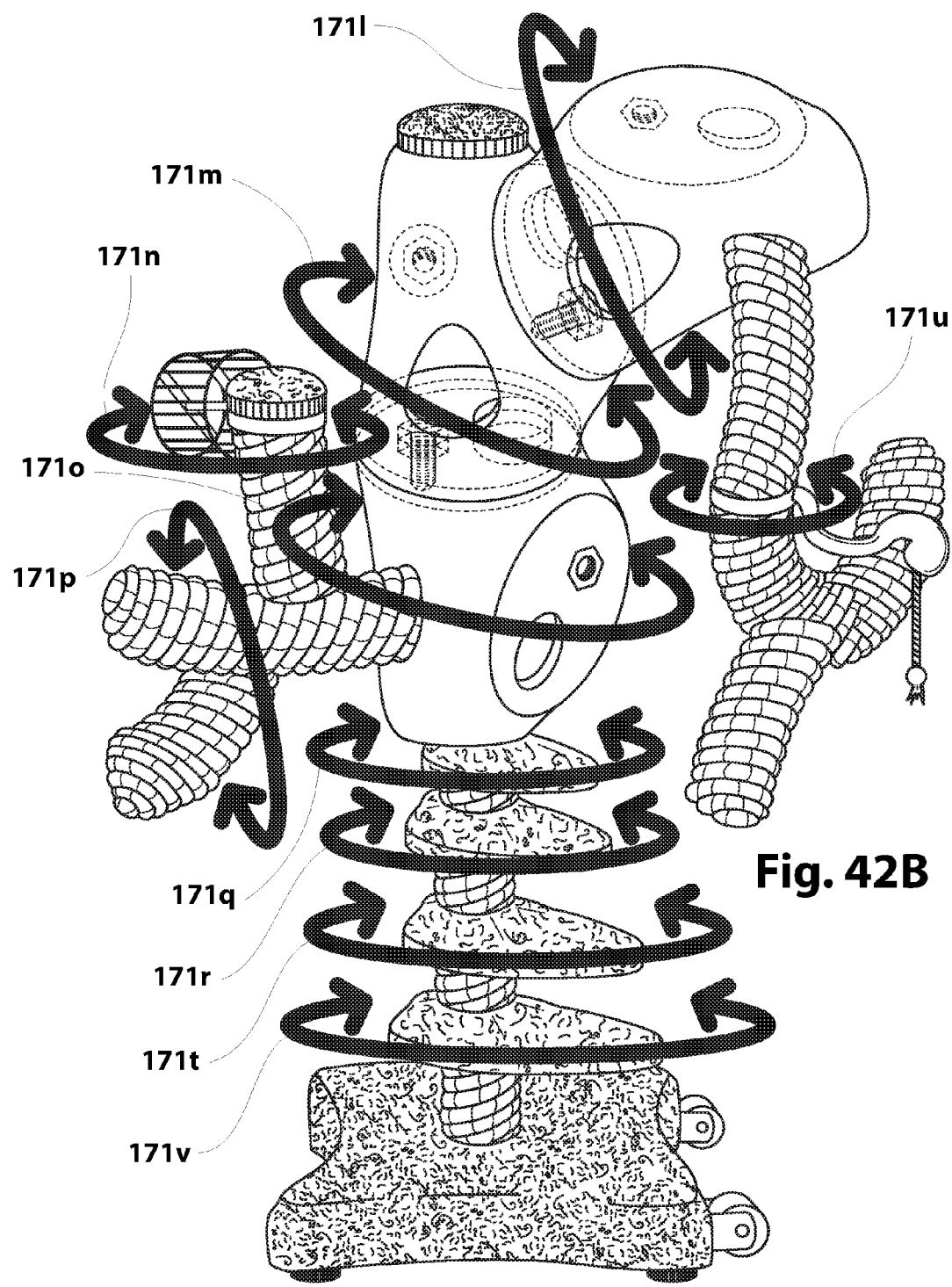
Figure 42C:
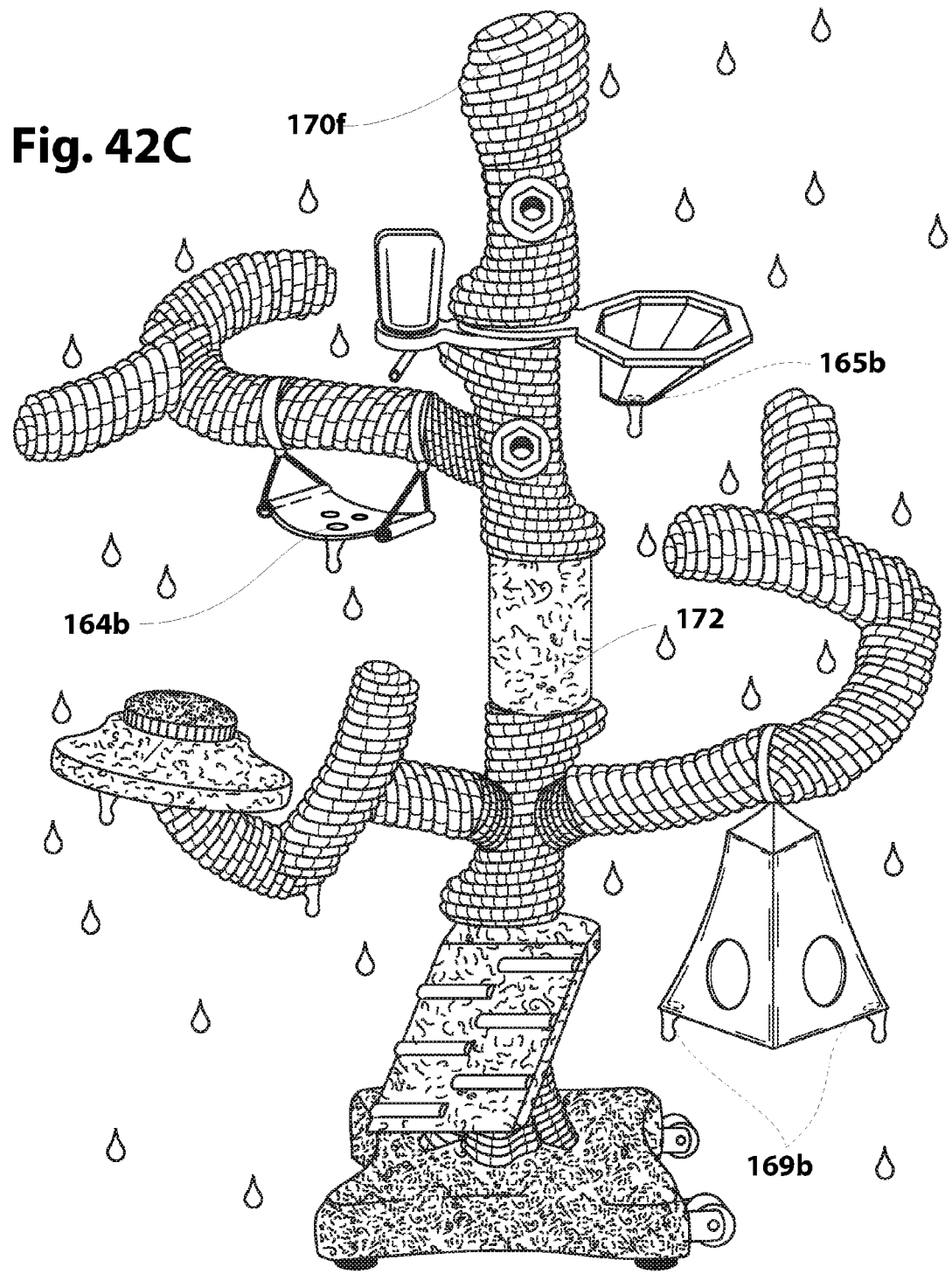
Figure 42D:
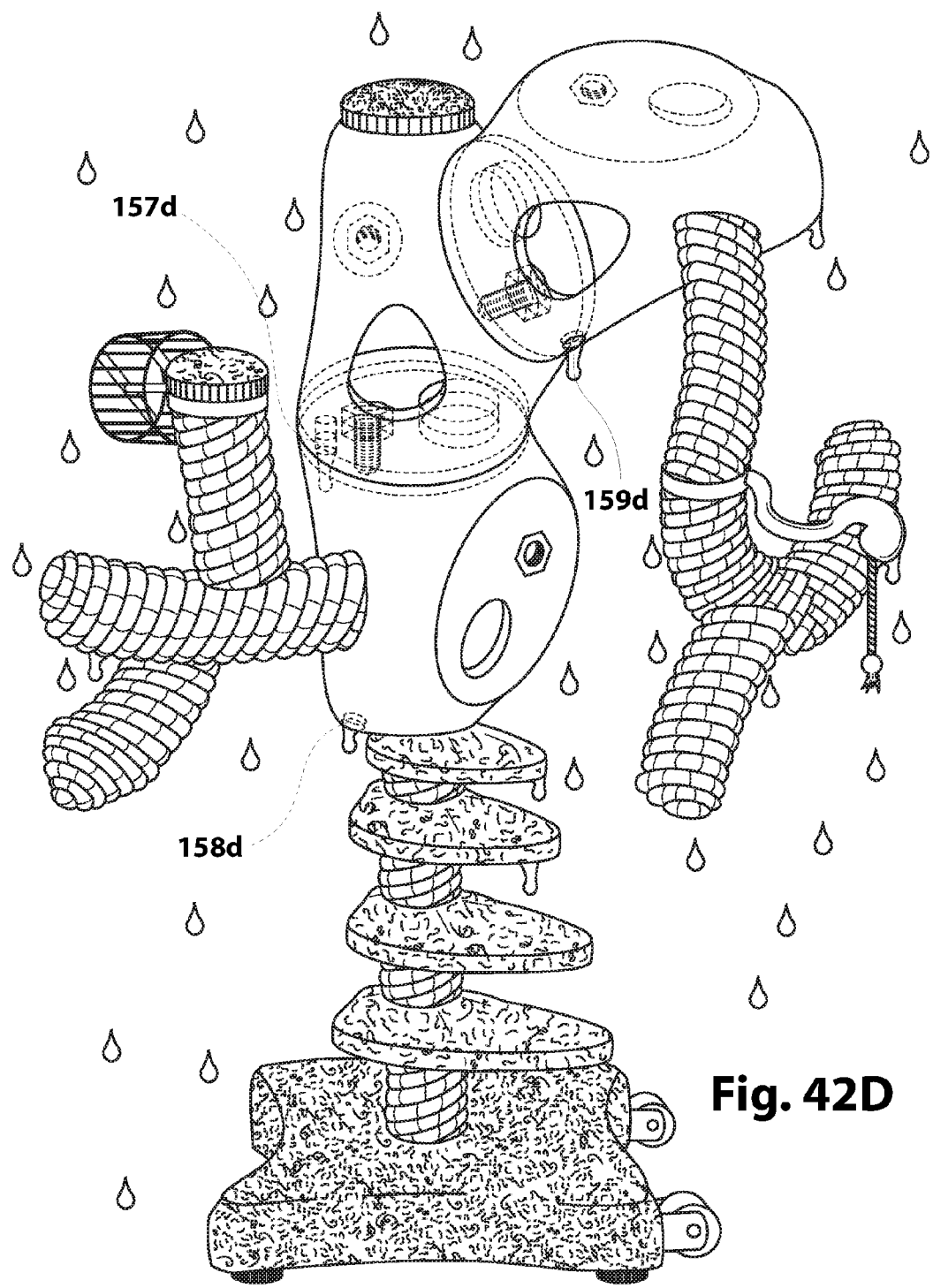

FIGS. 33, 34, and 35 illustrate slanting water bottle, slanting spinning wheel, and/or slanting hammock having water-draining holes, respectively.

FIGS. 36, 37, 38, 39, and 40 illustrate slanting feeder bowl having water-draining holes, slanting wire basket having water-draining holes, slanting exercise platform, slanting exercise perch and rope, and/or suspended house or suspended condo having water-draining holes, respectively.

FIGS. 41A, 41B, 41C, and 41D illustrate slanting ceiling connectors, each having a tree screw for screwing on the unique shape-shifting self-draining water-repelling hygienic indoor-outdoor slanting pet tree system, and each having a screw plate for being screwed on a ceiling.

FIG. 41E illustrates a ceiling-connector cap for covering either one of the ceiling connectors.

FIGS. 42A, 42B, 42C, and 42D illustrate at least one slanting solid or hollowed log system, step system, connector system, branch system, platform system, cap system, house system, and/or condo system.

FIGS. 43A, 43B, 43C, and 43D illustrate equivalent variations of slanting log system, slanting step system, slanting connector system, slanting branch system, and/or slanting platform system.

Figures 44A, 44B:
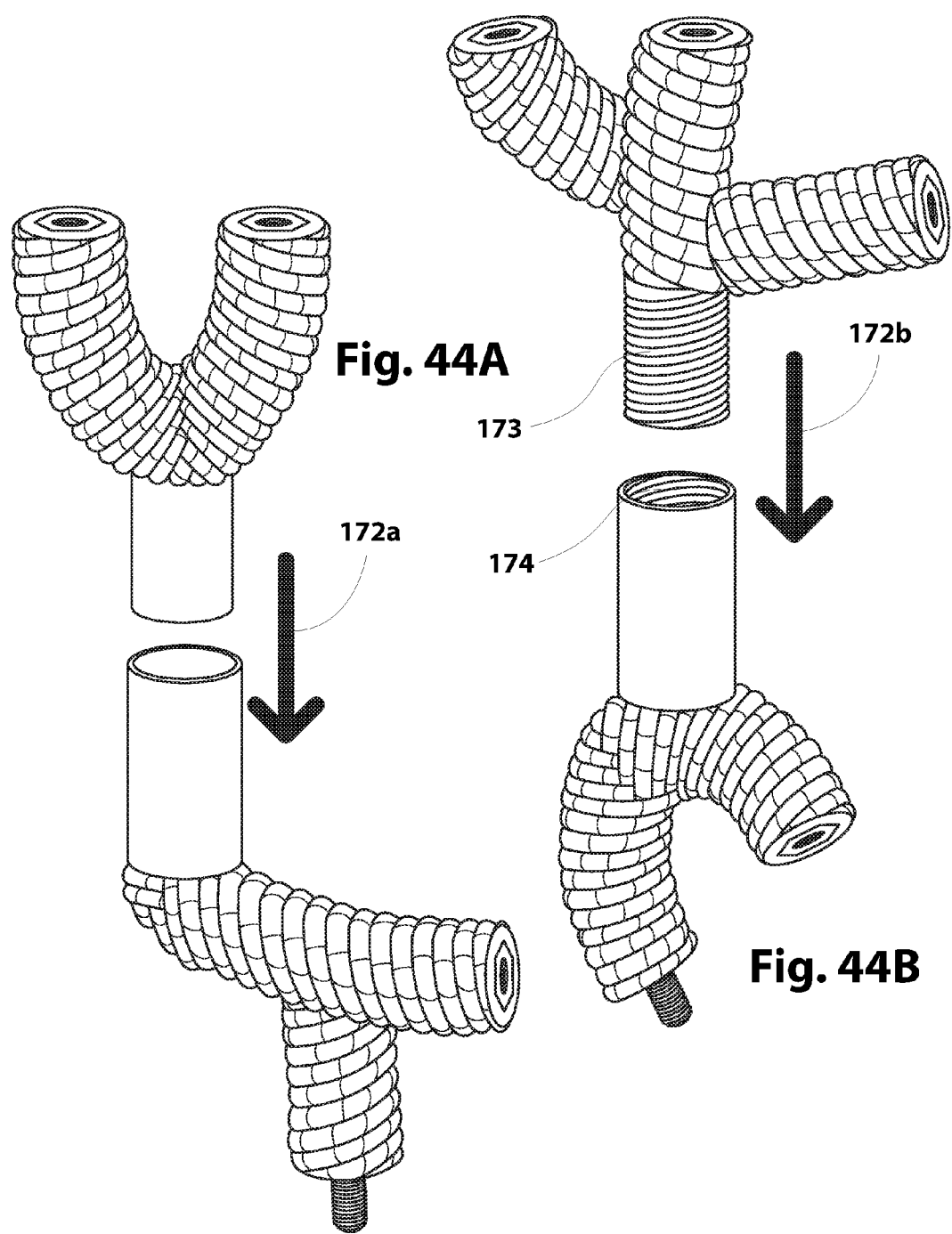
Figure 45A:
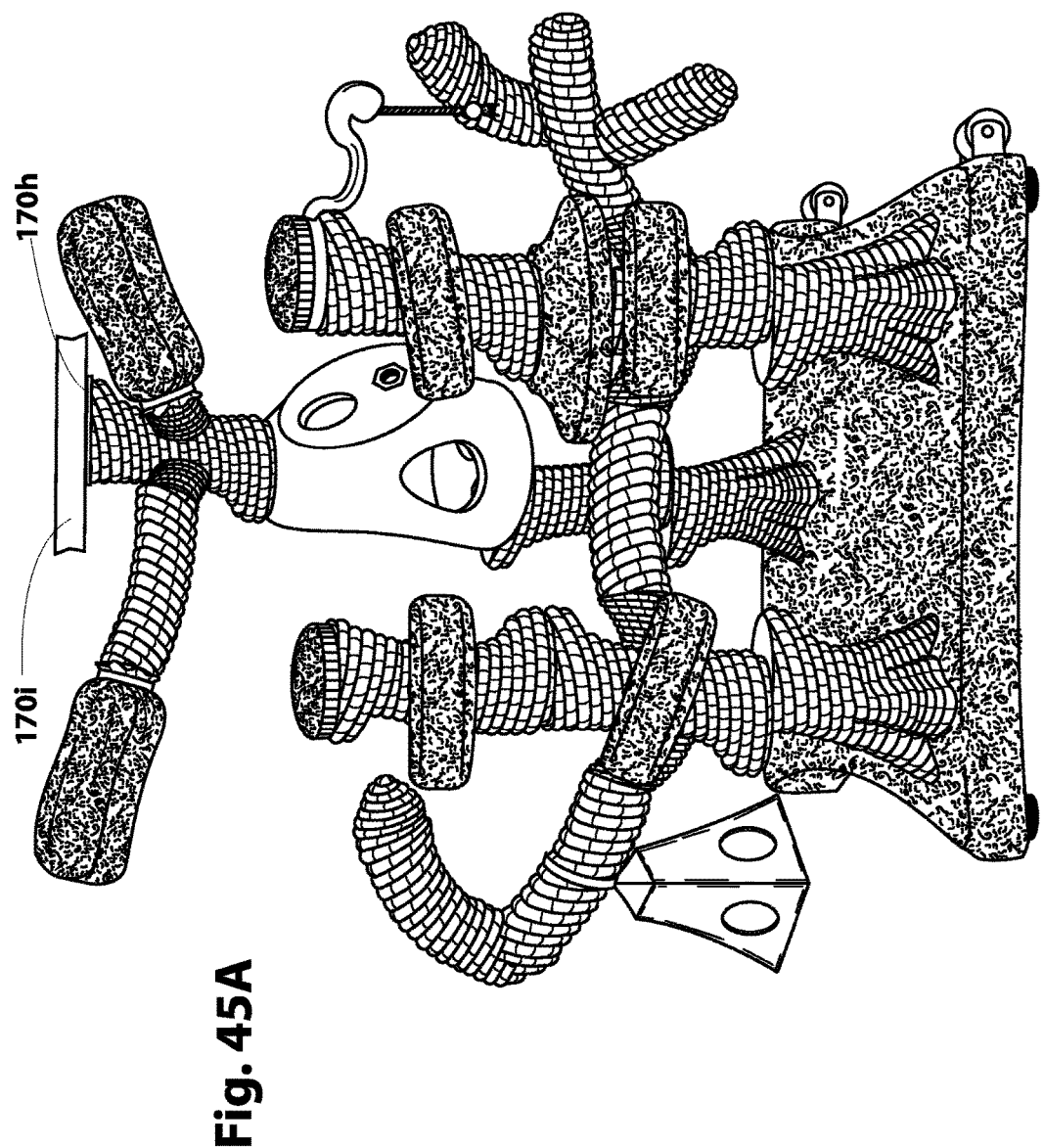
Figure 45B:
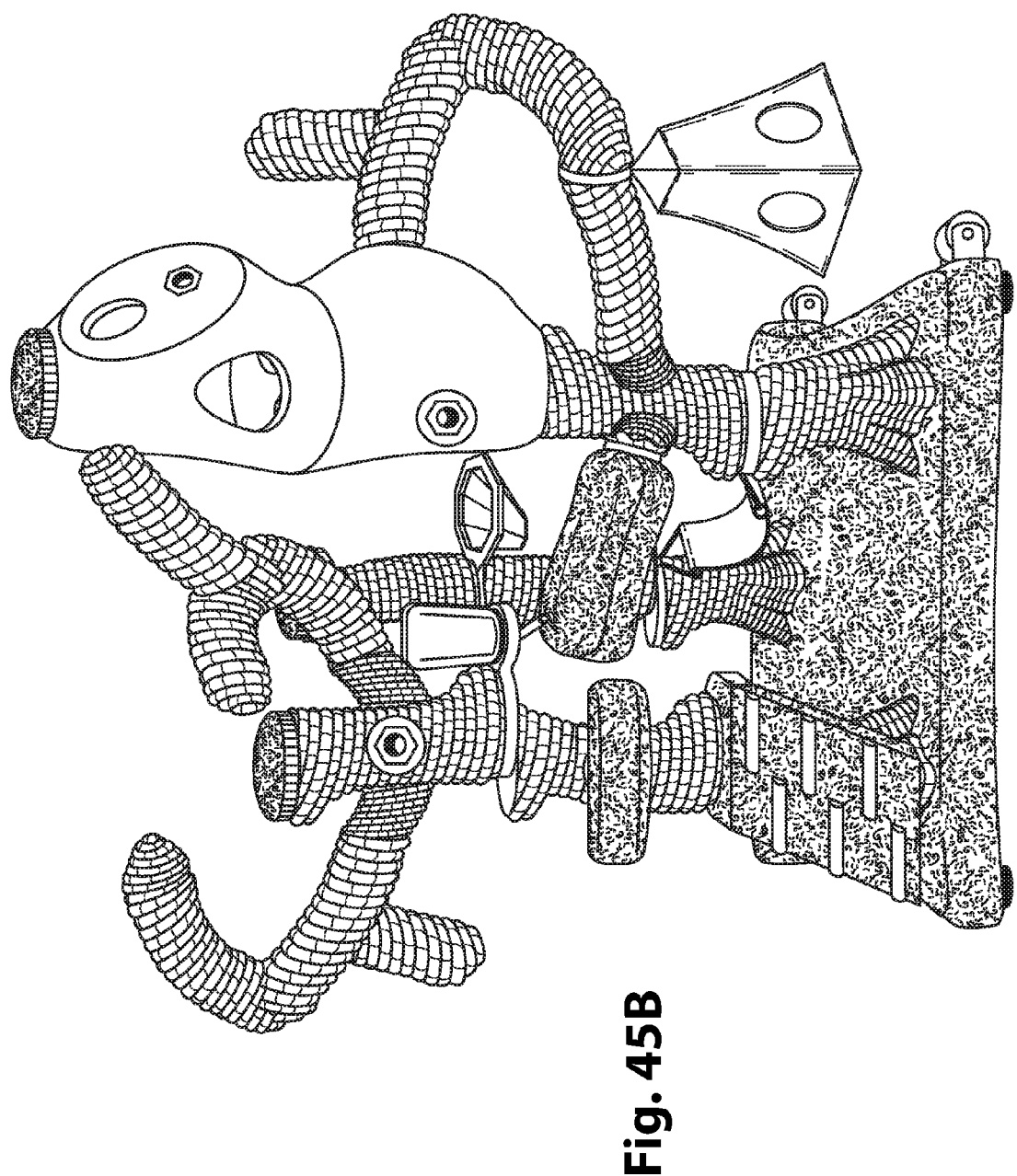
Figure 45C:
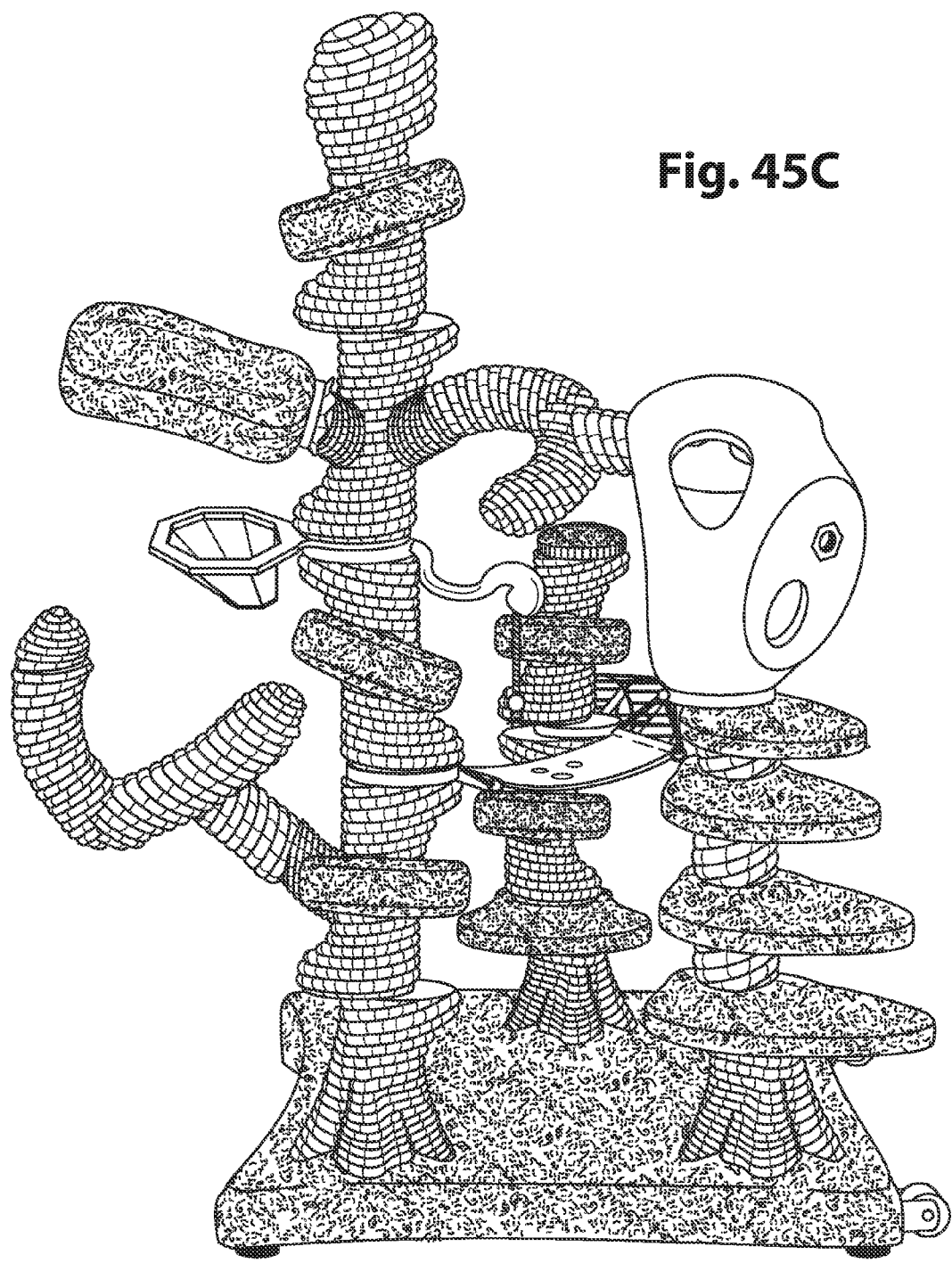
Figure 46A:
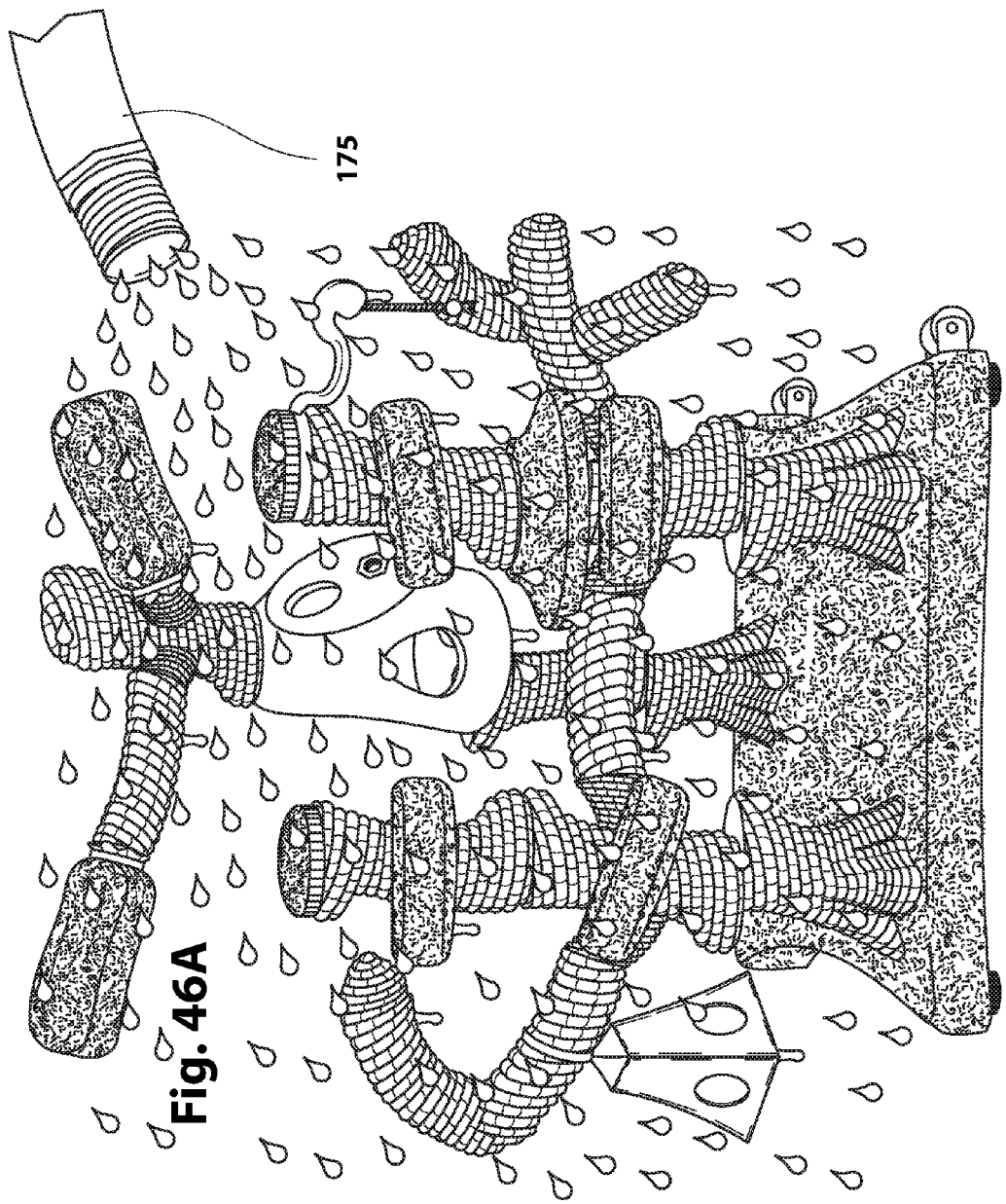
Figure 46B:
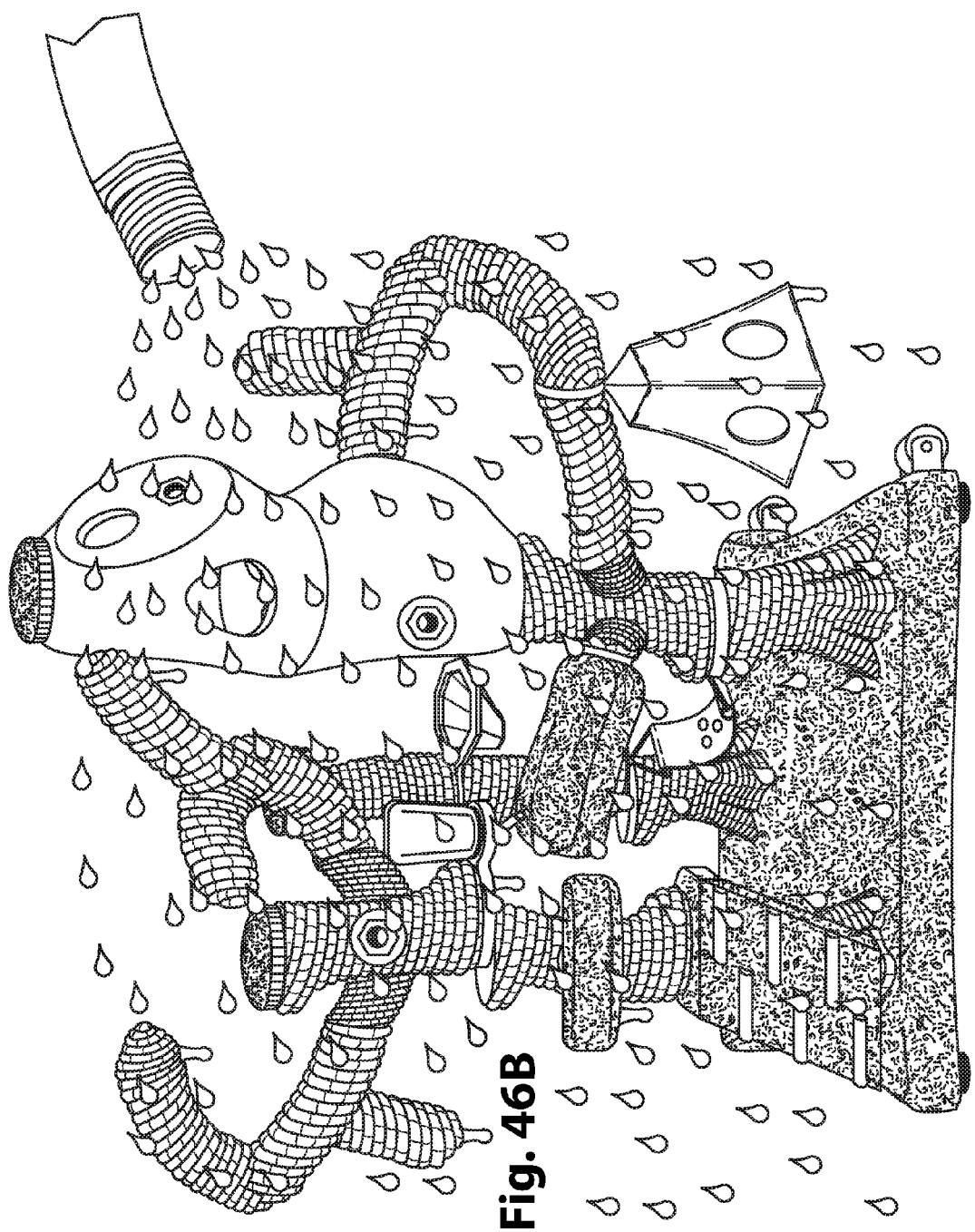
Figure 46C:
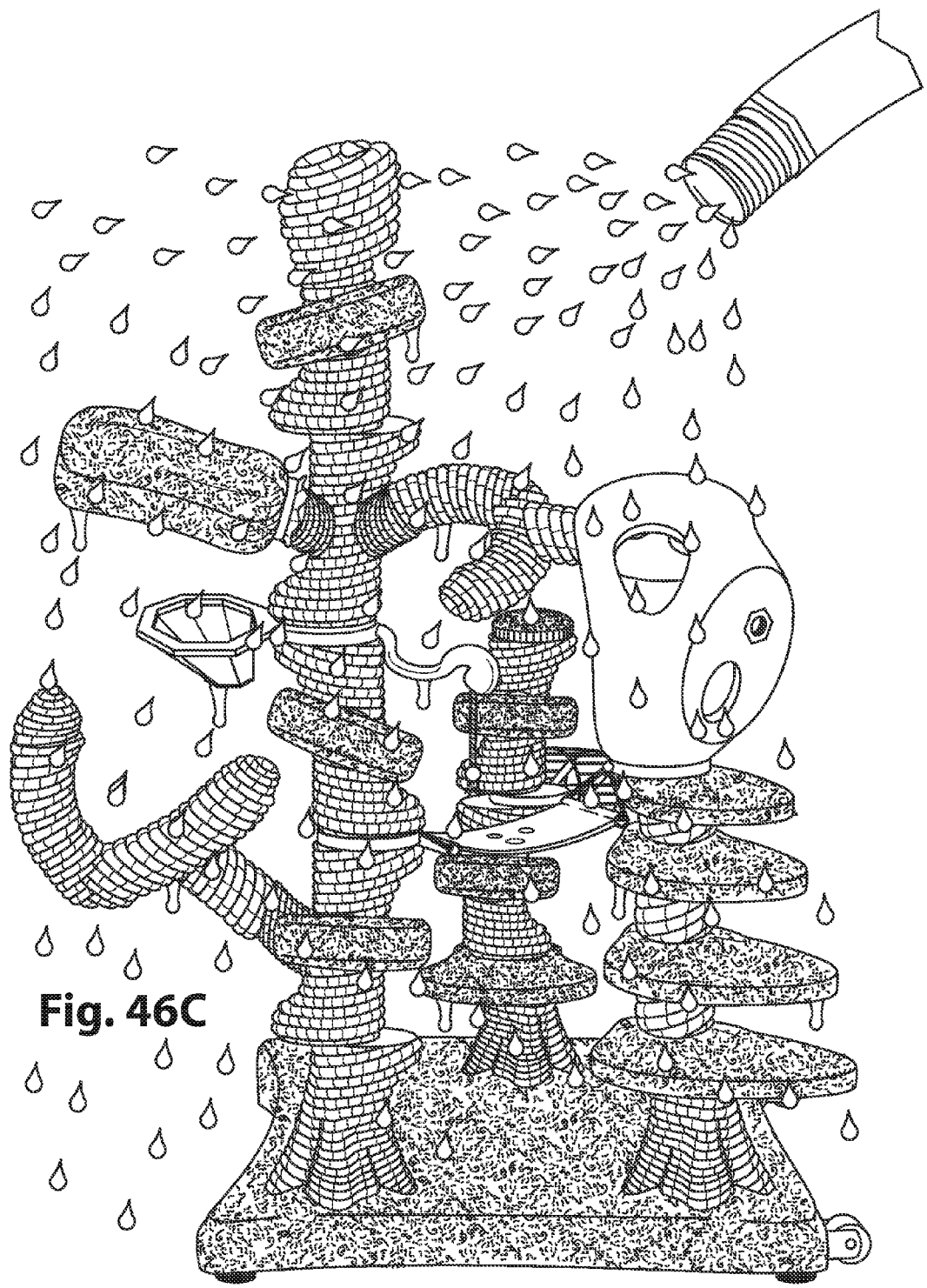

FIG. 44A illustrates a log system, a step system, a connector system, a branch system, and/or a platform system, which can be inserted into another one thereof (without any threads molded on the wall surfaces thereof).

FIG. 44B illustrates a log system, a step system, a connector system, a branch system, and/or a platform system, which can be screwed into another one thereof (with threads molded on the internal or external wall surfaces thereof, respectively).

FIGS. 45A, 45B, 45C, 46A, 46B, and 46C illustrate at least one slanting log system, step system, connector system, branch system, platform system, cap system, house system, and/or condo system.

SUMMARY OF THE INVENTION

A shape-shifting self-draining water-repelling hygienic indoor-outdoor slanting pet tree system comprises: adjustable legs, a rotatable pedestal, at least one shape-shifting rotatable log, at least one shape-shifting rotatable step, at least one shape-shifting rotatable branch, at least one shape-shifting rotatable hygienic platform, at least one shape-shifting rotatable condo, at least one shape-shifting rotatable hygienic cap, at least one shape-shifting rotatable connector for rotatably connecting all the components of the pet tree together, multiple rotatable wheels to allow the pet tree to be wheeled anywhere, and at least one removable water-repelling cover to cover the components of the pet tree. All the components of the pet tree can rotate 360 degrees (by water, wind, pet, and human forces applied on the inside and outside of the pet tree) to allow users to customize the tree shapes, have internal doors to allow pets to move around from one component to another inside the tree, are made of water-repelling material, and have water-draining holes to allow the tree to be hosed down and able to be used indoor and outdoor.

PREFERRED EMBODIMENT OF THE INVENTION

Component

The unique shape-shifting self-draining water-repelling hygienic indoor-outdoor slanting pet tree system has:
  a) Individually-adjustable-height self-draining rotatable slanting leg system;
  b) Individually-adjustable-corner self-draining rotatable slanting pedestal system;
  c) Shape-shifting self-draining rotatable slanting log system;
  d) Shape-shifting self-draining rotatable slanting step system;
  e) Shape-shifting self-draining rotatable slanting connector system;
  f) Shape-shifting self-draining rotatable slanting branch system;
  g) Water-repelling self-draining rotatable slanting hygienic platform system;
  h) Water-repelling self-draining rotatable slanting hygienic cap system;
  i) Self-draining rotatable slanting L-bracket wheel system;
  j) Replaceable covering system;
  k) Quick-and-easy-assembly and quick-and-easy-disassembly capabilities
    for quick, easy, and convenient transportation, and storage; and
  l) Quick-and-easy-assembly and quick-and-easy-disassembly capabilities
    of all the components of any shape and size,
    for allowing a user to build his/her own shape and design of the slanting pet tree system.

Referring to FIGS. 1, 2A, 2B, 2C, 3, 4, 5A, 5B, 5C, 6, 7A, 7B, 8, 9, 10A, 10B, 11, 12A, 12B, 12C, 12D, 12E, 13A, and 13B, the unique shape-shifting self-draining water-repelling hygienic indoor-outdoor slanting pet tree system comprises:
1) Individually-adjustable-height self-draining rotatable slanting leg system 101, comprising:
2) Frictional feet 102,
3) Grip-enhancing foot grooves 103,
4) Height-adjusting threaded screws 104,
5) Height-adjusting threaded tubes 105;
6) Individually-adjustable-corner self-draining rotatable slanting pedestal system 106, comprising:
7) Pedestal 107,
8) Pedestal nut 108,
9) Water-repelling hygienic pedestal cover 109,
10) Water-repelling-hygienic-pedestal-cover elastic band 110;

11) Shape-shifting self-draining rotatable slanting log system 111, comprising:
12) At least one shape-shifting rotatable straight log 112,
13) At least one shape-shifting rotatable curved log 113,
14) At least one shape-shifting-rotatable-log screw 114,
15) At least one shape-shifting-rotatable-log nut 115,
16) At least one water-repelling hygienic log cover 116;
17) Shape-shifting self-draining rotatable slanting step system 117, comprising:
18) At least one shape-shifting rotatable right-side-up step 118,
19) At least one shape-shifting rotatable upside-down step 119;
20) Shape-shifting self-draining rotatable slanting connector system 120, comprising:
21) At least one shape-shifting straight connector 121,
22) At least one shape-shifting curved connector 122,
23) At least one shape-shifting-connector nut 123,
24) At least one water-repelling hygienic connector cover 124;
25) Shape-shifting self-draining rotatable slanting branch system 125, comprising:
26) At least one shape-shifting rotatable straight branch 126,
27) At least one shape-shifting rotatable curved branch 127,
28) At least one shape-shifting-rotatable-branch screw 128,
29) At least one shape-shifting-rotatable-branch nut 129,
30) At least one water-repelling hygienic branch cover 130;
31) Water-repelling self-draining rotatable slanting hygienic platform system 131, comprising:
32) At least one self-draining hygienic slanting platform 132,
33) At least one self-draining-hygienic-slanting-platform screw 133,
34) At least one water-repelling hygienic platform cover 134,
35) At least one water-repelling-hygienic-platform-cover elastic band 135;
36) Water-repelling self-draining rotatable slanting hygienic cap system 136, comprising:
37) Self-draining hygienic cap 137,
38) Frictional cap surfaces 138,
39) Self-draining-hygienic-cap screw 139,
40) Water-repelling hygienic cap cover 140; and
41) Water-repelling self-draining rotatable slanting L-bracket wheel system 141, comprising:
42) L brackets 142,
43) L-bracket threaded holes 143,
44) L-bracket arms 144,
45) L-bracket axles 145,
46) L-bracket wheels 146.

Material

Referring to FIGS. 1, 2A, 2B, 2C, 3, 4, 5A, 5B, 5C, 6, 7A, 7B, 8, 9, 10A, 10B, 11, 12A, 12B, 12C, 12D, 12E, 13A, and 13B:
1) Individually-adjustable-height self-draining rotatable slanting leg system 101 is made of the combined materials of its components.
2) Frictional feet 102 each are made of plastic or metallic material.
3) Grip-enhancing foot grooves 103 each are made of empty space.
4) Height-adjusting threaded screws 104 each are made of plastic or metallic material.
5) Height-adjusting threaded tubes 105 each are made of plastic or metallic material.
6) Individually-adjustable-corner self-draining rotatable slanting pedestal system 106 is made of the combined materials of its components.
7) Pedestal 107 is made of plastic, metallic, wooden, composite, waterproof, or water-repelling material.
8) Pedestal nut 108 is made of plastic or metallic material.
9) Water-repelling hygienic pedestal cover 109 is made of plastic, metallic, wooden, composite, waterproof, or water-repelling material.
10) Water-repelling-hygienic-pedestal-cover elastic band 110 is made of rubberized, elastic, waterproof, or water-repelling material.
11) Shape-shifting self-draining rotatable slanting log system 111 is made of the combined materials of its components.
12) At least one shape-shifting rotatable straight log 112 is made of plastic, metallic, wooden, composite, waterproof, or water-repelling material.
13) At least one shape-shifting rotatable curved log 113 is made of plastic, metallic, wooden, composite, waterproof, or water-repelling material.
14) At least one shape-shifting-rotatable-log screw 114 is made of plastic or metallic material.
15) At least one shape-shifting-rotatable-log nut 115 is made of plastic or metallic material.
16) At least one water-repelling hygienic log cover 116 is made of plastic, metallic, wooden, composite, waterproof, or water-repelling material.
17) Shape-shifting self-draining rotatable slanting step system 117 is made of the combined materials of its components.
18) At least one shape-shifting rotatable right-side-up step 118 is made of plastic, metallic, wooden, composite, waterproof, or water-repelling material.
19) At least one shape-shifting rotatable upside-down step 119 is made of plastic, metallic, wooden, composite, waterproof, or water-repelling material.
20) Shape-shifting self-draining rotatable slanting connector system 120 is made of the combined materials of its components.
21) At least one shape-shifting straight connector 121 is made of plastic, metallic, wooden, composite, waterproof, or water-repelling material.
22) At least one shape-shifting curved connector 122 is made of plastic, metallic, wooden, composite, waterproof, or water-repelling material.
23) At least one shape-shifting-connector nut 123 is made of plastic or metallic material.
24) At least one water-repelling hygienic connector cover 124 is made of plastic, metallic, wooden, composite, waterproof, or water-repelling material.
25) Shape-shifting self-draining rotatable slanting branch system 125 is made of the combined materials of its components.
26) At least one shape-shifting rotatable straight branch 126 is made of plastic, metallic, wooden, composite, waterproof, or water-repelling material.
27) At least one shape-shifting rotatable curved branch 127 is made of plastic, metallic, wooden, composite, waterproof, or water-repelling material.
28) At least one shape-shifting-rotatable-branch screw 128 is made of plastic or metallic material.
29) At least one shape-shifting-rotatable-branch nut 129 is made of plastic or metallic material.
30) At least one water-repelling hygienic branch cover 130 is made of plastic, metallic, wooden, composite, waterproof, or water-repelling material.

31) Water-repelling self-draining rotatable slanting hygienic platform system 131 is made of the combined materials of its components.
32) At least one self-draining hygienic slanting platform 132 is made of plastic, metallic, wooden, composite, waterproof, or water-repelling material.
33) At least one self-draining-hygienic-slanting-platform screw 133 is made of plastic or metallic material.
34) At least one water-repelling hygienic platform cover 134 is made of plastic, metallic, wooden, composite, waterproof, or water-repelling material.
35) At least one water-repelling-hygienic-platform-cover elastic band 135 is made of rubberized, elastic, waterproof, or water-repelling material.
36) Water-repelling self-draining rotatable slanting hygienic cap system 136 is made of the combined materials of its components.
37) Self-draining hygienic cap 137 is made of plastic, metallic, wooden, composite, waterproof, or water-repelling material.
38) Frictional cap surfaces 138 each are made of plastic, metallic, wooden, composite, waterproof, or water-repelling material.
39) Self-draining-hygienic-cap screw 139 is made of plastic or metallic material.
40) Water-repelling hygienic cap cover 140 is made of plastic, metallic, wooden, composite, waterproof, or water-repelling material.
41) Water-repelling self-draining rotatable slanting L-bracket wheel system 141 is made of the combined materials of its components.
42) L brackets 142 each are made of plastic, metallic, wooden, composite, waterproof, or water-repelling material.
43) L-bracket threaded holes 143 each are made of empty space.
44) L-bracket arms 144 each are made of plastic, metallic, wooden, composite, waterproof, or water-repelling material.
45) L-bracket axles 145 each are made of plastic, metallic, wooden, composite, waterproof, or water-repelling material.
46) L-bracket wheels 146 each are made of plastic, metallic, wooden, composite, waterproof, or water-repelling material.

Shape

Referring to FIGS. 1, 2A, 2B, 2C, 3, 4, 5A, 5B, 5C, 6, 7A, 7B, 8, 9, 10A, 10B, 11, 12A, 12B, 12C, 12D, 12E, 13A, and 13B:

1) Individually-adjustable-height self-draining rotatable slanting leg system 101 has the combined shapes of its components.
2) Frictional feet 102 each have a round-pill shape.
3) Grip-enhancing foot grooves 103 each have a channel shape.
4) Height-adjusting threaded screws 104 each have a screw shape.
5) Height-adjusting threaded tubes 105 each have an internally-threaded tubular shape.
6) Individually-adjustable-corner self-draining rotatable slanting pedestal system 106 has the combined shapes of its components.
7) Pedestal 107 has a planar shape.
8) Pedestal nut 108 has an internally-threaded tubular shape.
9) Water-repelling hygienic pedestal cover 109 has a bag shape.
10) Water-repelling-hygienic-pedestal-cover elastic band 110 has a rubber-band shape.
11) Shape-shifting self-draining rotatable slanting log system 111 has the combined shapes of its components.
12) At least one shape-shifting rotatable straight log 112 has a straight cylindrical shape.
13) At least one shape-shifting rotatable curved log 113 has a curved cylindrical shape.
14) At least one shape-shifting-rotatable-log screw 114 has a screw shape.
15) At least one shape-shifting-rotatable-log nut 115 has an internally-threaded tubular shape.
16) At least one water-repelling hygienic log cover 116 has a bag shape.
17) Shape-shifting self-draining rotatable slanting step system 117 has the combined shapes of its components.
18) At least one shape-shifting rotatable right-side-up step 118 has a waning-moon shape.
19) At least one shape-shifting rotatable upside-down step 119 has a waning-moon shape.
20) Shape-shifting self-draining rotatable slanting connector system 120 has the combined shapes of its components.
21) At least one shape-shifting straight connector 121 has a straight cylindrical shape.
22) At least one shape-shifting curved connector 122 has a curved cylindrical shape.
23) At least one shape-shifting-connector nut 123 has an internally-threaded tubular shape.
24) At least one water-repelling hygienic connector cover 124 has a bag shape.
25) Shape-shifting self-draining rotatable slanting branch system 125 has the combined shapes of its components.
26) At least one shape-shifting rotatable straight branch 126 has a straight cylindrical shape.
27) At least one shape-shifting rotatable curved branch 127 has a curved cylindrical shape.
28) At least one shape-shifting-rotatable-branch screw 128 has a screw shape.
29) At least one shape-shifting-rotatable-branch nut 129 has an internally-threaded tubular shape.
30) At least one water-repelling hygienic branch cover 130 has a bag shape.
31) Water-repelling self-draining rotatable slanting hygienic platform system 131 has the combined shapes of its components.
32) At least one self-draining hygienic slanting platform 132 has a planar shape.
33) At least one self-draining-hygienic-slanting-platform screw 133 has a screw shape.
34) At least one water-repelling hygienic platform cover 134 has a bag shape.
35) At least one water-repelling-hygienic-platform-cover elastic band 135 has a rubber band shape.
36) Water-repelling self-draining rotatable slanting hygienic cap system 136 has the combined shapes of its components.
37) Self-draining hygienic cap 137 has a domed shape.
38) Frictional cap surfaces 138 each have a rectangular shape.
39) Self-draining-hygienic-cap screw 139 has a screw shape.
40) Water-repelling hygienic cap cover 140 has a bag shape.
41) Water-repelling self-draining rotatable slanting L-bracket wheel system 141 has the combined shapes of its components.
42) L brackets 142 each have an L shape.
43) L-bracket threaded holes 143 each have a round shape.
44) L-bracket arms 144 each have an I shape.

45) L-bracket axles 145 each have an I shape.
46) L-bracket wheels 146 each have a donut shape.

Connection

Referring to FIGS. 1, 2A, 2B, 2C, 3, 4, 5A, 5B, 5C, 6, 7A, 7B, 8, 9, 10A, 10B, 11, 12A, 12B, 12C, 12D, 12E, 13A, 13B, 14A, 14B, 15, 16, 17, 18, 19, 20A, 20B, 21A, and 21B:

1) Individually-adjustable-height self-draining rotatable slanting leg system 101 is attached to:
   Individually-adjustable-corner self-draining rotatable slanting pedestal system 106.
2) Frictional feet 102 each are molded to:
   One of height-adjusting threaded screws 104.
3) Grip-enhancing foot grooves 103 each are molded into:
   Frictional feet 102.
4) Height-adjusting threaded screws 104 each are screwed into:
   One of height-adjusting threaded tubes 105.
5) Height-adjusting threaded tubes 105 each are molded in:
   Pedestal 107.
6) Individually-adjustable-corner self-draining rotatable slanting pedestal system 106 is attached to:
   Shape-shifting self-draining rotatable slanting log system 111.
7) Pedestal 107 is molded on:
   Pedestal nut 108, and
   Height-adjusting threaded tubes 105.
8) Pedestal nut 108 is molded on:
   Pedestal 107.
9) Water-repelling hygienic pedestal cover 109 is slid on:
   Pedestal 107.
10) Water-repelling-hygienic-pedestal-cover elastic band 110 is sewn on and around:
    The open end of water-repelling hygienic pedestal cover 109.
11) Shape-shifting self-draining rotatable slanting log system 111 is attached to:
    Shape-shifting self-draining rotatable slanting step system 117, and
    Shape-shifting self-draining rotatable slanting connector system 120, respectively.
12) At least one shape-shifting rotatable straight log 112 is molded on or to:
    At least one shape-shifting-rotatable-log screw 114,
    At least one shape-shifting-rotatable-log nut 115,
    At least one shape-shifting rotatable right-side-up step 118, and
    At least one shape-shifting rotatable upside-down step 119, respectively.
13) At least one shape-shifting rotatable curved log 113 is molded on or to:
    At least one shape-shifting-rotatable-log screw 114,
    At least one shape-shifting-rotatable-log nut 115,
    At least one shape-shifting rotatable right-side-up step 118, and
    At least one shape-shifting rotatable upside-down step 119, respectively.
14) At least one shape-shifting-rotatable-log screw 114 is molded to the ends of:
    At least one shape-shifting rotatable straight log 112, and
    At least one shape-shifting rotatable curved log 113, respectively.
15) At least one shape-shifting-rotatable-log nut 115 is molded to the other ends of:
    At least one shape-shifting rotatable straight log 112, and
    At least one shape-shifting rotatable curved log 113, respectively.
16) At least one water-repelling hygienic log cover 116 is wound on:
    At least one shape-shifting rotatable straight log 112, and
    At least one shape-shifting rotatable curved log 113, respectively.
17) Shape-shifting self-draining rotatable slanting step system 117 is attached to:
    Shape-shifting self-draining rotatable slanting log system 111.
18) At least one shape-shifting rotatable right-side-up step 118 is molded to:
    At least one shape-shifting rotatable straight log 112, and
    At least one shape-shifting rotatable curved log 113, respectively.
19) At least one shape-shifting rotatable upside-down step 119 is molded to:
    At least one shape-shifting rotatable straight log 112, and
    At least one shape-shifting rotatable curved log 113, respectively.
20) Shape-shifting self-draining rotatable slanting connector system 120 is attached to:
    Shape-shifting self-draining rotatable slanting log system 111, and
    Shape-shifting self-draining rotatable slanting branch system 125, respectively.
21) At least one shape-shifting straight connector 121 is molded to:
    At least one shape-shifting rotatable straight log 112, and
    At least one shape-shifting rotatable curved log 113, respectively.
22) At least one shape-shifting curved connector 122 is molded to:
    At least one shape-shifting rotatable straight log 112, and
    At least one shape-shifting rotatable curved log 113, respectively.
23) At least one shape-shifting-connector nut 123 is molded to:
    At least one shape-shifting straight connector 121, and
    At least one shape-shifting curved connector 122, respectively.
24) At least one water-repelling hygienic connector cover 124 is wound on:
    At least one shape-shifting straight connector 121, and
    At least one shape-shifting curved connector 122, respectively.
25) Shape-shifting self-draining rotatable slanting branch system 125 is attached to:
    Shape-shifting self-draining rotatable slanting connector system 120.
26) At least one shape-shifting rotatable straight branch 126 is molded on:
    At least one shape-shifting-rotatable-branch screw 128, and
    At least one shape-shifting-rotatable-branch nut 129, respectively.
27) At least one shape-shifting rotatable curved branch 127 is molded on:
    At least one shape-shifting-rotatable-branch screw 128, and
    At least one shape-shifting-rotatable-branch nut 129, respectively.
28) At least one shape-shifting-rotatable-branch screw 128 is molded to the ends of:
    At least one shape-shifting rotatable straight branch 126, and
    At least one shape-shifting rotatable curved branch 127, respectively.

29) At least one shape-shifting-rotatable-branch nut 129 is molded to the other ends of:
   At least one shape-shifting rotatable straight branch 126, and
   At least one shape-shifting rotatable curved branch 127, respectively.
30) At least one water-repelling hygienic branch cover 130 is wound on:
   At least one shape-shifting rotatable straight branch 126, and
   At least one shape-shifting rotatable curved branch 127, respectively.
31) Water-repelling self-draining rotatable slanting hygienic platform system 131 is attached to:
   Shape-shifting self-draining rotatable slanting connector system 120, and
   Shape-shifting self-draining rotatable slanting branch system 125, respectively.
32) At least one self-draining hygienic slanting platform 132 is molded on:
   At least one self-draining-hygienic-slanting-platform screw 133, respectively.
33) At least one self-draining-hygienic-slanting-platform screw 133 is molded to:
   At least one self-draining hygienic slanting platform 132, respectively.
34) At least one water-repelling hygienic platform cover 134 is slid on:
   At least one self-draining hygienic slanting platform 132, respectively.
35) At least one water-repelling-hygienic-platform-cover elastic band 135 is sewn on and around:
   The open end of at least one water-repelling hygienic platform cover 134, respectively.
36) Water-repelling self-draining rotatable slanting hygienic cap system 136 is attached to:
   Shape-shifting self-draining rotatable slanting log system 111.
37) Self-draining hygienic cap 137 is molded on:
   Self-draining-hygienic-cap screw 139.
38) Frictional cap surfaces 138 each are molded into:
   Self-draining hygienic cap 137.
39) Self-draining-hygienic-cap screw 139 is molded to:
   Self-draining hygienic cap 137.
40) Water-repelling hygienic cap cover 140 is slid on:
   Self-draining hygienic cap 137.
41) Water-repelling self-draining rotatable slanting L-bracket wheel system 141 is attached to:
   Individually-adjustable-height self-draining rotatable slanting leg system 101, and
   Individually-adjustable-corner self-draining rotatable slanting pedestal system 106.
42) L brackets 142 each are attached to:
   Individually-adjustable-height self-draining rotatable slanting leg system 101, and
   Individually-adjustable-corner self-draining rotatable slanting pedestal system 106.
43) L-bracket threaded holes 143 each are molded or drilled in:
   One of L brackets 142.
44) L-bracket arms 144 each are attached to:
   One of L brackets 142.
45) L-bracket axles 145 each are attached to:
   Two of L-bracket arms 144.
46) L-bracket wheels 146 each are rotatably attached to:
   One of L-bracket axles 145.

Function
Referring to FIGS. 1, 2A, 2B, 2C, 3, 4, 5A, 5B, 5C, 6, 7A, 7B, 8, 9, 10A, 10B, 11, 12A, 12B, 12C, 12D, 12E, 13A, 13B, 14A, 14B, 15, 16, 17, 18, 19, 20A, 20B, 21A, and 21B:
1) Individually-adjustable-height self-draining rotatable slanting leg system 101 is for performing the combined functions of its components.
2) Frictional feet 102 each are for:
   a) Frictionally preventing the horizontal movement of the unique shape-shifting self-draining water-repelling hygienic indoor-outdoor slanting pet tree system; and
   b) Supporting the unique shape-shifting self-draining water-repelling hygienic indoor-outdoor slanting pet tree system.
3) Grip-enhancing foot grooves 103 each are for:
   a) Providing better grip on frictional feet 102; and
   b) Adjusting individually-adjustable-height self-draining rotatable slanting leg system 101.
4) Height-adjusting threaded screws 104 each are for:
   a) Vertically elevating the unique shape-shifting self-draining water-repelling hygienic indoor-outdoor slanting pet tree system on various uneven surfaces;
   b) Vertically lowering the unique shape-shifting self-draining water-repelling hygienic indoor-outdoor slanting pet tree system on various uneven surfaces;
   c) Three-dimensionally adjusting the unique shape-shifting self-draining water-repelling hygienic indoor-outdoor slanting pet tree system on various uneven surfaces;
   d) Three-dimensionally stabilizing individually-adjustable-height self-draining rotatable slanting leg system 101 on various uneven surfaces; and
   e) Three-dimensionally leveling individually-adjustable-height self-draining rotatable slanting leg system 101 on various uneven surfaces.
5) Height-adjusting threaded tubes 105 each are for:
   a) Screwing one of height-adjusting threaded screws 104 therein; and
   b) Connecting individually-adjustable-height self-draining rotatable slanting leg system 101 to individually-adjustable-corner self-draining rotatable slanting pedestal system 106.
6) Individually-adjustable-corner self-draining rotatable slanting pedestal system 106 is for performing the combined functions of its components.
7) Pedestal 107 is for:
   a) Three-dimensionally and adjustably supporting shape-shifting self-draining rotatable slanting log system 111;
   b) Three-dimensionally and adjustably supporting shape-shifting rotatable step system 117;
   c) Three-dimensionally and adjustably supporting shape-shifting self-draining rotatable slanting connector system 120;
   d) Three-dimensionally and adjustably supporting shape-shifting self-draining rotatable slanting branch system 125;
   e) Three-dimensionally and adjustably supporting water-repelling self-draining rotatable slanting hygienic platform system 131; and
   f) Three-dimensionally and adjustably water-repelling self-draining rotatable slanting hygienic cap system 136.
8) Pedestal nut 108 is for:
   a) Providing a range of rotatable various shape-shifting positions to:
      Shape-shifting self-draining rotatable slanting log system 111, Shape-shifting self-draining rotatable slanting step system 117,
Shape-shifting self-draining rotatable slanting connector system 120,
Shape-shifting self-draining rotatable slanting branch system 125,
Water-repelling self-draining rotatable slanting hygienic platform system 131,
Water-repelling self-draining rotatable slanting hygienic cap system 136, and
The unique shape-shifting self-draining water-repelling hygienic indoor-outdoor slanting pet tree system;
b) Screwing at least one shape-shifting-rotatable-branch screw 128 therein;
c) Screwing at least one self-draining-hygienic-slanting-platform screw 133 therein;
d) Allowing infinite, rotational positioning of individually-adjustable-corner self-draining rotatable slanting pedestal system 106 on pedestal 107; and
e) Securing shape-shifting self-draining rotatable slanting log system 111 to individually-adjustable-corner self-draining rotatable slanting pedestal system 106.

9) Water-repelling hygienic pedestal cover 109 is for:
a) Draining water from individually-adjustable-corner self-draining rotatable slanting pedestal system 106;
b) Repelling water from individually-adjustable-corner self-draining rotatable slanting pedestal system 106;
c) Maintaining hygiene of individually-adjustable-corner self-draining rotatable slanting pedestal system 106;
d) Maintaining dryness of individually-adjustable-corner self-draining rotatable slanting pedestal system 106;
e) Providing traction for pets to climb on individually-adjustable-corner self-draining rotatable slanting pedestal system 106;
f) Being capable of being quickly and easily replaced to change pattern, color, and traction of individually-adjustable-corner self-draining rotatable slanting pedestal system 106; and
g) Being capable of being quickly and easily removed for wash, disinfection, and/or replacement of water-repelling hygienic pedestal cover 109.

10) Water-repelling-hygienic-pedestal-cover elastic band 110 is for:
a) Releasably locking water-repelling hygienic pedestal cover 109 on pedestal 107; and
b) Quickly and easily removing and replacing water-repelling hygienic pedestal cover 109.

11) Shape-shifting self-draining rotatable slanting log system 111 is for performing the combined functions of its components.

12) At least one shape-shifting rotatable straight log 112 is for:
a) Providing a range of rotatable various shape-shifting positions to:
Shape-shifting self-draining rotatable slanting log system 111,
Shape-shifting self-draining rotatable slanting step system 117,
Shape-shifting self-draining rotatable slanting connector system 120,
Shape-shifting self-draining rotatable slanting branch system em 125,
Water-repelling self-draining rotatable slanting hygienic platform system 131,
Water-repelling self-draining rotatable slanting hygienic cap system 136, and
The unique shape-shifting self-draining water-repelling hygienic indoor-outdoor slanting pet tree system;
b) Supporting shape-shifting self-draining rotatable slanting connector system 120;
c) Supporting shape-shifting self-draining rotatable slanting branch system 125;
d) Supporting water-repelling self-draining rotatable slanting hygienic platform system 131; and
e) Providing various climbing difficulties to the unique shape-shifting self-draining water-repelling hygienic indoor-outdoor slanting pet tree system.

13) At least one shape-shifting rotatable curved log 113 is for:
a) Providing a range of rotatable various shape-shifting positions to:
Shape-shifting self-draining rotatable slanting log system 111,
Shape-shifting self-draining rotatable slanting step system 117,
Shape-shifting self-draining rotatable slanting connector system 120,
Shape-shifting self-draining rotatable slanting branch system 125,
Water-repelling self-draining rotatable slanting hygienic platform system 131,
Water-repelling self-draining rotatable slanting hygienic cap system 136, and
The unique shape-shifting self-draining water-repelling hygienic indoor-outdoor slanting pet tree system;
b) Supporting shape-shifting self-draining rotatable slanting connector system 120;
c) Supporting shape-shifting self-draining rotatable slanting branch system 125;
d) Supporting water-repelling self-draining rotatable slanting hygienic platform system 131; and
e) Providing various climbing difficulties to the unique shape-shifting self-draining water-repelling hygienic indoor-outdoor slanting pet tree system.

14) At least one shape-shifting-rotatable-log screw 114 is for:
a) Providing a range of rotatable various shape-shifting positions to:
Shape-shifting self-draining rotatable slanting log system 111,
Shape-shifting self-draining rotatable slanting step system 117,
Shape-shifting self-draining rotatable slanting connector system 120,
Shape-shifting self-draining rotatable slanting branch system tem 125,
Water-repelling self-draining rotatable slanting hygienic platform system 131,
Water-repelling self-draining rotatable slanting hygienic cap system 136, and
The unique shape-shifting self-draining water-repelling hygienic indoor-outdoor slanting pet tree system;
b) Screwing shape-shifting self-draining rotatable slanting log system 111 together; and
c) Screwing shape-shifting self-draining rotatable slanting log system 111 to individually-adjustable-corner self-draining rotatable slanting pedestal system 106.

15) At least one shape-shifting-rotatable-log nut 115 is for:
a) Providing a range of rotatable various shape-shifting positions to:
Shape-shifting self-draining rotatable slanting log system 111, Shape-shifting self-draining rotatable slanting step system 117,
Shape-shifting self-draining rotatable slanting connector system 120,
Shape-shifting self-draining rotatable slanting branch system 125,
Water-repelling self-draining rotatable slanting hygienic platform system 131,
Water-repelling self-draining rotatable slanting hygienic cap system 136, and
The unique shape-shifting self-draining water-repelling hygienic indoor-outdoor slanting pet tree system;
b) Screwing at least one shape-shifting-rotatable-log screw 114 therein; and
c) Screwing self-draining-hygienic-cap screw 139 therein.
16) At least one water-repelling hygienic log cover 116 is for:
a) Draining water from shape-shifting self-draining rotatable slanting log system 111;
b) Repelling water from shape-shifting self-draining rotatable slanting log system 111;
c) Maintaining hygiene of shape-shifting self-draining rotatable slanting log system 111;
d) Maintaining dryness of shape-shifting self-draining rotatable slanting log system 111; and
e) Providing traction for pets to climb on shape-shifting self-draining rotatable slanting log system 111.
17) Shape-shifting self-draining rotatable slanting step system 117 is for performing the combined functions of its components.
18) At least one shape-shifting rotatable right-side-up step 118 is for:
a) Providing a range of rotatable various shape-shifting positions to:
Shape-shifting self-draining rotatable slanting step system 117, and
The unique shape-shifting self-draining water-repelling hygienic indoor-outdoor slanting pet tree system;
b) Providing weight-bearing ledge for pets to climb on shape-shifting self-draining rotatable slanting log system 111; and
c) Providing various climbing difficulties to the unique shape-shifting self-draining water-repelling hygienic indoor-outdoor slanting pet tree system.
19) At least one shape-shifting rotatable upside-down step 119 is for:
a) Providing a range of rotatable various shape-shifting positions to:
Shape-shifting self-draining rotatable slanting step system 117, and
The unique shape-shifting self-draining water-repelling hygienic indoor-outdoor slanting pet tree system;
b) Providing weight-bearing ledge for pets to climb on shape-shifting self-draining rotatable slanting log system 111; and
c) Providing various climbing difficulties to the unique shape-shifting self-draining water-repelling hygienic indoor-outdoor slanting pet tree system.
20) Shape-shifting self-draining rotatable slanting connector system 120 is for performing the combined functions of its components.
21) At least one shape-shifting straight connector 121 is for:
a) Supporting shape-shifting self-draining rotatable slanting branch system 125;
b) Supporting water-repelling self-draining rotatable slanting hygienic platform system 131; and
c) Providing various climbing difficulties to the unique shape-shifting self-draining water-repelling hygienic indoor-outdoor slanting pet tree system.
22) At least one shape-shifting curved connector 122 is for:
a) Supporting shape-shifting self-draining rotatable slanting branch system 125;
b) Supporting water-repelling self-draining rotatable slanting hygienic platform system 131; and
c) Providing various climbing difficulties to the unique shape-shifting self-draining water-repelling hygienic indoor-outdoor slanting pet tree system.
23) At least one shape-shifting-connector nut 123 is for:
a) Providing a range of rotatable various shape-shifting positions to:
Shape-shifting self-draining rotatable slanting branch system 125,
Water-repelling self-draining rotatable slanting hygienic platform system 131,
Water-repelling self-draining rotatable slanting hygienic cap system 136, and
The unique shape-shifting self-draining water-repelling hygienic indoor-outdoor slanting pet tree system;
b) Providing multiple rotatable shape-shifting positions to:
Water-repelling self-draining rotatable slanting hygienic platform system 131, and
The unique shape-shifting self-draining water-repelling hygienic indoor-outdoor slanting pet tree system;
c) Screwing at least one shape-shifting-rotatable-branch screw 128 therein; and
d) Screwing at least one self-draining-hygienic-slanting-platform screw 133 therein.
24) At least one water-repelling hygienic connector cover 124 is for:
a) Draining water from shape-shifting self-draining rotatable slanting connector system 120;
b) Repelling water from shape-shifting self-draining rotatable slanting connector system 120;
c) Maintaining hygiene of shape-shifting self-draining rotatable slanting connector system 120;
d) Maintaining dryness of shape-shifting self-draining rotatable slanting connector system 120; and
e) Providing traction for pets to climb on shape-shifting self-draining rotatable slanting connector system 120.
25) Shape-shifting self-draining rotatable slanting branch system 125 is for performing the combined functions of its components.
26) At least one shape-shifting rotatable straight branch 126 is for:
a) Providing a range of rotatable various shape-shifting positions to:
Shape-shifting self-draining rotatable slanting branch system 125,
Water-repelling self-draining rotatable slanting hygienic platform system 131, and
The unique shape-shifting self-draining water-repelling hygienic indoor-outdoor slanting pet tree system;
b) Supporting water-repelling self-draining rotatable slanting hygienic platform system 131; and
c) Providing various climbing difficulties to the unique shape-shifting self-draining water-repelling hygienic indoor-outdoor slanting pet tree system.

27) At least one shape-shifting rotatable curved branch 127 is for:
  a) Providing a range of rotatable various shape-shifting positions to:
    Shape-shifting self-draining rotatable slanting branch system 125,
    Water-repelling self-draining rotatable slanting hygienic platform system 131, and
    The unique shape-shifting self-draining water-repelling hygienic indoor-outdoor slanting pet tree system;
  b) Supporting water-repelling self-draining rotatable slanting hygienic platform system 131; and
  c) Providing various climbing difficulties to the unique shape-shifting self-draining water-repelling hygienic indoor-outdoor slanting pet tree system.
28) At least one shape-shifting-rotatable-branch screw 128 is for:
  a) Providing a range of rotatable various shape-shifting positions to:
    Shape-shifting self-draining rotatable slanting branch system 125,
    Water-repelling self-draining rotatable slanting hygienic platform system 131, and
    The unique shape-shifting self-draining water-repelling hygienic indoor-outdoor slanting pet tree system;
  b) Screwing shape-shifting self-draining rotatable slanting branch system 125 together;
  c) Screwing at least one shape-shifting rotatable straight branch 126 to at least one shape-shifting-connector nut 123; and
  d) Screwing at least one shape-shifting rotatable curved branch 127 to at least one shape-shifting-connector nut 123.
29) At least one shape-shifting-rotatable-branch nut 129 is for:
  a) Providing a range of rotatable various shape-shifting positions to:
    Shape-shifting self-draining rotatable slanting branch system 125,
    Water-repelling self-draining rotatable slanting hygienic platform system 131, and
    The unique shape-shifting self-draining water-repelling hygienic indoor-outdoor slanting pet tree system;
  b) Screwing at least one shape-shifting-rotatable-branch screw 128 therein; and
  c) Screwing at least one self-draining-hygienic-slanting-platform screw 133 therein.
30) At least one water-repelling hygienic branch cover 130 is for:
  a) Draining water from shape-shifting self-draining rotatable slanting branch system 125;
  b) Repelling water from shape-shifting self-draining rotatable slanting branch system 125;
  c) Maintaining hygiene of shape-shifting self-draining rotatable slanting branch system 125;
  d) Maintaining dryness of shape-shifting self-draining rotatable slanting branch system 125; and
  e) Providing traction for pets to climb on shape-shifting rotatable branch system 125.
31) Water-repelling self-draining rotatable slanting hygienic platform system 131 is for performing the combined functions of its components.

32) At least one self-draining hygienic slanting platform 132 is for:
  a) Providing a range of rotatable various shape-shifting positions to:
    Water-repelling self-draining rotatable slanting hygienic platform system 131, and
    The unique shape-shifting self-draining water-repelling hygienic indoor-outdoor slanting pet tree system;
  b) Draining water from water-repelling self-draining rotatable slanting hygienic platform system 131;
  c) Maintaining dryness of water-repelling self-draining rotatable slanting hygienic platform system 131;
  d) Providing shade and shelter to the components (of the unique shape-shifting self-draining water-repelling hygienic indoor-outdoor slanting pet tree system) below; and
  e) Supporting pets.
33) At least one self-draining-hygienic-slanting-platform screw 133 is for:
  a) Providing a range of rotatable various shape-shifting positions to:
    Water-repelling self-draining rotatable slanting hygienic platform system 131, and
    The unique shape-shifting self-draining water-repelling hygienic indoor-outdoor slanting pet tree system;
  b) Screwing at least one self-draining hygienic slanting platform 132 to at least one shape-shifting-connector nut 123; and
  c) Screwing at least one self-draining hygienic slanting platform 132 to at least one shape-shifting-rotatable-branch nut 129.
34) At least one water-repelling hygienic platform cover 134 is for:
  a) Draining water from water-repelling self-draining rotatable slanting hygienic platform system 131;
  b) Repelling water from water-repelling self-draining rotatable slanting hygienic platform system 131;
  c) Maintaining hygiene of water-repelling self-draining rotatable slanting hygienic platform system 131;
  d) Maintaining dryness of water-repelling self-draining rotatable slanting hygienic platform system 131;
  e) Providing traction for pets to climb on water-repelling self-draining rotatable slanting hygienic platform system 131;
  f) Being capable of being quickly and easily replaced to change pattern, color, and traction of water-repelling self-draining rotatable slanting hygienic platform system 131; and
  g) Being capable of being quickly and easily removed for wash, disinfection, and/or replacement of at least one water-repelling hygienic platform cover 134.
35) At least one water-repelling-hygienic-platform-cover elastic band 135 is for:
  a) Releasably locking at least one water-repelling hygienic platform cover 134 on at least one self-draining hygienic slanting platform 132; and
  b) Quickly and easily removing and replacing at least one water-repelling hygienic platform cover 134.
36) Water-repelling self-draining rotatable slanting hygienic cap system 136 is for performing the combined functions of its components.
37) Self-draining hygienic cap 137 is for:
  a) Capping off shape-shifting self-draining rotatable slanting log system 111;
  b) Preventing water from entering shape-shifting self-draining rotatable slanting log system 111; and c) Shedding water from shape-shifting self-draining rotatable slanting log system 111.

38) Grip-enhancing cap grooves 138 each are for:
    a) Providing better grip on self-draining hygienic cap 137; and
    b) Adjusting water-repelling self-draining rotatable slanting hygienic cap system 136.

39) Self-draining-hygienic-cap screw 139 is for:
    a) Providing a range of rotatable various shape-shifting positions to:
        Water-repelling self-draining rotatable slanting hygienic cap system 136, and
        The unique shape-shifting self-draining water-repelling hygienic indoor-outdoor slanting pet tree system; and
    b) Screwing self-draining hygienic cap 137 on shape-shifting self-draining rotatable slanting log system 111.

40) Water-repelling hygienic cap cover 140 is for:
    a) Draining water from water-repelling self-draining rotatable slanting hygienic cap system 136;
    b) Repelling water from water-repelling self-draining rotatable slanting hygienic cap system 136;
    c) Maintaining hygiene of water-repelling self-draining rotatable slanting hygienic cap system 136;
    d) Maintaining dryness of water-repelling self-draining rotatable slanting hygienic cap system 136; and
    e) Providing traction for pets to climb on water-repelling self-draining rotatable slanting hygienic cap system 136.

41) Water-repelling self-draining rotatable slanting L-bracket wheel system 141 is for performing the combined functions of its components.

42) L brackets 142 each are for:
    Attaching individually-adjustable-corner self-draining rotatable slanting pedestal system 106 to L-bracket wheels 146.

43) L-bracket threaded holes 143 each are for:
    Screwing one of height-adjusting threaded screws 104 therethrough.

44) L-bracket arms 144 each are for:
    Being attached to one of L-bracket axles 145.

45) L-bracket axles 145 each are for:
    Being attached to two of L-bracket arms 144.

46) L-bracket wheels 146 each are for:
    Being rotatably attached to one of L-bracket axles 145.

Operation

The unique shape-shifting self-draining water-repelling hygienic indoor-outdoor slanting pet tree system has:
    a) Individually-adjustable-height self-draining rotatable slanting leg system;
    b) Individually-adjustable-corner self-draining rotatable slanting pedestal system;
    c) Shape-shifting self-draining rotatable slanting log system;
    d) Shape-shifting self-draining rotatable slanting step system;
    e) Shape-shifting self-draining rotatable slanting connector system;
    f) Shape-shifting self-draining rotatable slanting branch system;
    g) Water-repelling self-draining rotatable slanting hygienic platform system;
    h) Water-repelling self-draining rotatable slanting hygienic cap system;
    i) Self-draining rotatable slanting L-bracket wheel system;
    j) Replaceable covering system;
    k) Quick-and-easy-assembly and quick-and-easy-disassembly capabilities
        for quick, easy, and convenient transportation and storage; and
    l) Quick-and-easy-assembly and quick-and-easy-disassembly capabilities
        of all the components of any shape and size,
        for allowing a user to build his/her own shape and design of the slanting pet tree system.

The operation of the unique shape-shifting self-draining water-repelling hygienic indoor-outdoor slanting pet tree system comprises the following steps:

How to Assemble
The Unique Shape-Shifting Self-Draining Water-Repelling Hygienic Indoor-Outdoor Slanting Pet Tree System
    (Referring to FIGS. 14A, 14B, 15, 16, 17, 18, 19, 20A, 20B, 21A, and 21B)

1) Screwing height-adjusting threaded screws 104 in height-adjusting threaded tubes 105, respectively,
    to attach individually-adjustable-height self-draining rotatable slanting leg system 101 to
    individually-adjustable-corner self-draining rotatable slanting pedestal system 106;

2) Screwing at least one shape-shifting-rotatable-log screw 114 to pedestal nut 108 and to
    at least one shape-shifting-rotatable-log nut 115, respectively,
    to attach shape-shifting self-draining rotatable slanting log system 111 to individually-adjustable-corner self-draining rotatable slanting pedestal system 106 and to shape-shifting self-draining rotatable slanting log system 111;

3) Screwing at least one shape-shifting-rotatable-branch screw 128 to
    at least one shape-shifting-connector nut 123 and to
    at least one shape-shifting-rotatable-branch nut 129, respectively,
    to attach shape-shifting self-draining rotatable slanting branch system 125 to shape-shifting self-draining rotatable slanting connector system 120 and to
    shape-shifting self-draining rotatable slanting branch system 125;

4) Screwing at least one self-draining-hygienic-slanting-platform screw 133 to
    at least one shape-shifting-connector nut 123 and to
    at least one shape-shifting-rotatable-branch nut 129, respectively,
    to attach water-repelling self-draining rotatable slanting hygienic platform system 131
        to shape-shifting self-draining rotatable slanting connector system 120 and to
        shape-shifting self-draining rotatable slanting branch system 125; and 5) Screwing self-draining-hygienic-cap screw 139 to
    one of at least one shape-shifting-rotatable-log nut 115
    to attach water-repelling self-draining rotatable slanting hygienic cap system 136 to
    shape-shifting self-draining rotatable slanting log system 111.

How to Adjust, Level, and Stabilize (on Uneven Ground)
The Unique Shape-Shifting Self-Draining Water-Repelling Hygienic Indoor-Outdoor Slanting Pet Tree System
    (Referring to FIGS. 14A and 14B)

1) Standing the unique shape-shifting self-draining water-repelling hygienic indoor-outdoor slanting pet tree system on the ground;

2) Rotating frictional feet 102; and

3) Adjusting the height of height-adjusting threaded screws 104 until the unique shape-shifting self-draining water-repelling hygienic indoor-outdoor slanting pet tree system is leveled or leaned at a desired angle.

How to Shift the Shape of the Log System
To Create Multiple Various Shapes of
The Unique Shape-Shifting Self-Draining Water-Repelling Hygienic Indoor-Outdoor Slanting Pet Tree System
(Referring to FIGS. 22, 23A, 23B, 24A, 24B, 24C, 25A, 25B, and 25C)
1) Rotating at least one of at least one shape-shifting rotatable straight log 112,
    in the directions of double-headed arrow 147,
    to ship the shape of the unique shape-shifting self-draining water-repelling hygienic indoor-outdoor slanting pet tree system to an different shape; and
2) Rotating at least one of at least one shape-shifting rotatable curved log 113,
    to ship the shape of the unique shape-shifting self-draining water-repelling hygienic indoor-outdoor slanting pet tree system to an different shape.

How to Shift the Shape of the Step System
To Create Multiple Various Shapes of
The Unique Shape-Shifting Self-Draining Water-Repelling Hygienic Indoor-Outdoor Slanting Pet Tree System
(Referring to FIGS. 22, 23A, 23B, 24A, 24B, 24C, 25A, 25B, and 25C)
1) Rotating at least one of at least one shape-shifting rotatable right-side-up step 118,
    in the directions of double-headed arrow 147,
    to ship the shape of the unique shape-shifting self-draining water-repelling hygienic indoor-outdoor slanting pet tree system to an different shape; and
2) Rotating at least one of at least one shape-shifting rotatable upside-down step 119,
    to ship the shape of the unique shape-shifting self-draining water-repelling hygienic indoor-outdoor slanting pet tree system to an different shape.

How to Shift the Shape of the Connector System
To Create Multiple Various Shapes of
The Unique Shape-Shifting Self-Draining Water-Repelling Hygienic Indoor-Outdoor Slanting Pet Tree System
(Referring to FIGS. 22, 23A, 23B, 24A, 24B, 24C, 25A, 25B, and 25C)
1) Rotating at least one of at least one shape-shifting straight connector 121,
    in the directions of double-headed arrow 147,
    to ship the shape of the unique shape-shifting self-draining water-repelling hygienic indoor-outdoor slanting pet tree system to an different shape; and
2) Rotating at least one of at least one shape-shifting curved connector 122,
    to ship the shape of the unique shape-shifting self-draining water-repelling hygienic indoor-outdoor slanting pet tree system to an different shape.

How to Shift the Shape of the Branch System
To Create Multiple Various Shapes of
The Unique Shape-Shifting Self-Draining Water-Repelling Hygienic Indoor-Outdoor Slanting Pet Tree System
(Referring to FIGS. 22, 23A, 23B, 24A, 24B, 24C, 25A, 25B, and 25C)
1) Rotating at least one of at least one shape-shifting rotatable straight branch 126,
    in the directions of double-headed arrow 148,
    to ship the shape of the unique shape-shifting self-draining water-repelling hygienic indoor-outdoor slanting pet tree system to an different shape; and
2) Rotating at least one of at least one shape-shifting rotatable curved branch 127,
    to ship the shape of the unique shape-shifting self-draining water-repelling hygienic indoor-outdoor slanting pet tree system to an different shape.

How to Shift the Shape of the Platform System and/or the Cap System
To Create Multiple Various Shapes of
The Unique Shape-Shifting Self-Draining Water-Repelling Hygienic Indoor-Outdoor Slanting Pet Tree System
(Referring to FIGS. 22, 23A, 23B, 24A, 24B, 24C, 25A, 25B, and 25C)
1) Rotating at least one of at least one self-draining hygienic slanting platform 132,
    in the directions of double-headed arrow 149,
    to ship the shape of the unique shape-shifting self-draining water-repelling hygienic indoor-outdoor slanting pet tree system to an different shape; and/or
2) Rotating self-draining hygienic cap 137,
    in the directions of double-headed arrow 150,
    to ship the shape of the unique shape-shifting self-draining water-repelling hygienic indoor-outdoor slanting pet tree system to an different shape.

How to Drain the Rain Water from
The Unique Shape-Shifting Self-Draining Water-Repelling Hygienic Indoor-Outdoor Slanting Pet Tree System
(Referring to FIGS. 24A, 24B, 24C, 25A, 25B, 25C, 26A, and 26B)
1) Slanting individually-adjustable-corner self-draining rotatable slanting pedestal system 106,
    to drain water 151 away from
    individually-adjustable-corner self-draining rotatable slanting pedestal system 106,
    in the direction of arrow 152a, 152b, 152c, or 152d;
2) Slanting shape-shifting self-draining rotatable slanting log system 111,
    to drain water 151 away from
    shape-shifting self-draining rotatable slanting log system 111,
    in the direction of arrow 152a, 152b, 152c, or 152d;
3) Slanting shape-shifting self-draining rotatable slanting connector system 120,
    to drain water 151 away from
    shape-shifting self-draining rotatable slanting connector system 120,
    in the direction of arrow 152a, 152b, 152c, or 152d;
4) Slanting shape-shifting self-draining rotatable slanting branch system 125,
    to drain water 151 away from
    shape-shifting self-draining rotatable slanting branch system 125,
    in the direction of arrow 152a, 152b, 152c, or 152d;
5) Slanting water-repelling self-draining rotatable slanting hygienic platform system 131,
    to drain water 151 away from
    water-repelling self-draining rotatable slanting hygienic platform system 131,
    in the direction of arrow 152a, 152b, 152c, or 152d; and
6) Slanting water-repelling self-draining rotatable slanting hygienic cap system 136,
    to drain water 151 away from
    water-repelling self-draining rotatable slanting hygienic cap system 136,
    in the direction of arrow 152a, 152b, 152c, or 152d;

7) Covering individually-adjustable-corner self-draining rotatable slanting pedestal system 106 with water-repelling hygienic pedestal cover 109,
   to drain water 151 away from
   individually-adjustable-corner self-draining rotatable slanting pedestal system 106,
   in the direction of arrow 152a, 152b, 152c, or 152d;
8) Covering shape-shifting self-draining rotatable slanting log system 111 with
   at least one water-repelling hygienic log cover 116,
   to drain water 151 away from
   shape-shifting self-draining rotatable slanting log system 111;
   in the direction of arrow 152a, 152b, 152c, or 152d;
9) Covering shape-shifting self-draining rotatable slanting connector system 120 with
   at least one water-repelling hygienic connector cover 124,
   to drain water 151 away from
   shape-shifting self-draining rotatable slanting connector system 120,
   in the direction of arrow 152a, 152b, 152c, or 152d;
10) Covering shape-shifting self-draining rotatable slanting branch system 125 with
   at least one water-repelling hygienic branch cover 130,
   to drain water 151 away from
   shape-shifting self-draining rotatable slanting branch system 125,
   in the direction of arrow 152a, 152b, 152c, or 152d;
11) Covering water-repelling self-draining rotatable slanting hygienic platform system 131 with
   at least one water-repelling hygienic platform cover 134,
   to drain water 151 away from
   water-repelling self-draining rotatable slanting hygienic platform system 131,
   in the direction of arrow 152a, 152b, 152c, or 152d; and
12) Covering water-repelling self-draining rotatable slanting hygienic cap system 136 with water-repelling hygienic cap cover 140,
   to drain water 151 away from
   water-repelling self-draining rotatable slanting hygienic cap system 136,
   in the direction of arrow 152a, 152b, 152c, or 152d.

How to Indoor-Use and Outdoor-Use
The Unique Shape-Shifting Self-Draining Water-Repelling Hygienic Indoor-Outdoor Slanting Pet Tree System
   (Referring to FIG. 27)
1) Leaning the unique shape-shifting self-draining water-repelling hygienic indoor-outdoor slanting pet tree system on L-bracket wheels 146;
2) Rolling the unique shape-shifting self-draining water-repelling hygienic indoor-outdoor slanting pet tree system to an indoor or outdoor location,
   in the direction of arrow 153 or 154;
3) Standing the unique shape-shifting self-draining water-repelling hygienic indoor-outdoor slanting pet tree system on frictional feet 102; and
4) Adjusting height-adjusting threaded screws 104, according to the surface elevation of the location.

Variation
Any component of the unique shape-shifting self-draining water-repelling hygienic indoor-outdoor slanting pet tree system can be made of plastic material, plastic composite material, plasticized material, metallic material, metallic composite material, wooden material, wooden composite material, waterproof material, waterproof composite material, water-repelling material, water-repelling composite material, PVC material, WPC material, the like, or the equivalent.

Any component of the unique shape-shifting self-draining water-repelling hygienic indoor-outdoor slanting pet tree system can be made partially or entirely hollow or solid.

Any component of the unique shape-shifting self-draining water-repelling hygienic indoor-outdoor slanting pet tree system can be used for multiple types of animals or pets, such as, cats, dogs, birds. For example, any component can be used as a log, a step, a connector, a branch, a platform, or a perch.

Any component(s) of the unique shape-shifting self-draining water-repelling hygienic indoor-outdoor slanting pet tree system can be attached to any other component(s) of the unique shape-shifting self-draining water-repelling hygienic indoor-outdoor slanting pet tree system.

For example, FIGS. 28 and 29 illustrate top and bottom views, respectively, of
   at least one shape-shifting straight connector 121,
   at least one shape-shifting curved connector 122,
   at least one shape-shifting rotatable right-side-up step 118, or
   at least one shape-shifting rotatable upside-down step 119
   being attached to
   at least one shape-shifting rotatable straight log 112,
   at least one shape-shifting rotatable curved log 113,
   at least one shape-shifting rotatable straight branch 126, or
   at least one shape-shifting rotatable curved branch 127.

Any component of the unique shape-shifting self-draining water-repelling hygienic indoor-outdoor slanting pet tree system can be made modular such that a user can easily design and build his/her own unique shape of the unique shape-shifting self-draining water-repelling hygienic indoor-outdoor slanting pet tree system.

Any component of the unique shape-shifting self-draining water-repelling hygienic indoor-outdoor slanting pet tree system can be made to have shape-shifting, water-draining, water-repelling, rotating, and slanting, capabilities, such that any component of the unique shape-shifting self-draining water-repelling hygienic indoor-outdoor slanting pet tree system:
   a) Can be washed,
   b) Can drain water away by itself,
   c) Can repel water by itself, and
   d) Can rotate 360%, and
   e) Can change the shape of the unique shape-shifting self-draining water-repelling hygienic indoor-outdoor slanting pet tree system.

Further, the unique shape-shifting self-draining water-repelling hygienic indoor-outdoor slanting pet tree system can comprise:
1) At least one slanting solid or hollowed log system, at least one slanting solid or hollowed step system, at least one slanting solid or hollowed connector system, at least one slanting solid or hollowed branch system, at least one slanting solid or hollowed platform system, at least one slanting solid or hollowed cap system, at least one slanting solid or hollowed house system, and/or at least one slanting solid or hollowed condo system,
   each of which:
      a) Can have at least one door opening for pets to crawl through to an adjacent slanting hollowed log, step, connector, branch, platform, house, and/or condo,
      b) Can be washed,
      c) Can drain water away by itself, d) Can repel water by itself,
e) Can rotate 360%, and can be attached (in any direction and angle) to at least one other component of the unique shape-shifting self-draining water-repelling hygienic indoor-outdoor slanting pet tree system, and
f) Can change the shape of the unique shape-shifting self-draining water-repelling hygienic indoor-outdoor slanting pet tree system.

For example, FIGS. 30A, 30B, and 30C illustrate a first house or condo 155, a second house or condo, and a third house or condo, respectively. First house or condo 155 has nut 156a, nut 156b, nut 156c, screw 156d, door opening 157a, door opening 157b, door opening 157c, and water-draining holes 157d. Second house or condo has door opening 158a, door opening 158b, water-draining holes 158c, and water-draining holes 158d. Third house or condo has door opening 159a, door opening 159b, door opening 159c, and water-draining holes 159d;

2) At least one slanting solid or hollowed ladder system and/or solid or hollowed staircase system, each of which:
   a) Can be washed,
   b) Can drain water away by itself,
   c) Can repel water by itself,
   d) Can rotate 360%, and can be attached (in any direction and angle) to at least one other component of the unique shape-shifting self-draining water-repelling hygienic indoor-outdoor slanting pet tree system, and
   e) Can change the shape of the unique shape-shifting self-draining water-repelling hygienic indoor-outdoor slanting pet tree system.

For example, FIGS. 31 and 32 illustrate slanting ladder 160 and/or slanting staircase 161, respectively;

3) At least one slanting water bottle, spinning wheel, hammock, bed, exercise rope, each of which:
   a) Can be washed,
   b) Can drain water away by itself,
   c) Can repel water by itself,
   d) Can rotate 360%, and can be attached (in any direction and angle) to at least one other component of the unique shape-shifting self-draining water-repelling hygienic indoor-outdoor slanting pet tree system, and
   e) Can change the shape of the unique shape-shifting self-draining water-repelling hygienic indoor-outdoor slanting pet tree system.

For example, FIGS. 33, 34, and 35 illustrate slanting water bottle 162, slanting spinning wheel 163, and/or slanting hammock 164a having water-draining holes 164b, respectively;

4) At least one slanting feeder bowl, wire bowl, wire basket, exercise platform, bed, exercise perch and rope, and/or suspended house or suspended condo, each of which:
   a) Can be washed,
   b) Can drain water away by itself,
   c) Can repel water by itself,
   d) Can rotate 360%, and can be attached (in any direction and angle) to at least one other component of the unique shape-shifting self-draining water-repelling hygienic indoor-outdoor slanting pet tree system, and
   e) Can change the shape of the unique shape-shifting self-draining water-repelling hygienic indoor-outdoor slanting pet tree system.

For example, FIGS. 36, 37, 38, 39, and 40 illustrate slanting feeder bowl 165a having water-draining holes 165b, slanting wire basket 166a having water-draining holes 166b, slanting exercise platform 167, slanting exercise perch and rope 168, and/or suspended house or suspended condo 169a having water-draining holes 169b, respectively;

5) At least one ceiling connector and/or at least one ceiling-connector cap, each of which:
   a) Can be washed,
   b) Can drain water away by itself,
   c) Can repel water by itself,
   d) Can rotate 360%, and can be attached (in any direction and angle) to at least one other component of the unique shape-shifting self-draining water-repelling hygienic indoor-outdoor slanting pet tree system, and
   e) Can change the shape of the unique shape-shifting self-draining water-repelling hygienic indoor-outdoor slanting pet tree system.

For example, FIGS. 41A, 41B, 41C, and 41D illustrate slanting ceiling connectors 170a, 170b, 170c, each having a tree screw for screwing on the unique shape-shifting self-draining water-repelling hygienic indoor-outdoor slanting pet tree system, and each having screw plate 170d for being screwed on ceiling 170e, screw plate 170f for being screwed on ceiling 170g, and screw plate 170h for being screwed on ceiling 170i, respectively. Each of screw plates 170d, 170f, and 170h is for being separately welded to the above-mentioned tree screw, to attach the unique shape-shifting self-draining water-repelling hygienic indoor-outdoor slanting pet tree system to ceiling 170e, ceiling 170g, or ceiling 170i, respectively.

For example, FIG. 41E illustrates ceiling-connector cap 170f, which is for covering either one of ceiling connectors 170a, 170b, and 170c; and/or 6) At least one slanting solid or hollowed log system, at least one slanting solid or hollowed step system, at least one slanting solid or hollowed connector system, at least one slanting solid or hollowed branch system, at least one slanting solid or hollowed platform system, at least one slanting solid or hollowed cap system, at least one at least one slanting solid or hollowed house system, and/or at least one slanting solid or hollowed condo system of any shape and size.

For example, FIGS. 42A, 42B, 42C, and 42D illustrate at least one slanting solid or hollowed log system, at least one slanting solid or hollowed step system, at least one slanting solid or hollowed connector system, at least one slanting solid or hollowed branch system, at least one slanting solid or hollowed platform system, at least one slanting solid or hollowed cap system, at least one at least one slanting solid or hollowed house system, and/or at least one slanting solid or hollowed condo system, each of which:
   a) Can be washed,
   b) Can drain water away by itself
      (for example, with its slating shape and through its drain holes 157d, 158d, 159d, 164b, 165b, 166b, and/or 169b (see FIGS. 42C and 42D)
      (also see FIGS. 30A, 30B, 30C, 35, 36, 37, and 40),
   c) Can repel water by itself, d) Can rotate 360%
   (for example, in the directions of arrows 171a, 171b, 171c, 171d, 171e, 171f, 171g, 171h, 171i, 171j, 171k, 171l, 171m, 171n, 171o, 171p, 171q, 171r, 171s, 171t, and/or 171u), and can be attached (in any direction and angle) to at least one other component of the unique shape-shifting self-draining water-repelling hygienic indoor-outdoor slanting pet tree system, and
e) Can change the shape of the unique shape-shifting self-draining water-repelling hygienic indoor-outdoor slanting pet tree system.

For example, FIGS. 43A, 43B, 43C, and 43D illustrate equivalent variations of slanting log system, slanting step system, slanting connector system, slanting branch system, and/or slanting platform system.

For example, FIG. 44A illustrates a log system, a step system, a connector system, a branch system, and/or a platform system, which can be inserted into another one thereof, in the direction of arrow 172a (without any threads molded on the wall surfaces thereof).

For example, FIG. 44B illustrates a log system, a step system, a connector system, a branch system, and/or a platform system, which can be screwed into another one thereof, in the direction of arrow 172b (with threads 173 and 174 molded on the internal or external wall surfaces thereof, respectively).

For example, FIGS. 45A, 45B, 45C, 46A, 46B, and 46C illustrate at least one slanting log system, at least one slanting step system, at least one slanting connector system, at least one slanting branch system, at least one slanting platform system, at least one slanting cap system, at least one slanting house system, and/or at least one slanting condo system, each of which:
a) Can be washed,
b) Can drain water away by itself,
c) Can repel water by itself,
d) Can rotate 360%, and can be attached (in any direction and angle) to at least one other component of the unique shape-shifting self-draining water-repelling hygienic indoor-outdoor slanting pet tree system, and
e) Can change the shape of the unique shape-shifting self-draining water-repelling hygienic indoor-outdoor slanting pet tree system.

MAJOR ADVANTAGES OF THE INVENTION

The new invention substantially departs from the conventional concepts and designs of the prior art. In doing so, the new invention provides a unique shape-shifting self-draining water-repelling hygienic indoor-outdoor slanting pet tree system having many unique and significant features, functions, and advantages, which overcome all the disadvantages of the prior art, as follows:

1) It is an object of the new invention to provide a unique shape-shifting self-draining water-repelling hygienic indoor-outdoor slanting pet tree system, having
   shape-shifting self-draining 360-degree-rotatable condo system,
   shape-shifting self-draining 360-degree-rotatable log system,
   shape-shifting self-draining 360-degree-rotatable step system,
   shape-shifting self-draining 360-degree-rotatable connector system,
   shape-shifting self-draining 360-degree-rotatable branch system,
   shape-shifting self-draining 360-degree-rotatable platform system,
   shape-shifting self-draining 360-degree-rotatable hammock system,
   shape-shifting self-draining 360-degree-rotatable feeding bow system,
   shape-shifting self-draining 360-degree-rotatable water-bottle system, and
   shape-shifting self-draining 360-degree-rotatable exercise rope system,
   Therefore, the unique shape-shifting self-draining water-repelling hygienic indoor-outdoor slanting pet tree system:
   a) Can allow gravitational force and kinetic force of water (from a hose, spraying into the inside of the prior art of pet tree and weighing on its components, appendages, attachments, and accessories) to shift and rotate its components, appendages, attachments, and accessories to shift their positions
      to create new shapes and designs of shape-shifting self-draining water-repelling hygienic indoor-outdoor slanting pet tree system and its components, appendages, attachments, and accessories;
   b) Can allow gravitational force and kinetic force of water (from rain, pouring down on its components, appendages, attachments, and accessories) to shift and rotate its components, appendages, attachments, and accessories to shift their positions
      to create new shapes and designs of shape-shifting self-draining water-repelling hygienic indoor-outdoor slanting pet tree system and its components, appendages, attachments, and accessories;
   c) Can allow gravitational force and kinetic force of wind (from air movement, blowing on its components, appendages, attachments, and accessories) to shift and rotate its components, appendages, attachments, and accessories to shift their positions
      to create new shapes and designs of shape-shifting self-draining water-repelling hygienic indoor-outdoor slanting pet tree system and its components, appendages, attachments, and accessories;
   d) Can allow human force (from a user, manually rotating its components, appendages, attachments, and accessories) to shift and rotate its components, appendages, attachments, and accessories to shift their positions
      to create new shapes and designs of shape-shifting self-draining water-repelling hygienic indoor-outdoor slanting pet tree system and its components, appendages, attachments, and accessories;
   e) Can allow gravitational force and kinetic force (from an animal, climbing into the inside of the prior art of pet tree and weighing on its components, appendages, attachments, and accessories) to shift and rotate its components, appendages, attachments, and accessories to shift their positions
      to create new shapes and designs of the prior art of pet tree and its components, appendages, attachments, and accessories.
2) It is another object of the new invention to provide a unique shape-shifting self-draining water-repelling hygienic indoor-outdoor slanting pet tree system, having individually-adjustable-height self-draining rotatable slanting leg system.

Therefore, the unique shape-shifting self-draining water-repelling hygienic indoor-outdoor slanting pet tree system:
  a) Can provide a frictional grip where the legs come in contact with the ground
    to reduce horizontal slipping or sliding across the ground surface;
  b) Can be easily vertically elevated
    to provide a level pedestal base on various uneven surfaces;
  c) Can be easily vertically lowered
    to provide a level pedestal base on various uneven surfaces;
  d) Can be easily three-dimensionally adjusted
    to provide a level pedestal base on various uneven surfaces;
  e) Can be easily three-dimensionally adjusted
    to provide a stable pedestal base on various uneven surfaces;
  f) Is anti-sliding when pushed; and
  g) Is quick and easy
    to adjust upward or downward.
3) It is another object of the new invention to provide a unique shape-shifting self-draining water-repelling hygienic indoor-outdoor slanting pet tree system, having individually-adjustable-corner self-draining rotatable slanting pedestal system.
  Therefore, the unique shape-shifting self-draining water-repelling hygienic indoor-outdoor slanting pet tree system:
    a) Can be three-dimensionally adjusted
      to be level and stable;
    b) Can provide a range of 360-degree-rotatable and various shape-shifting positions to all the components, appendages, attachments, and accessories of the unique shape-shifting self-draining water-repelling hygienic indoor-outdoor slanting pet tree system, and to the unique shape-shifting self-draining water-repelling hygienic indoor-outdoor slanting pet tree system (such that all of them remain functional),
      to provide numerous individualized shapes and configurations of the pet tree, based on individual owner preferences;
    c) Can receive the screwed on attachment of at least one of the following appendages, a) Shape-shifting self-draining rotatable slanting log system, b) Shape-shifting-rotatable branch system, c) Shape-shifting self-draining rotatable slanting step system, d) Self-draining-hygienic-slanting-platform screw, and e) Rotatable slanting L-bracket wheel system
      to provide for quick assembly and disassembly (that does not require tools);
    d) Can receive the screwed on attachment of 360-degree-rotatable slanting L-bracket wheel system
      to allow easy rolling transport and mobility of shape-shifting self-draining water-repelling hygienic indoor-outdoor slanting pet tree system;
    e) Can be assembled in numerous configurations;
    f) Can be assembled with infinite rotational positions;
    g) Requires no tools to be assembled and disassembled; and
    h) Requires less time to be assembled and disassembled.
4) It is a further object of the new invention to provide a unique shape-shifting self-draining water-repelling hygienic indoor-outdoor slanting pet tree system, having shape-shifting self-draining rotatable slanting log system.
  Therefore, the unique shape-shifting self-draining water-repelling hygienic indoor-outdoor slanting pet tree system:
    a) Can quickly and easily be screwed together (without using any tools),
      to have a wide variety of trunk shapes and configurations; also providing a wide variety of pet climbing challenges;
    b) Can allow for quick and easy 360-degree rotation of each section
      to allow shape-shifting self-draining rotatable slanting branch system and water-repelling self-draining rotatable slanting hygienic platform system to be attached from any direction to better fit into various spaces, and to meet owner's individual wishes;
    c) Can easily receive and support branches, and platforms in numerous configurations
      to provide support and allow individualized shape-shifting positioning of shape-shifting self-draining rotatable slanting step system, shape-shifting self-draining rotatable slanting branch system, and water-repelling self-draining rotatable slanting hygienic platform system to achieve a wide variety of configurations of the unique shape-shifting self-draining water-repelling hygienic indoor-outdoor slanting pet tree system;
    d) Can be dissembled and washed as separate sections in a tub or joined together and sprayed down with a hose
      to promote cleanliness and eliminate odors;
    e) Can be covered with quick-drying, water-repelling hygienic material
      to promote quick-drying;
    f) Promotes water-drainage;
    g) Repels water;
    h) Promotes quick drying;
    i) Provides traction for pets to climb on; and
    j) Can quickly and easily be assembled by hand (without using any tools).
5) It is an even further object of the new invention to provide a unique shape-shifting self-draining water-repelling hygienic indoor-outdoor slanting pet tree system, having shape-shifting self-draining rotatable slanting step system.
  Therefore, the unique shape-shifting self-draining water-repelling hygienic indoor-outdoor slanting pet tree system:
    a) Can provide weight-bearing 360-degree-rotatable steps
      to aid and engage pets in climbing up, down, around, in, and out the unique shape-shifting self-draining water-repelling hygienic indoor-outdoor slanting pet tree system;
    b) Can provide various climbing configurations, preferences, and difficulties
      to add interest and challenge to pets in climbing up, down, around, in, and out the unique shape-shifting self-draining water-repelling hygienic indoor-outdoor slanting pet tree system;
    c) Provides traction and interest to aid pets in climbing activities.
6) It is another object of the new invention to provide a unique shape-shifting self-draining water-repelling hygienic indoor-outdoor slanting pet tree system, having shape-shifting self-draining rotatable slanting connector system.

Therefore, the unique shape-shifting self-draining water-repelling hygienic indoor-outdoor slanting pet tree system:
- a) Can easily receive and support branches, and platforms in numerous configurations
  - to allow individualized positioning of shape-shifting self-draining rotatable slanting branch system, and water-repelling self-draining rotatable slanting hygienic platform system to achieve a wide variety of configurations of the unique shape-shifting self-draining water-repelling hygienic indoor-outdoor slanting pet tree system;
- b) Can easily receive and support shape-shifting self-draining rotatable slanting branch system, and water-repelling self-draining rotatable slanting hygienic platform system in a slanted position
  - to assist gravity in more efficient drainage of rain or wash water;
- c) Requires no tools to be assembled and disassembled; and
- d) Requires less time to be assembled and disassembled.

7) It is yet another object of the new invention to provide a unique shape-shifting self-draining water-repelling hygienic indoor-outdoor slanting pet tree system, having shape-shifting self-draining rotatable slanting branch system.

Therefore, the unique shape-shifting self-draining water-repelling hygienic indoor-outdoor slanting pet tree system:
- a) Can receive and support platform or additional branch systems,
  - to extend length of branches and expand size of pet tree;
- b) Can support platform or additional branch systems,
  - to allow an indoor pet tree to have branch systems that extend out the window and;
- c) Can receive and support platform or additional branch systems,
  - to provide more climbing opportunities for pets;
- d) Can receive and support platform systems,
  - to provide a perch for pets;
- e) Can receive and support pet tree accessories such as slanting water bottle, perch, spinning wheel, hammock, bed, exercise rope, and feeder bowl,
  - to add variety, interest, and utility for pets;
- f) Can be dissembled and washed by sections in a tub or joined together and sprayed down with a hose
  - to promote cleanliness and eliminate odors;
- g) Can be covered with quick-drying, water-repelling hygienic material
  - to promote quick-drying;
- h) Promotes water-drainage;
- i) Repels water;
- j) Promotes quick drying; and
- k) Can be connected in an unlimited number of shapes and sizes.

8) It is still yet another object of the new invention to provide a unique shape-shifting self-draining water-repelling hygienic indoor-outdoor slanting pet tree system, having water-repelling self-draining rotatable slanting hygienic platform system.

Therefore, the unique shape-shifting self-draining water-repelling hygienic indoor-outdoor slanting pet tree system:
- a) Can quickly and easily be screwed into branch or log system
  - (no tool is needed)
  - to extend length of branches and expand size of pet tree;
- b) Can quickly and easily be screwed into branch or log system
  - (no tool is needed)
  - to provide more climbing opportunities for pets;
- c) Can quickly and easily be screwed into branch or log system
  - (no tool is needed)
  - to provide a perch for pets;
- d) Can be dissembled (no tool is needed) and sections can be washed separately
  - to promote cleanliness and eliminate odors;
- e) Can be covered with quick-drying, water-repelling hygienic platform cover that can be simply removed and washed separately
  - to make it easier and more convenient for owner to maintain cleanliness and eliminate odors;
- f) Promotes water-drainage;
- g) Repels water;
- h) Promotes quick drying; and
- i) Provides traction for pets to climb on.

9) It is still yet an even further object of the new invention to provide a unique shape-shifting self-draining water-repelling hygienic indoor-outdoor slanting pet tree system, having water-repelling self-draining rotatable slanting hygienic cap system.

Therefore, the unique shape-shifting self-draining water-repelling hygienic indoor-outdoor slanting pet tree system:
- a) Can quickly and easily cap off shape-shifting self-draining rotatable slanting log system
  - to prevent water from entering;
- b) Promotes water-drainage;
- c) Repels water;
- d) Promotes quick drying; and
- e) Provides traction for pets to climb on.

10) It is still yet an even further object of the new invention to provide a unique shape-shifting self-draining water-repelling hygienic indoor-outdoor slanting pet tree system, having water-repelling self-draining rotatable slanting L-bracket wheel system.

Therefore, the unique shape-shifting self-draining water-repelling hygienic indoor-outdoor slanting pet tree system:
- a) Can allow the unique shape-shifting self-draining water-repelling hygienic indoor-outdoor slanting pet tree system
  - to be rolled from place to place for convenient transport and mobility;
- b) Can allow the unique shape-shifting self-draining water-repelling hygienic indoor-outdoor slanting pet tree system
  - to be used as an indoor system exclusively, or to be used as an outdoors system exclusively, or to be easily rolled from outdoors to indoors as the weather changes or for any other reason; and c) Can allow the unique shape-shifting self-draining water-repelling hygienic indoor-outdoor slanting pet tree system to be wheeled outdoors,
to be sprayed down from top to bottom with the garden hose, thereby making it easier and more convenient to wash and keep sanitary, as well as looking and smelling cleaner.

11) It is still yet an even further object of the new invention to provide a unique shape-shifting self-draining water-repelling hygienic indoor-outdoor slanting pet tree system, having
multiple additional capabilities.

Therefore, the unique shape-shifting self-draining water-repelling hygienic indoor-outdoor slanting pet tree system:
a) Can have one or multiple pet houses or pet condos attachable thereto and/or to each other with door openings and water-draining holes
to allow pets to access one or more small pet houses (while staying inside the unique shape-shifting self-draining water-repelling hygienic indoor-outdoor slanting pet tree system) which add interest and utility to the unique shape-shifting self-draining water-repelling hygienic indoor-outdoor slanting pet tree system;
b) Can have 360-degree-rotatable ladder system for pets
to climb on, rest on, and enjoy;
c) Can have a ceiling connector
to suspend the unique shape-shifting self-draining water-repelling hygienic indoor-outdoor slanting pet tree system from ceiling, or to act as a stabilizer to the unique shape-shifting self-draining water-repelling hygienic indoor-outdoor slanting pet tree system while the unique pet tree system is being attached to a foundation;
d) Can be used by multiple pets or animals at the same time; and
e) Can enhance the life of pets and animals by allowing them to move around inside the unique pet tree system (from condo to condo, from branch to branch, from log to log) without the need for getting on the outside of the unique pet tree system).

What is claimed is:

1. A shape-shifting self-draining water-repelling pet tree, capable of being shifted or rotated by an external force from water, wind, pet, or human being for indoor and outdoor use, comprising:
a pedestal made of water-repelling material, said pedestal having a plurality of corners;
a plurality of brackets made of water-repelling material, each of said brackets having an L shape;
a plurality of wheels made of water-repelling material, each of said wheels rotatably attached to one of said brackets for allowing said shape-shifting self-draining water-repelling pet tree to be wheeled indoor or outdoor;
a plurality of screws made of water-repelling material, said screws screwing said brackets on said pedestal at said corners respectively;
a plurality of condos made of water-repelling material, said shape-shifting self-draining water-repelling pet tree having a shape,
each of said condos having at least one accessing opening
for allowing access inside said condos to shift or rotate said condos to shift said shape of said shape-shifting self-draining water-repelling pet tree and
for allowing said pet to access into and out of said condos to shift or rotate said condos to shift said shape of said pet tree and to access from one of said condos to another one of said condos to shift or rotate said condos to shift said shape of said shape-shifting self-draining water-repelling pet tree,
each of said condos having at least one draining opening
for draining said water to shift or rotate said condos to shift said shape of said shape-shifting self-draining water-repelling pet tree,
each of said condos having at least one surface
for allowing said water, said wind, said pet, and said human to push thereon to shift or rotate said condos to shift said shape of said shape-shifting self-draining water-repelling pet tree; and
a plurality of connecting nuts and connecting screws made of water-repelling material,
said connecting nuts molded to said pedestal,
said connecting screws molded to said condos respectively,
said connecting screws screwed into said connecting nuts respectively
for rotatably connecting said pedestal and said condos together such that said condos are capable of being shifted or rotated by said external force.

2. The shape-shifting self-draining water-repelling pet tree of claim 1, wherein said water comprises rain water, said rain water has a kinetic force or a gravitational force, said external force from said water comprises said kinetic force or said gravitational force from said rain water.

3. The shape-shifting self-draining water-repelling pet tree of claim 1, wherein said water has a kinetic force or a gravitational force, wherein said external force from said water comprises said kinetic force or said gravitational force from said water.

4. The shape-shifting self-draining water-repelling pet tree of claim 1, wherein said wind has a kinetic force or a gravitational force, wherein said external force from said wind comprises said kinetic force or said gravitational force from said wind.

5. The shape-shifting self-draining water-repelling pet tree of claim 1, wherein said pet has a kinetic force or a gravitational force, wherein said external force from said pet comprises said kinetic force or said gravitational force from said pet.

6. The shape-shifting self-draining water-repelling pet tree of claim 1, wherein said human being has a hand, said hand has a kinetic force or a gravitational force, said external force from said human being comprises said kinetic force or said gravitational force from said hand.

7. The shape-shifting self-draining water-repelling pet tree of claim 1, further comprising at least one removable cover made of plastic, metallic, wooden, composite, waterproof, or water-repelling material for covering at least one element selected from the group consisting of: said pedestal, said condos, said connecting nuts, and said connecting screws.

8. The shape-shifting self-draining water-repelling pet tree of claim 1, further comprising a tree nut, a tree screw, a screw plate, and a ceiling screw, said tree nut for being molded to one of said condos of said pet tree, said tree screw for being screwed into said tree nut and for being welded to said screw plate, said ceiling screw for attaching said screw plate to a ceiling.

9. The shape-shifting self-draining water-repelling pet tree of claim 1, further comprising a cap for capping said pet tree.

10. The shape-shifting self-draining water-repelling pet tree of claim 1, further comprising at least one element capable of being shifted or rotated by said external force from said water, said wind, said pet, or said human being, said at least one element selected from the group consisting of:
 at least one log with holes for draining said water, a log nut, and a log screw,
 said log nut molded to one of said condos,
 said log screw molded to said at least one log and screwed into said log nut to attach said at least one log to said pet tree
  for said pet to climb on said at least one log,
 at least one branch with holes for draining said water, a branch nut, and a branch screw,
 said branch nut molded to one of said condos,
 said branch screw molded to said at least one branch and screwed into said branch nut to attach said at least one branch to said pet tree
  for said pet to climb on said at least one branch,
 at least one step with holes for draining said water, a step nut, and a step screw,
 said step nut molded to one of said condos,
 said step screw molded to said at least one step and screwed into said step nut to attach said at least one step to said pet tree
  for said pet to climb on said at least one step,
 at least one platform with holes for draining said water, a platform nut, and a platform screw,
 said platform nut molded to one of said condos,
 said platform screw molded to said at least one platform and screwed into said platform nut to attach said at least one platform to said pet tree
  for said pet to climb on said at least one platform,
 at least one ladder with holes for draining said water, a ladder nut, and a ladder screw,
 said ladder nut molded to one of said condos,
 said ladder screw molded to said at least one ladder and screwed into said ladder nut to attach said at least one ladder to said pet tree
  for said pet to climb on said at least one ladder,
 at least one bed with holes for draining said water, a bed nut, and a bed screw,
 said bed nut molded to one of said condos,
 said bed screw molded to said at least one bed and screwed into said bed nut to attach said at least one bed to said pet tree
  for said pet to climb on said at least one bed,
 at least one hammock with holes for draining said water, a hammock nut, and a hammock screw, said hammock nut molded to one of said condos,
 said hammock screw molded to said at least one hammock and screwed into said hammock nut to attach said at least one hammock to said pet tree
  for said pet to climb on said at least one hammock,
 at least one feeding bow with holes for draining said water, a feeding bow nut, and a feeding bow screw, said feeding bow nut molded to one of said condos,
 said feeding bow screw molded to said at least one feeding bow and screwed into said feeding bow nut to attach said at least one feeding bow to said pet tree
  for said pet to climb on said at least one feeding bow,
 at least one water bottle with holes for draining said water, a water bottle nut, and a water bottle screw, said water bottle nut molded to one of said condos,
 said water bottle screw molded to said at least one water bottle and screwed into said water bottle nut to attach said at least one water bottle to said pet tree
  for said pet to climb on said at least one water bottle,
 at least one basket with holes for draining said water, a basket nut, and a basket screw,
 said basket nut molded to one of said condos,
 said basket screw molded to said at least one basket and screwed into said basket nut to attach said at least one basket to said pet tree
  for said pet to climb on said at least one basket,
 at least one perch with holes for draining said water, a perch nut, and a perch screw,
 said perch nut molded to one of said condos,
 said perch screw molded to said at least one perch and screwed into said perch nut to attach said at least one perch to said pet tree
  for said pet to climb on said at least one perch,
 at least one rope with holes for draining said water, a rope nut, and a rope screw,
 said rope nut molded to one of said condos,
 said rope screw molded to said at least one rope and screwed into said rope nut to attach said at least one rope to said pet tree
  for said pet to climb on said at least one rope,
 at least one suspended condo with holes for draining said water, a suspended condo nut, and a suspended condo screw, said suspended condo nut molded to one of said condos,
 said suspended condo screw molded to said at least one suspended condo and screwed into
 said suspended condo nut to attach said at least one suspended condo to said pet tree
  for said pet to climb on said at least one suspended condo, and
 at least one suspended house with holes for draining said water, a suspended house nut, and a suspended house screw, said suspended house nut molded to one of said condos,
 said suspended house screw molded to said at least one suspended house and screwed into
 said suspended house nut to attach said at least one suspended house to said pet tree
  for said pet to climb on said at least one suspended house.

11. A shape-shifting self-draining animal tree, capable of being shifted by an external force for indoor and outdoor use, comprising:
 a pedestal made of water-repelling material, said pedestal having a plurality of corners;
 a plurality of brackets made of water-repelling material, each of said brackets having an L shape;
 a plurality of wheels made of water-repelling material, each of said wheels rotatably attached to one of said brackets for allowing said animal tree to be wheeled indoor or outdoor;
 a plurality of screws made of water-repelling material, said screws screwing said brackets on said pedestal at said corners respectively;
 a plurality of condos made of water-repelling material, said animal tree having a shape, each of said condos having at least one opening for allowing said external force to access inside said condos to shift or rotate said condos to shift said shape of said animal tree and for allowing said external force to access into and out of said condos and to access from one of said condos to another one of said condos to shift or rotate said condos to shift said shape of said animal tree, each of said condos having at least one draining opening for draining said water to shift or rotate said condos to shift said shape of said animal tree, each of said condos having at least one surface for allowing said external force to push thereon to shift or rotate said condos to shift said shape of said animal tree; and a plurality of connecting nuts and connecting screws made of water-repelling material,
  said connecting nuts molded to said pedestal,
  said connecting screws molded to said condos respectively,
  said connecting screws screwed into said connecting nuts respectively
    for rotatably connecting said pedestal and said condos together such that said condos are capable of being shifted or rotated by said external force.

12. The shape-shifting self-draining animal tree of claim 11, wherein said external force comprises water force.

13. The shape-shifting self-draining animal tree of claim 11, wherein said external force comprises rain force.

14. The shape-shifting self-draining animal tree of claim 11, wherein said external force comprises wind force.

15. The shape-shifting self-draining animal tree of claim 11, wherein said external force comprises pet force.

16. The shape-shifting self-draining animal tree of claim 11, wherein said external force comprises human force.

17. The shape-shifting self-draining animal tree of claim 11, further comprising at least one removable cover made of plastic, metallic, wooden, composite, waterproof, or water-repelling material for covering at least one element selected from the group consisting of: said pedestal, said condos, said connecting nuts, and said connecting screws.

18. The shape-shifting self-draining animal tree of claim 11, further comprising a tree nut, a tree screw, a screw plate, and a ceiling screw, said tree nut for being molded to one of said condos of said animal tree, said tree screw for being screwed into said tree nut and for being welded to said screw plate, said ceiling screw for attaching said screw plate to a ceiling.

19. The shape-shifting self-draining animal tree of claim 11, further comprising a cap for capping said animal tree.

20. The shape-shifting self-draining animal tree of claim 11, further comprising at least one element capable of being shifted or rotated by said external force, said at least one element selected from the group consisting of:

at least one log with holes for draining said water, a log nut, and a log screw,
said log nut molded to one of said condos,
said log screw molded to said at least one log and screwed into said log nut to attach said at least one log to said animal tree
  for said pet to climb on said at least one log,
at least one branch with holes for draining said water, a branch nut, and a branch screw,
said branch nut molded to one of said condos,
said branch screw molded to said at least one branch and screwed into said branch nut to attach said at least one branch to said animal tree
  for said pet to climb on said at least one branch,
at least one step with holes for draining said water, a step nut, and a step screw,
said step nut molded to one of said condos,
said step screw molded to said at least one step and screwed into said step nut to attach said at least one step to said animal tree
  for said pet to climb on said at least one step,
at least one platform with holes for draining said water, a platform nut, and a platform screw,
said platform nut molded to one of said condos,
said platform screw molded to said at least one platform and screwed into said platform nut to attach said at least one platform to said animal tree
  for said pet to climb on said at least one platform,
at least one ladder with holes for draining said water, a ladder nut, and a ladder screw,
said ladder nut molded to one of said condos,
said ladder screw molded to said at least one ladder and screwed into said ladder nut to attach said at least one ladder to said animal tree
  for said pet to climb on said at least one ladder,
at least one bed with holes for draining said water, a bed nut, and a bed screw,
said bed nut molded to one of said condos,
said bed screw molded to said at least one bed and screwed into said bed nut to attach said at least one bed to said animal tree
  for said pet to climb on said at least one bed,
at least one hammock with holes for draining said water, a hammock nut, and a hammock screw, said hammock nut molded to one of said condos,
said hammock screw molded to said at least one hammock and screwed into said hammock nut to attach said at least one hammock to said animal tree
  for said pet to climb on said at least one hammock,
at least one feeding bow with holes for draining said water, a feeding bow nut, and a feeding bow screw, said feeding bow nut molded to one of said condos,
said feeding bow screw molded to said at least one feeding bow and screwed into said feeding bow nut to attach said at least one feeding bow to said animal tree
  for said pet to climb on said at least one feeding bow,
at least one water bottle with holes for draining said water, a water bottle nut, and a water bottle screw, said water bottle nut molded to one of said condos,
said water bottle screw molded to said at least one water bottle and screwed into said water bottle nut to attach said at least one water bottle to said animal tree
  for said pet to climb on said at least one water bottle,
at least one basket with holes for draining said water, a basket nut, and a basket screw,
said basket nut molded to one of said condos,
said basket screw molded to said at least one basket and screwed into said basket nut to attach said at least one basket to said animal tree
  for said pet to climb on said at least one basket,
at least one perch with holes for draining said water, a perch nut, and a perch screw,
said perch nut molded to one of said condos,
said perch screw molded to said at least one perch and screwed into said perch nut to attach said at least one perch to said animal tree
  for said pet to climb on said at least one perch,
at least one rope with holes for draining said water, a rope nut, and a rope screw,
said rope nut molded to one of said condos,
said rope screw molded to said at least one rope and screwed into said rope nut to attach said at least one rope to said animal tree for said pet to climb on said at least one rope,
at least one suspended condo with holes for draining said water, a suspended condo nut, and a suspended condo screw, said suspended condo nut molded to one of said condos,
   said suspended condo screw molded to said at least one suspended condo and screwed into
   said suspended condo nut to attach said at least one suspended condo to said animal tree
   for said pet to climb on said at least one suspended condo, and
at least one suspended house with holes for draining said water, a suspended house nut, and a suspended house screw, said suspended house nut molded to one of said condos,
said suspended house screw molded to said at least one suspended house and screwed into
said suspended house nut to attach said at least one suspended house to said animal tree
   for said pet to climb on said at least one suspended house.

\* \* \* \* \*